US012662979B2

(12) United States Patent　　　　(10) Patent No.:　US 12,662,979 B2
Zatorski et al.　　　　　　　　　　　(45) Date of Patent:　Jun. 23, 2026

(54) HYBRID-ELECTRIC PROPULSION SYSTEM EQUIPPED WITH A COUPLER FOR SWITCHING BETWEEN MODES OF OPERATION

(71) Applicant: General Electric Company, Schenectady, NY (US)

(72) Inventors: Darek Tomasz Zatorski, Fort Wright, IN (US); Kurt David Murrow, Springboro, OH (US); Paul Robert Gemin, Cincinnati, OH (US); Philip M. Cioffi, Schaghticoke, NY (US); John Russell Yagielski, Scotia, NY (US)

(73) Assignee: General Electric Company, Evendale, OH (US)

( * ) Notice: Subject to any disclaimer, the term of this patent is extended or adjusted under 35 U.S.C. 154(b) by 144 days.

(21) Appl. No.: 18/351,786

(22) Filed: Jul. 13, 2023

(65) Prior Publication Data

US 2025/0145301 A1　　May 8, 2025

Related U.S. Application Data

(60) Provisional application No. 63/390,327, filed on Jul. 19, 2022.

(51) Int. Cl.
*B64D 27/33* (2024.01)
*B64D 27/02* (2006.01)
(Continued)

(52) U.S. Cl.
CPC ................ *F02K 5/00* (2013.01); *B64D 27/02* (2013.01); *B64D 27/10* (2013.01); *B64D 27/31* (2024.01); *B64D 27/33* (2024.01);

*B64D 31/00* (2013.01); *B64D 31/18* (2024.01); *B64D 35/023* (2024.01); *F02C 3/107* (2013.01); *F02C 7/36* (2013.01);
(Continued)

(58) Field of Classification Search
CPC ........... F05D 2220/323; F05D 2240/40; F05D 2270/052; F05D 2270/07; F05D 2270/335; F05D 2270/44; F05D 2270/62; B64D 35/08; B64D 27/33; B64D 31/18; B64D 27/10; B64D 27/24; B64D 27/026;
(Continued)

(56) References Cited

U.S. PATENT DOCUMENTS 3,675,444 A　　7/1972　Whipple
4,232,772 A　　11/1980　Brissey et al.
(Continued)

*Primary Examiner* — Rodolphe Andre Chabreyrie
(74) *Attorney, Agent, or Firm* — Dority & Manning, P.A.

(57)　　　　　　ABSTRACT

A propulsion assembly includes a first torque source coupled with a first shaft and a second torque source coupled with a second shaft. A coupler selectively couples the first and second torque sources. When the first and second torque sources are coupled via the coupler, in response to a command to decouple the first torque source, an unloading operation is performed to decrease the torque output provided by the first torque source to a threshold, and when reached, the first shaft is decoupled from the coupler. When the first torque source is coupled with the coupler but the second torque source is not, in response to a command to couple the second torque source, a speed matching operation is performed to increase the speed of the second shaft to match a speed of the first shaft, and when the speeds are matched, the second shaft is coupled to the coupler.

6 Claims, 21 Drawing Sheets

(51) Int. Cl.

| | |
|---|---|
| *B64D 27/10* | (2006.01) |
| *B64D 27/31* | (2024.01) |
| *B64D 31/00* | (2006.01) |
| *B64D 31/18* | (2024.01) |
| *B64D 35/023* | (2024.01) |
| *B64D 35/08* | (2025.01) |
| *F02C 3/107* | (2006.01) |
| *F02C 7/36* | (2006.01) |
| *F02K 5/00* | (2006.01) |
| *F01D 15/10* | (2006.01) |

(52) U.S. Cl.
CPC ........ *F01D 15/10* (2013.01); *F05D 2270/052* (2013.01); *F05D 2270/07* (2013.01); *F05D 2270/335* (2013.01); *F05D 2270/62* (2013.01)

(58) Field of Classification Search
CPC .. F01D 15/10; F01D 15/12; F02C 7/32; F02C 7/36; F02C 9/56
See application file for complete search history.

(56) References Cited

U.S. PATENT DOCUMENTS

| | | | |
|---|---|---|---|
| 7,422,543 B2 | 9/2008 | Ransbarger et al. | |
| 8,089,179 B2 | 1/2012 | Legros | |
| 9,752,509 B2 | 9/2017 | Clayton et al. | |
| 10,415,482 B2 | 9/2019 | Marconi et al. | |
| 10,730,633 B2 | 8/2020 | Anghel et al. | |
| 10,822,100 B2 | 11/2020 | Dindar et al. | |
| 11,091,272 B2 | 8/2021 | Kupratis et al. | |
| 11,732,639 B2 | 8/2023 | LaTulipe et al. | |
| 2017/0320584 A1* | 11/2017 | Menheere | F02C 3/10 |
| 2017/0321601 A1 | 11/2017 | Lafargue et al. | |
| 2020/0031480 A1 | 1/2020 | Baig et al. | |
| 2020/0290742 A1 | 9/2020 | Kumar et al. | |
| 2020/0325829 A1* | 10/2020 | Kupratis | F02C 7/32 |
| 2020/0362754 A1* | 11/2020 | Beauchesne-Martel | F02C 6/02 |
| 2021/0108569 A1 | 4/2021 | Devendorf | |
| 2022/0025778 A1 | 1/2022 | Harms et al. | |
| 2022/0025941 A1* | 1/2022 | Olson | F16D 25/14 |
| 2022/0033097 A1 | 2/2022 | Botti et al. | |
| 2022/0411082 A1 | 12/2022 | Delbosc et al. | |
| 2023/0080365 A1* | 3/2023 | Beauchesne-Martel | F02C 9/42 |
| | | | 701/3 |
| 2023/0322400 A1* | 10/2023 | Medici | F02C 6/02 |
| | | | 244/75.1 |

* cited by examiner

400

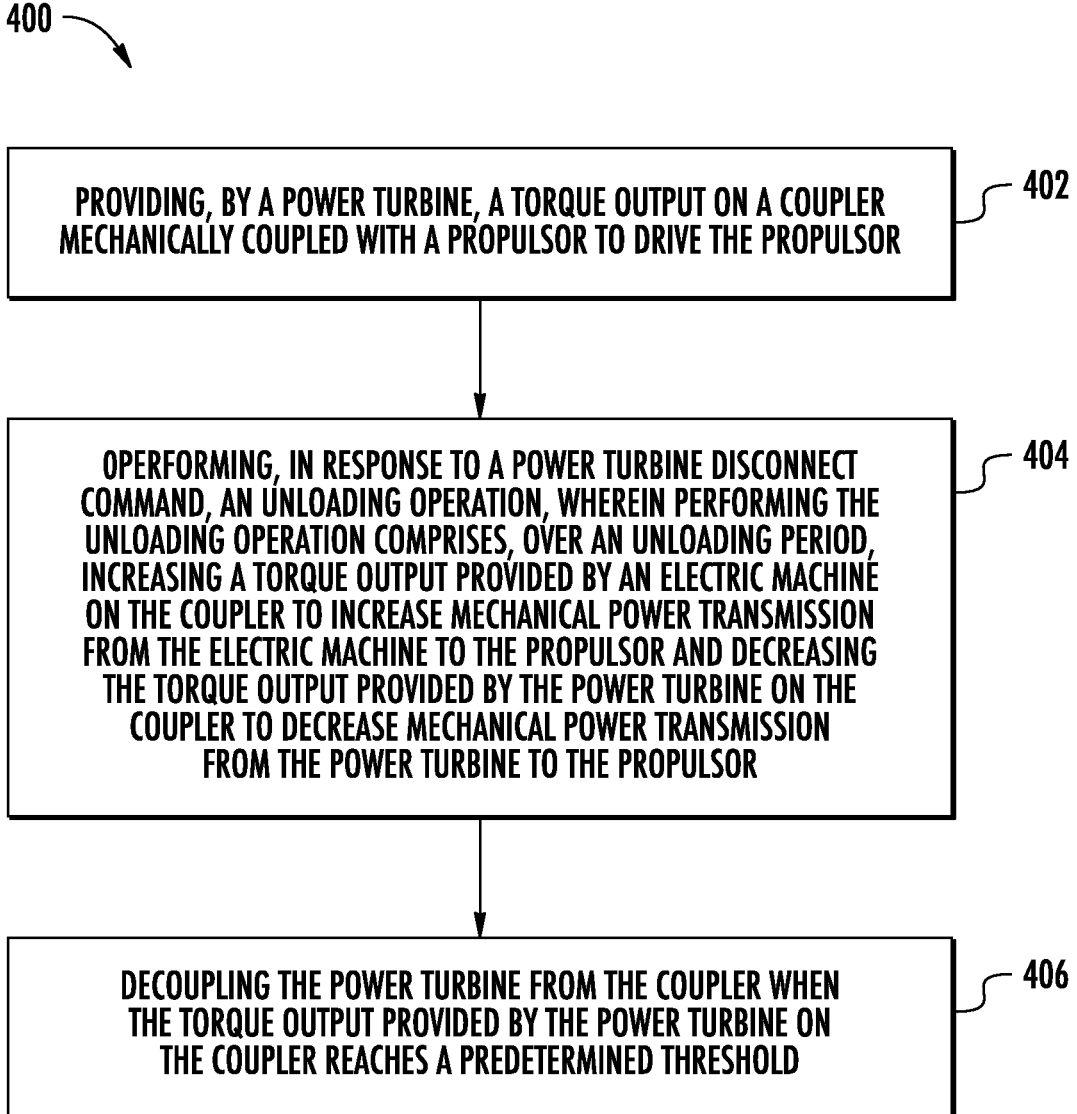

PROVIDING, BY A POWER TURBINE, A TORQUE OUTPUT ON A COUPLER MECHANICALLY COUPLED WITH A PROPULSOR TO DRIVE THE PROPULSOR — 402

OPERFORMING, IN RESPONSE TO A POWER TURBINE DISCONNECT COMMAND, AN UNLOADING OPERATION, WHEREIN PERFORMING THE UNLOADING OPERATION COMPRISES, OVER AN UNLOADING PERIOD, INCREASING A TORQUE OUTPUT PROVIDED BY AN ELECTRIC MACHINE ON THE COUPLER TO INCREASE MECHANICAL POWER TRANSMISSION FROM THE ELECTRIC MACHINE TO THE PROPULSOR AND DECREASING THE TORQUE OUTPUT PROVIDED BY THE POWER TURBINE ON THE COUPLER TO DECREASE MECHANICAL POWER TRANSMISSION FROM THE POWER TURBINE TO THE PROPULSOR — 404

DECOUPLING THE POWER TURBINE FROM THE COUPLER WHEN THE TORQUE OUTPUT PROVIDED BY THE POWER TURBINE ON THE COUPLER REACHES A PREDETERMINED THRESHOLD — 406

FIG. 11

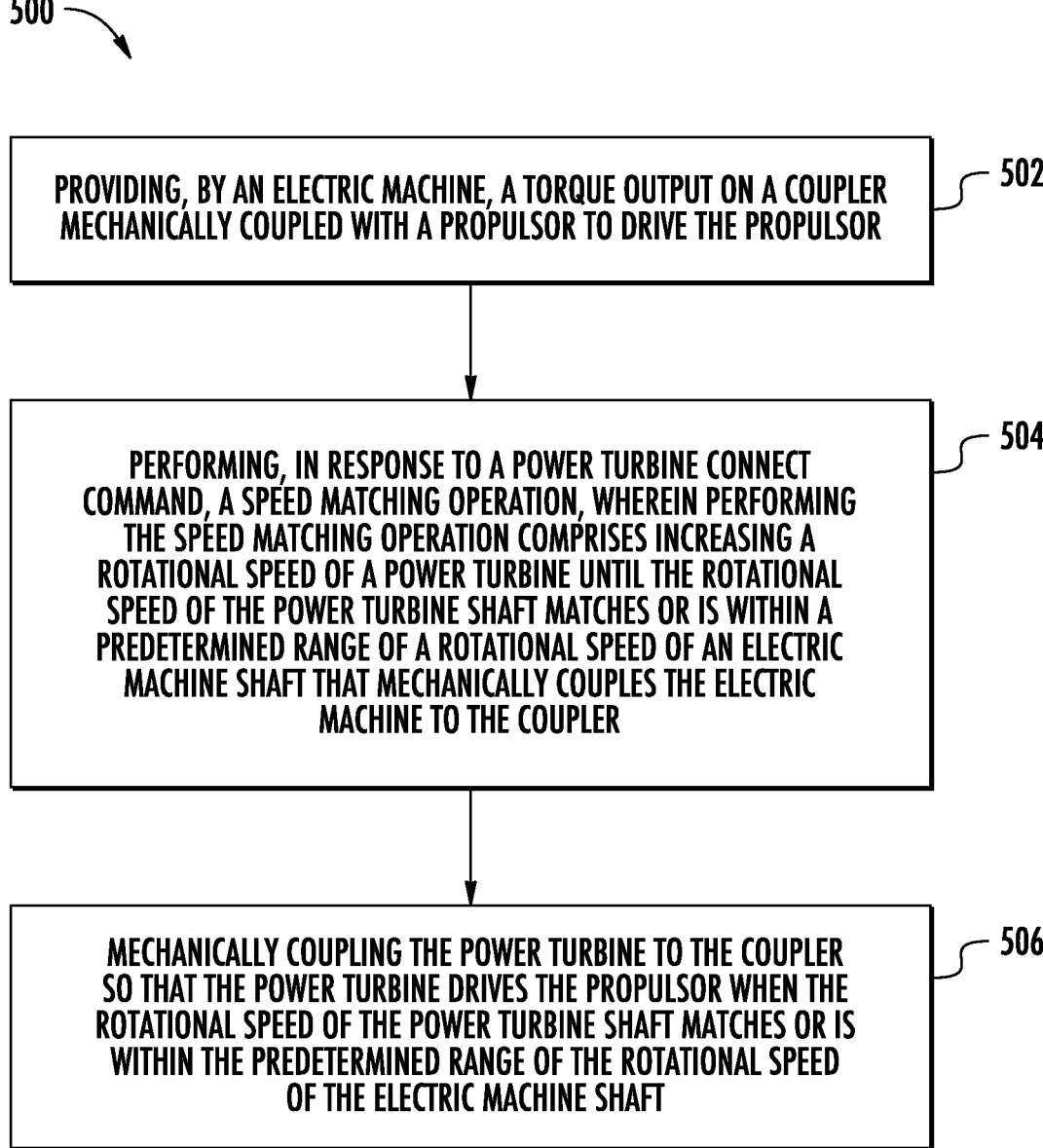

500

502

PROVIDING, BY AN ELECTRIC MACHINE, A TORQUE OUTPUT ON A COUPLER MECHANICALLY COUPLED WITH A PROPULSOR TO DRIVE THE PROPULSOR

504

PERFORMING, IN RESPONSE TO A POWER TURBINE CONNECT COMMAND, A SPEED MATCHING OPERATION, WHEREIN PERFORMING THE SPEED MATCHING OPERATION COMPRISES INCREASING A ROTATIONAL SPEED OF A POWER TURBINE UNTIL THE ROTATIONAL SPEED OF THE POWER TURBINE SHAFT MATCHES OR IS WITHIN A PREDETERMINED RANGE OF A ROTATIONAL SPEED OF AN ELECTRIC MACHINE SHAFT THAT MECHANICALLY COUPLES THE ELECTRIC MACHINE TO THE COUPLER

506

MECHANICALLY COUPLING THE POWER TURBINE TO THE COUPLER SO THAT THE POWER TURBINE DRIVES THE PROPULSOR WHEN THE ROTATIONAL SPEED OF THE POWER TURBINE SHAFT MATCHES OR IS WITHIN THE PREDETERMINED RANGE OF THE ROTATIONAL SPEED OF THE ELECTRIC MACHINE SHAFT

FIG. 13

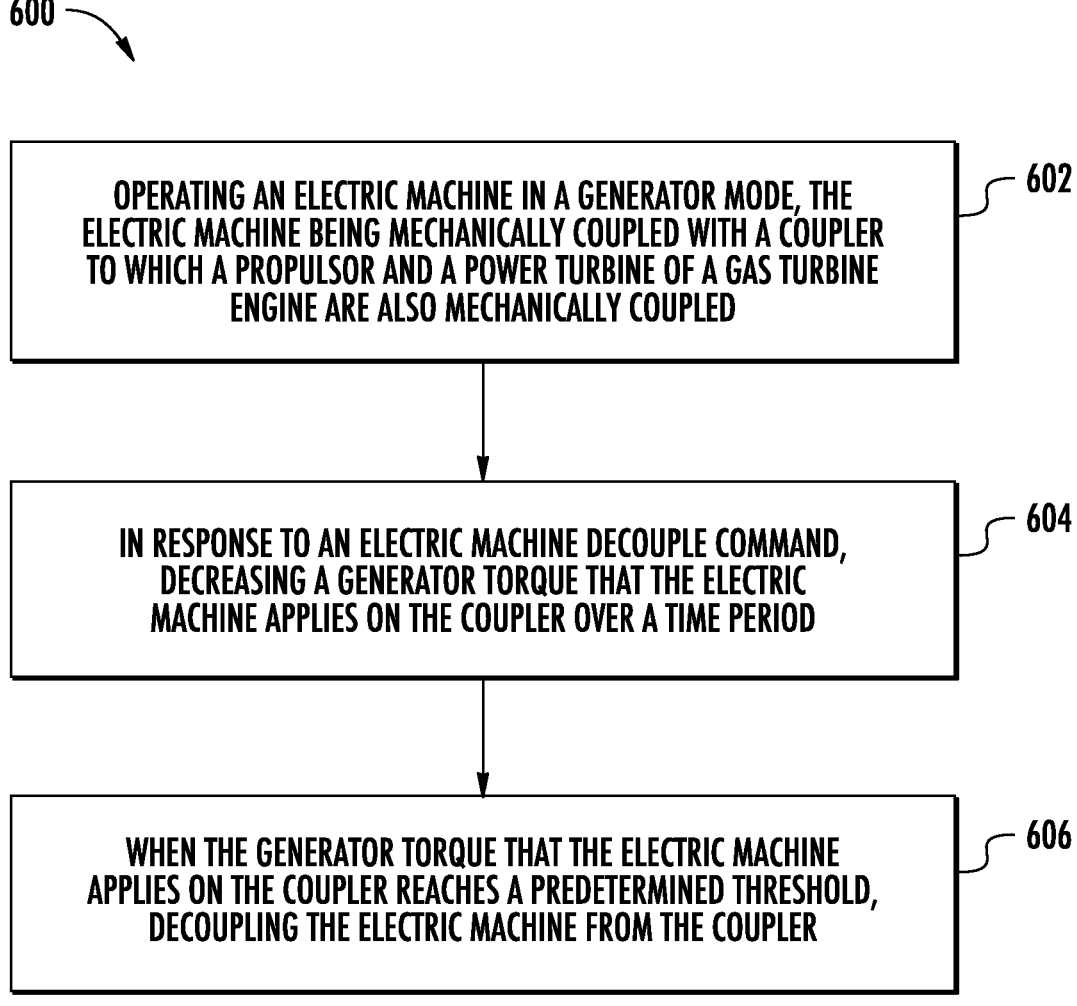

600

OPERATING AN ELECTRIC MACHINE IN A GENERATOR MODE, THE
ELECTRIC MACHINE BEING MECHANICALLY COUPLED WITH A COUPLER
TO WHICH A PROPULSOR AND A POWER TURBINE OF A GAS TURBINE
ENGINE ARE ALSO MECHANICALLY COUPLED          602

IN RESPONSE TO AN ELECTRIC MACHINE DECOUPLE COMMAND,
DECREASING A GENERATOR TORQUE THAT THE ELECTRIC
MACHINE APPLIES ON THE COUPLER OVER A TIME PERIOD          604

WHEN THE GENERATOR TORQUE THAT THE ELECTRIC MACHINE
APPLIES ON THE COUPLER REACHES A PREDETERMINED THRESHOLD,
DECOUPLING THE ELECTRIC MACHINE FROM THE COUPLER          606

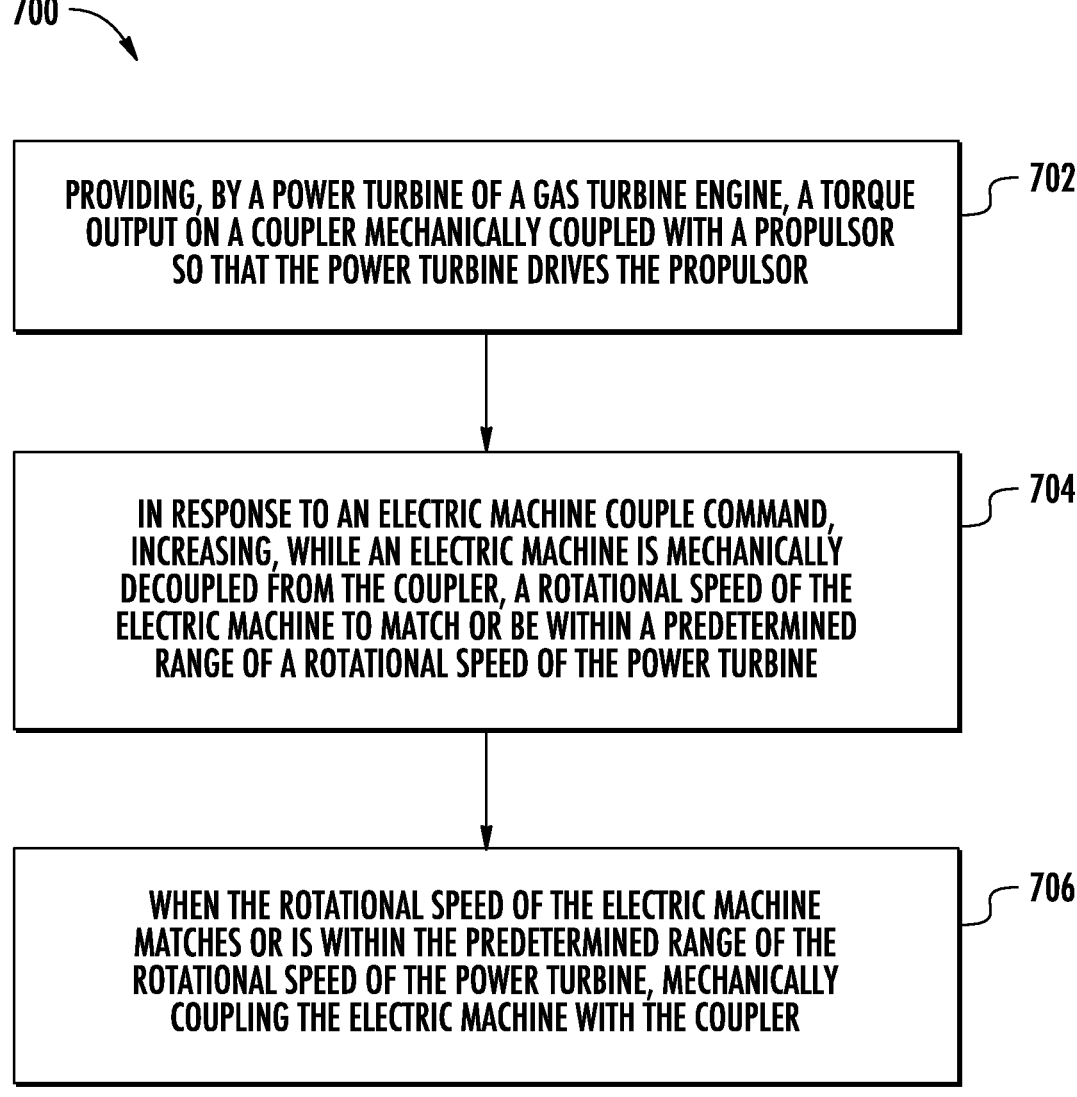

PROVIDING, BY A POWER TURBINE OF A GAS TURBINE ENGINE, A TORQUE OUTPUT ON A COUPLER MECHANICALLY COUPLED WITH A PROPULSOR SO THAT THE POWER TURBINE DRIVES THE PROPULSOR — 702

IN RESPONSE TO AN ELECTRIC MACHINE COUPLE COMMAND, INCREASING, WHILE AN ELECTRIC MACHINE IS MECHANICALLY DECOUPLED FROM THE COUPLER, A ROTATIONAL SPEED OF THE ELECTRIC MACHINE TO MATCH OR BE WITHIN A PREDETERMINED RANGE OF A ROTATIONAL SPEED OF THE POWER TURBINE — 704

WHEN THE ROTATIONAL SPEED OF THE ELECTRIC MACHINE MATCHES OR IS WITHIN THE PREDETERMINED RANGE OF THE ROTATIONAL SPEED OF THE POWER TURBINE, MECHANICALLY COUPLING THE ELECTRIC MACHINE WITH THE COUPLER — 706

FIG. 17

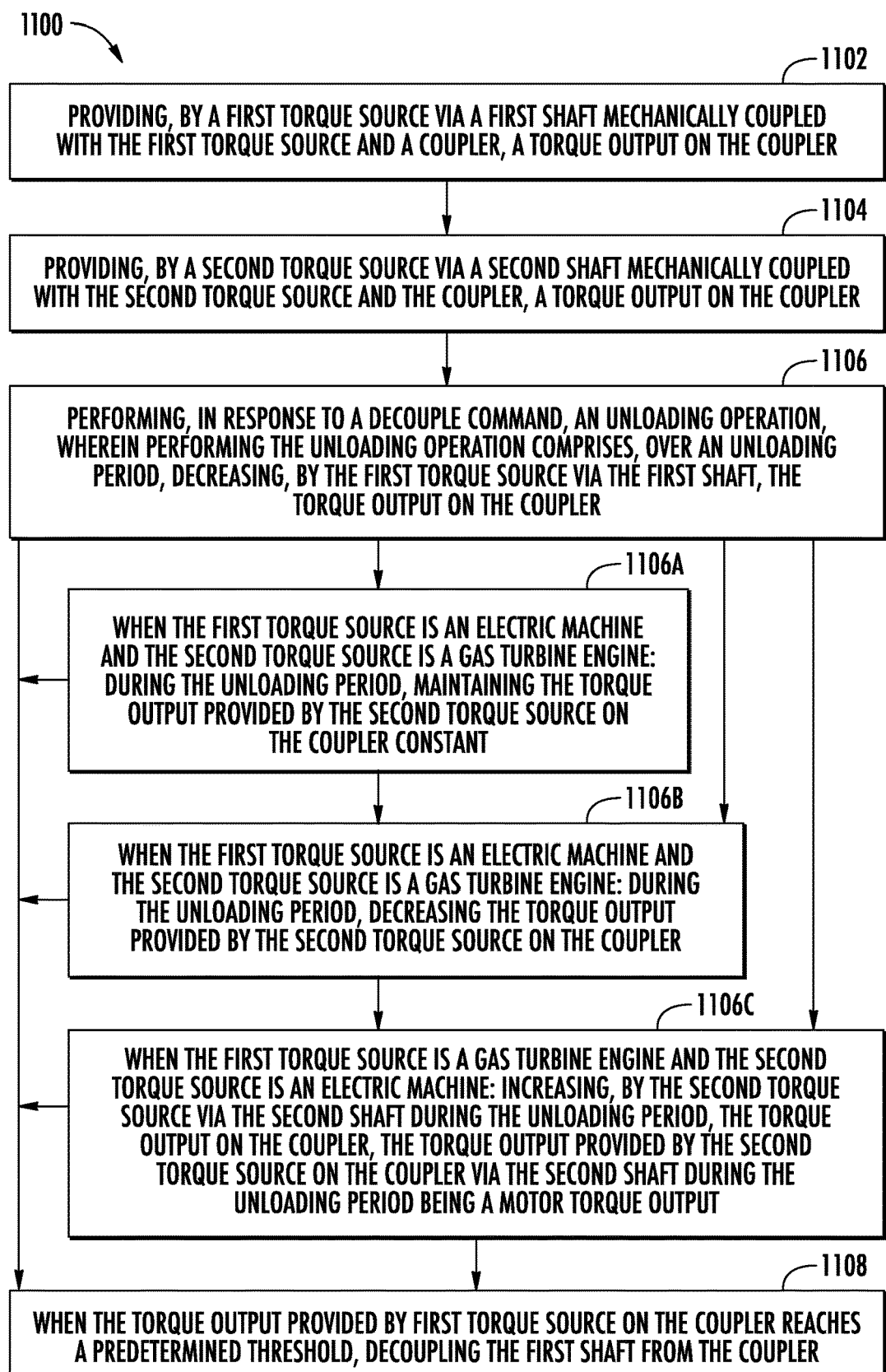

1100

1102
PROVIDING, BY A FIRST TORQUE SOURCE VIA A FIRST SHAFT MECHANICALLY COUPLED WITH THE FIRST TORQUE SOURCE AND A COUPLER, A TORQUE OUTPUT ON THE COUPLER

1104
PROVIDING, BY A SECOND TORQUE SOURCE VIA A SECOND SHAFT MECHANICALLY COUPLED WITH THE SECOND TORQUE SOURCE AND THE COUPLER, A TORQUE OUTPUT ON THE COUPLER

1106
PERFORMING, IN RESPONSE TO A DECOUPLE COMMAND, AN UNLOADING OPERATION, WHEREIN PERFORMING THE UNLOADING OPERATION COMPRISES, OVER AN UNLOADING PERIOD, DECREASING, BY THE FIRST TORQUE SOURCE VIA THE FIRST SHAFT, THE TORQUE OUTPUT ON THE COUPLER

1106A
WHEN THE FIRST TORQUE SOURCE IS AN ELECTRIC MACHINE AND THE SECOND TORQUE SOURCE IS A GAS TURBINE ENGINE: DURING THE UNLOADING PERIOD, MAINTAINING THE TORQUE OUTPUT PROVIDED BY THE SECOND TORQUE SOURCE ON THE COUPLER CONSTANT

1106B
WHEN THE FIRST TORQUE SOURCE IS AN ELECTRIC MACHINE AND THE SECOND TORQUE SOURCE IS A GAS TURBINE ENGINE: DURING THE UNLOADING PERIOD, DECREASING THE TORQUE OUTPUT PROVIDED BY THE SECOND TORQUE SOURCE ON THE COUPLER

1106C
WHEN THE FIRST TORQUE SOURCE IS A GAS TURBINE ENGINE AND THE SECOND TORQUE SOURCE IS AN ELECTRIC MACHINE: INCREASING, BY THE SECOND TORQUE SOURCE VIA THE SECOND SHAFT DURING THE UNLOADING PERIOD, THE TORQUE OUTPUT ON THE COUPLER, THE TORQUE OUTPUT PROVIDED BY THE SECOND TORQUE SOURCE ON THE COUPLER VIA THE SECOND SHAFT DURING THE UNLOADING PERIOD BEING A MOTOR TORQUE OUTPUT

1108
WHEN THE TORQUE OUTPUT PROVIDED BY FIRST TORQUE SOURCE ON THE COUPLER REACHES A PREDETERMINED THRESHOLD, DECOUPLING THE FIRST SHAFT FROM THE COUPLER

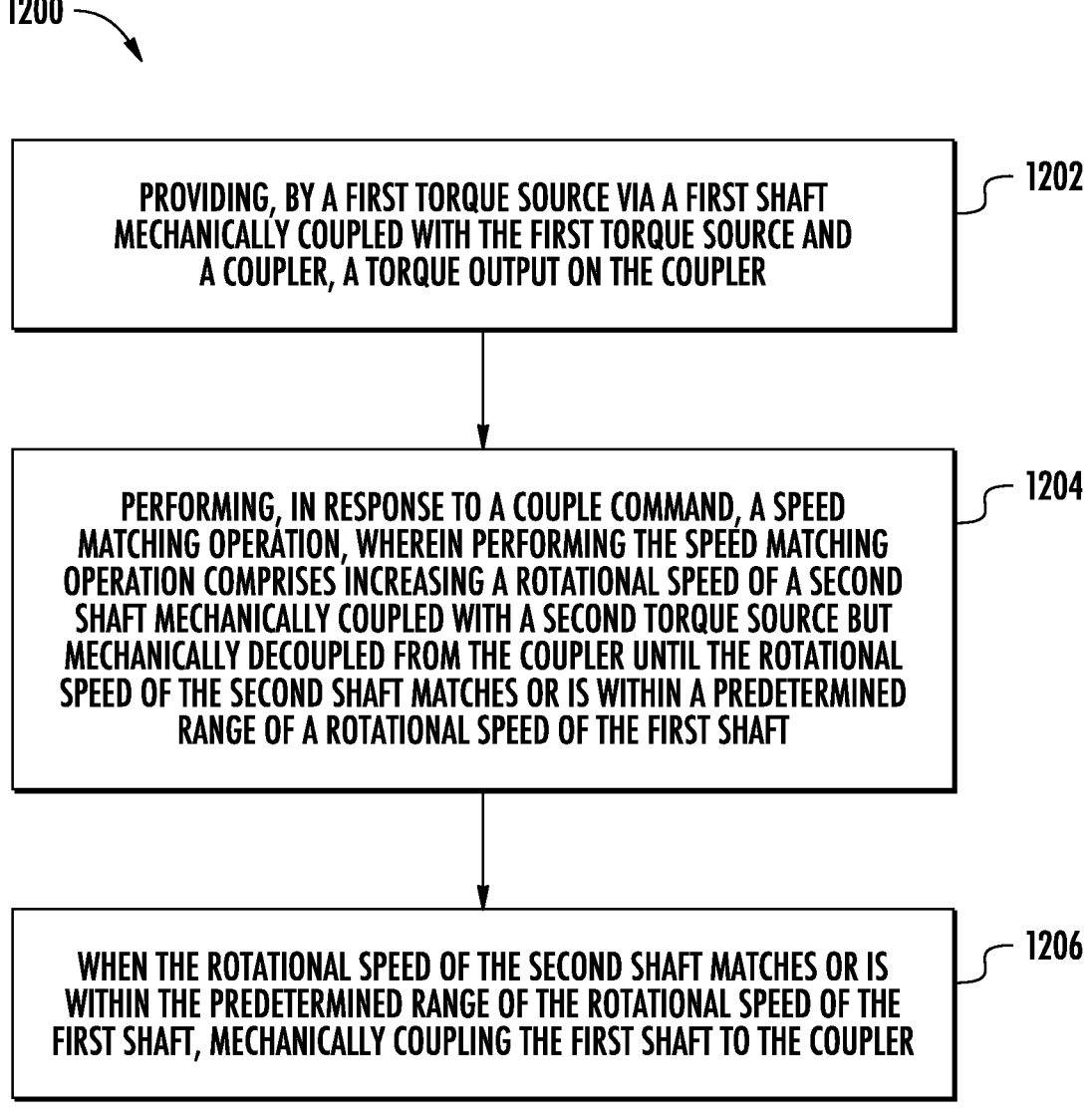

PROVIDING, BY A FIRST TORQUE SOURCE VIA A FIRST SHAFT MECHANICALLY COUPLED WITH THE FIRST TORQUE SOURCE AND A COUPLER, A TORQUE OUTPUT ON THE COUPLER — 1202

PERFORMING, IN RESPONSE TO A COUPLE COMMAND, A SPEED MATCHING OPERATION, WHEREIN PERFORMING THE SPEED MATCHING OPERATION COMPRISES INCREASING A ROTATIONAL SPEED OF A SECOND SHAFT MECHANICALLY COUPLED WITH A SECOND TORQUE SOURCE BUT MECHANICALLY DECOUPLED FROM THE COUPLER UNTIL THE ROTATIONAL SPEED OF THE SECOND SHAFT MATCHES OR IS WITHIN A PREDETERMINED RANGE OF A ROTATIONAL SPEED OF THE FIRST SHAFT — 1204

WHEN THE ROTATIONAL SPEED OF THE SECOND SHAFT MATCHES OR IS WITHIN THE PREDETERMINED RANGE OF THE ROTATIONAL SPEED OF THE FIRST SHAFT, MECHANICALLY COUPLING THE FIRST SHAFT TO THE COUPLER — 1206

FIG. 25

HYBRID-ELECTRIC PROPULSION SYSTEM EQUIPPED WITH A COUPLER FOR SWITCHING BETWEEN MODES OF OPERATION

PRIORITY INFORMATION

The present application claims priority to U.S. Provisional Patent Application No. 63/390,327 filed on Jul. 19, 2022, which is incorporated by reference herein in its entirety for all purposes.

FIELD

The present disclosure relates to hybrid-electric propulsion systems for aircraft.

BACKGROUND

Hybrid-electric propulsion systems are being developed to improve an efficiency of aircraft. Such propulsion systems can include a gas turbine engine, an electric machine, and a propulsor, such as a fan or propeller. The integration of an electric machine with a gas turbine engine may present certain operational challenges in balancing or shifting the power between the electric machine and the gas turbine engine, maximizing the efficiency of the entire propulsion system, and/or coupling/decoupling these components from one another for safety or other operational purposes. Accordingly, a system designed to address one or more of these challenges would be a welcome addition to the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 11 a flow diagram of a method of decoupling a turbine from a coupler in accordance with an exemplary aspect of the present disclosure;

FIG. 13 a flow diagram of a method of coupling a turbine to a coupler in accordance with an exemplary aspect of the present disclosure;

FIG. 15 a flow diagram of a method of decoupling an electric machine from a coupler in accordance with an exemplary aspect of the present disclosure;

FIG. 17 a flow diagram of a method of coupling an electric machine to a coupler in accordance with an exemplary aspect of the present disclosure;

FIG. 24 is a flow diagram for a method of operating a propulsion assembly to perform a decoupling operation;

FIG. 25 is a flow diagram for a method of operating a propulsion assembly to perform a coupling operation.

DETAILED DESCRIPTION

Figure 1:
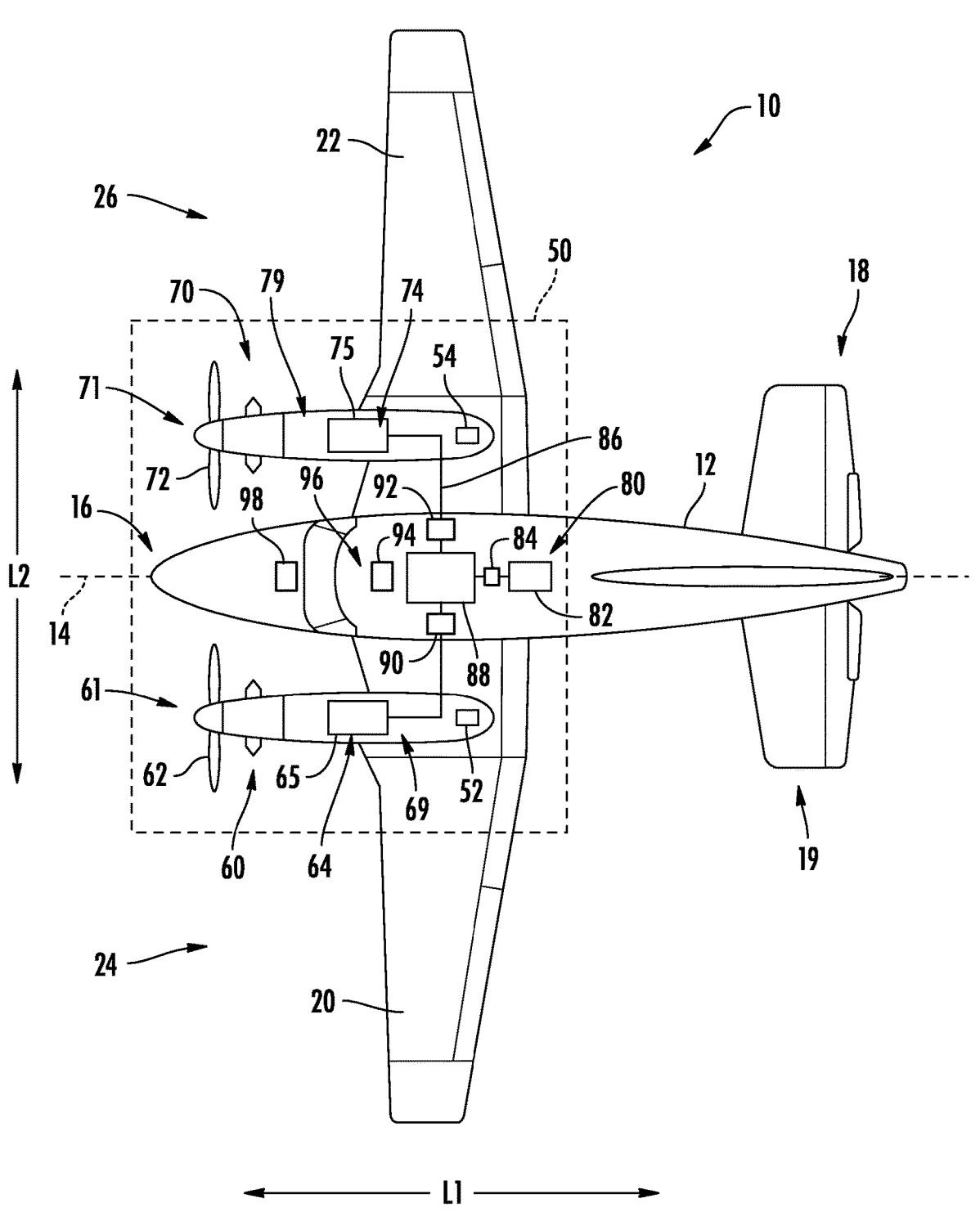
FIG. 1 is a schematic top view of an exemplary aircraft having a hybrid-electric propulsion system in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the figures. However, it is to be understood that the embodiments may assume various alternative variations, except where expressly specified to the contrary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

The term "substantially" means within ten percent (10%) of the stated value.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source.

Example gas turbine engines include turbofan engines, turboprop engines, turbojet engines, turboshaft engines, etc.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The integration of an electric machine with a gas turbine engine in a hybrid-electric propulsion system may present operational challenges in balancing or shifting the power between the electric machine and the gas turbine engine, maximizing the efficiency of the entire propulsion system, and/or coupling/decoupling these components from one another for safety or other operational purposes. In some instances, as one example, it may be desirable to switch the torque source for driving a propulsor of an aircraft from a gas turbine engine to an electric machine, or vice versa. Coupling and/or decoupling components to switch between these modes of operation in a smooth manner has traditionally been challenging. In other instances, as another example, it may be desirable to decouple an electric machine from a spool including a turbine upon detection of an electric machine failure. By decoupling the electric machine from the spool, the electric machine may cease causing parasitic drag or acting as a power drain on the turbine. Traditionally, decoupling an electric machine from a spool with a turbine has been accomplished by using a cutter to "cut" or otherwise permanently decouple the electric machine from the spool. Repair or replacement of the electric machine and spool may require significant effort and time.

Generally, it is desirable to switch a hybrid-electric propulsion system between modes of operation in a safe and reliable manner. It is further desirable to switch between modes of operation with a solution that allows components to be coupled and decoupled as desired without need for more permanent solutions, such as by cutting a shaft of a spool. In accordance with the inventive aspects of the present disclosure, assemblies and methods are disclosed for selectively mechanically coupling/decoupling an electric machine and a spool having a turbine from one another in a smooth manner. As will be explained further herein, this may be accomplished by unloading these components and synchronizing their speeds or torques prior to a decoupling or coupling operation. A coupler is provided to facilitate the selective mechanical coupling/decoupling of these features from one another.

Referring now to the drawings, wherein identical numerals indicate the same elements throughout the figures, FIG. 1 is a schematic top view of an aircraft 10 in accordance with an exemplary aspect of the present disclosure. As shown, the aircraft 10 defines a longitudinal direction L1 and a longitudinal centerline 14 that extends along the longitudinal direction L1 through the aircraft 10. The aircraft 10 also defines a lateral direction L2 extending orthogonal to the longitudinal direction L1. The aircraft 10 extends between a forward end 16 and an aft end 18, e.g., along the longitudinal direction L1.

The aircraft 10 includes a fuselage 12 extending longitudinally from the forward end 16 of the aircraft 10 to the aft end 18 of the aircraft 10. The aircraft 10 includes an empennage 19 at its aft end 18. Additionally, the aircraft 10 includes a wing assembly including a first, port side wing 20 and a second, starboard side wing 22. The first and second wings 20, 22 each extend laterally outward from the fuselage 12 along the lateral direction L2. The first wing 20 and a portion of the fuselage 12 together define a first side 24 of the aircraft 10, and the second wing 22 and another portion of the fuselage 12 together define a second side 26 of the aircraft 10. For this embodiment, the first side 24 of the aircraft 10 is configured as the port side of the aircraft 10 and the second side 26 of the aircraft 10 is configured as the starboard side of the aircraft 10.

Each wing 20, 22 includes various control surfaces, e.g., flaps, ailerons, trim surfaces, etc. for controlling and maneuvering the aircraft 10. The empennage 19 of the aircraft 10 includes a vertical stabilizer having a rudder flap for yaw control and a pair of horizontal stabilizers each having an elevator flap for pitch control. It should be appreciated, however, that in other embodiments of the present disclosure, the aircraft 10 may additionally or alternatively include any other suitable configuration. For example, in other embodiments, the aircraft 10 may include any other configuration of stabilizers.

Further, the aircraft 10 of FIG. 1 includes a hybrid-electric propulsion system 50. The hybrid-electric propulsion system 50 includes a first propulsion assembly 60 and a second propulsion assembly 70. For the embodiment depicted, the first propulsion assembly 60 and second propulsion assembly 70 are each configured in a wing-mounted configuration. The first propulsion assembly 60 is mounted to the first wing 20 and the second propulsion assembly 70 is mounted to the second wing 22. However, one or both of the first and second propulsion assemblies 60, 70 may be mounted at any other suitable location in other embodiments.

Figure 2:
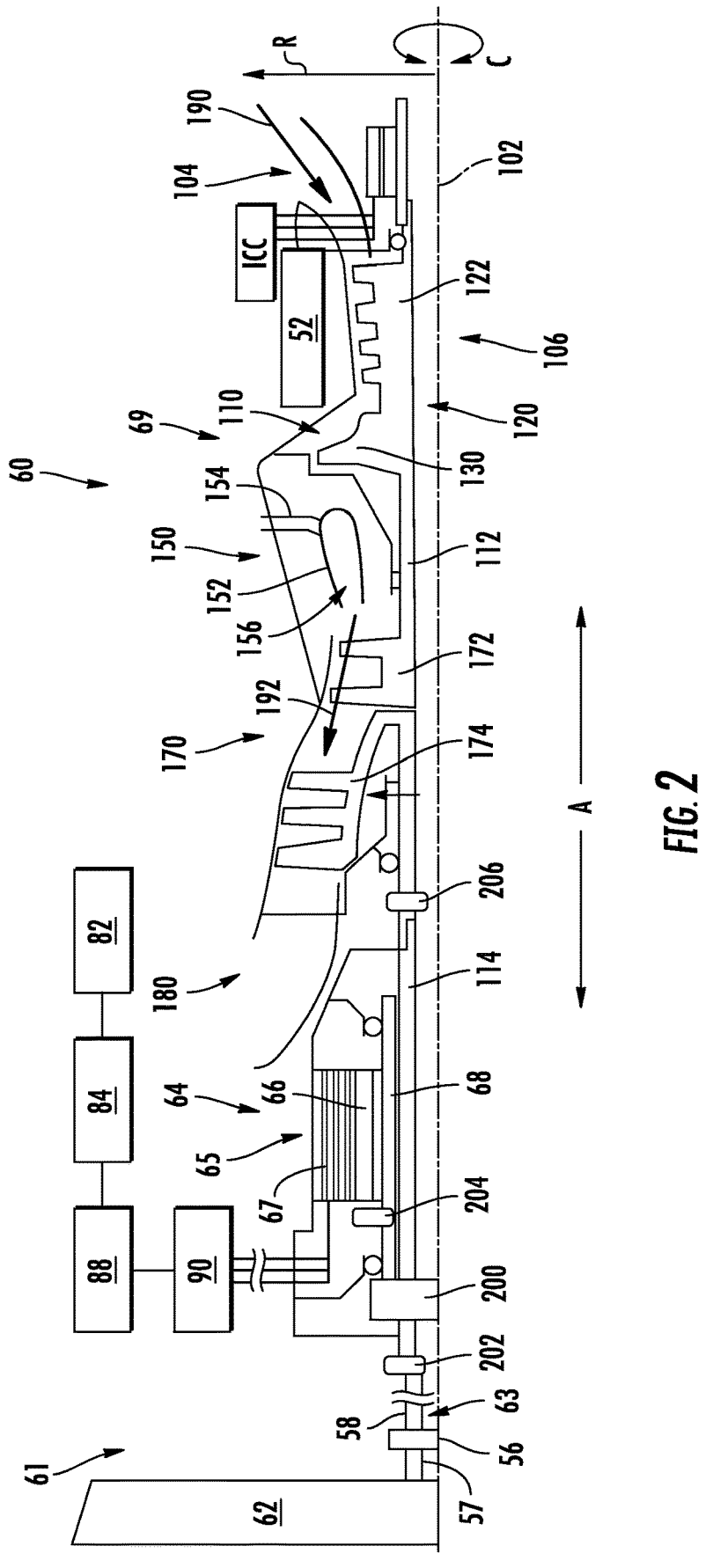
FIG. 2 is a schematic cross-sectional view of a propulsion assembly of the aircraft of FIG. 1.

The first propulsion assembly 60 of the hybrid-electric propulsion system 50 includes a propulsor assembly 61, an electric machine assembly 64, and a gas turbine engine 69. For this embodiment, the propulsor assembly 61, or propulsor means, has a propulsor 62 and a propulsor shaft 63 (FIG. 2) to which the propulsor 62 is mechanically coupled. The propulsor 62 can be a propeller or a fan, for example. In some embodiments, the propulsor shaft 63 is a single shaft that is mechanically coupled to a propulsor coupler shaft of a coupler 200 at one end and is mechanically coupled with the propulsor 62 at an opposing end. In other embodiments, optionally, a gearbox 56 can be positioned along the propulsor shaft 63 as shown in FIG. 2. In this regard, the propulsor shaft 63 can include a first propulsor shaft 57 mechanically coupling the propulsor 62 with the gearbox 56 and a second propulsor shaft 58 mechanically coupling the gearbox 56 with the coupler 200. The gearbox 56 can include a plurality of gears for stepping down the rotational speed of the propulsor shaft 63 to provide a more efficient rotational speed of the propulsor 62.

The electric machine assembly 64 includes an electric machine 65. For this embodiment, the electric machine 65 is a combination motor/generator. In this regard, the electric machine 65 can function as a torque source to drive the propulsor 62 in some modes of operation, e.g., to produce thrust, and may be driven to generate electrical power in other modes of operation. Moreover, for this embodiment, the gas turbine engine 69 is configured as a turboprop engine. As will be provided in more detail herein, the propulsor 62, the gas turbine engine 69, and the electric machine 65 of the first propulsion assembly 60 are each selectively mechanically engageable with a coupler. The coupler is operable to transmit mechanical power between the gas turbine engine 69 and the propulsor 62, between the electric machine 65 and the propulsor 62, and/or between the electric machine 65 and the gas turbine engine 69 depending on the commanded mode of operation.

The second propulsion assembly 70 is configured in a similar manner as the first propulsion assembly 60. Particularly, the second propulsion assembly 70 includes a propulsor assembly 71, an electric machine assembly 74, and a gas turbine engine 79. The propulsor assembly 71 has a propulsor 72 and a propulsor shaft to which the propulsor 72 is mechanically coupled. The propulsor 72 can be a propeller or a fan, for example. The electric machine assembly 74 includes an electric machine 75. The electric machine 65 can be a combination motor/generator. In this regard, the electric machine 75 can function as a torque source to drive the propulsor 72 in some modes of operation, e.g., to produce thrust, and may be driven to generate electrical power in other modes of operation. Moreover, for this embodiment, the gas turbine engine 79 is configured as a turboprop engine just like the gas turbine engine 69 of the first propulsion assembly 60. The propulsor 72, the gas turbine engine 79, and the electric machine 75 of the second propulsion assembly 70 are each selectively mechanically engageable with a coupler. The coupler of the second propulsion assembly 70 is operable to transmit mechanical power between the gas turbine engine 79 and the propulsor 72, between the electric machine 75 and the propulsor 72, and/or between the electric machine 75 and the gas turbine engine 79 depending on the commanded mode of operation.

The hybrid-electric propulsion system 50 further includes an electric energy storage system 80. The electric energy storage system 80 can include one or more electric energy storage devices, such as batteries, supercapacitor arrays, one or more ultracapacitor arrays, some combination of the foregoing, etc. For instance, for this embodiment, the electric energy storage system 80 includes a battery 82. The battery 82 is electrically coupled with a direct current to direct current (DC/DC) converter 84 or voltage-regulating power supply. In some embodiments, the DC/DC converter 84 can be a bidirectional DC/DC converter. In this regard, the DC/DC converter 84 can control the electrical power drawn from the battery 82 and the electrical power provided to the battery 82 depending on whether it is desired to discharge or charge the battery 82. The DC/DC converter 84 is electrically coupled with a power bus 86.

A power distribution unit 88 is positioned along the power bus 86. The power distribution unit 88 can be controlled to distribute electrical power to various loads of the aircraft 10. For instance, electrical power drawn from the battery 82 can be directed to the power distribution unit 88 across the power bus 86, and the power distribution unit 88 can distribute the electrical power to various aircraft loads, such as the electric machine 65 and/or the electric machine 76. A first alternating current to direct current (AC/DC) converter 90 (or first DC/AC converter 90) associated with the electric machine 65 can be positioned along the power bus 86 for converting direct current into alternating current or vice versa. Similarly, a second AC/DC converter 92 (or second DC/AC converter) associated with the electric machine 76 can be positioned along the power bus 86 for converting direct current into alternating current or vice versa. The first AC/DC converter 90 and the second AC/DC converter 92 can both be bidirectional converters.

The power distribution unit 88 and other controllable electrical elements of the hybrid-electric propulsion system 50 can be managed by a power management system. The power management system can include a supervisor controller 94 operable to control or provide data to the power distribution unit 88, the DC/DC converter 84, the first AC/DC converter 90, and the second AC/DC converter 92, among other elements, and based on such data, the switching elements of these devices can perform their respective duty cycles to control the electrical power in the hybrid-electric propulsion system 50.

As further shown in FIG. 1, the supervisor controller 94 can form a part of a computing system 96 of the aircraft 10. The computing system 96 of the aircraft 10 can include one or more processors and one or more memory devices embodied in one or more computing devices. For instance, as depicted in FIG. 1, the computing system 96 includes the supervisor controller 94 as well as other computing devices, such as computing device 98 and engine controllers 52, 54 associated with the first propulsion assembly 60 and the second propulsion assembly 70, respectively. The engine controllers 52, 54 may be, for example, Electronic Engine Controllers (EEC) or Electronic Control Units (ECU) that form part of a Full Authority Digital Engine Control (FADEC) system. The computing devices of the computing system 96 can be communicatively coupled with one another via a communication network. For instance, the computing device 98 located in the cockpit of the aircraft 10, the engine controllers 52, 54, and the supervisor controller 94 can be communicatively coupled with one another via one or more communication links of the communication network. The communication links can include one or more wired or wireless communication links.

For this embodiment, the computing device 98 is configured to receive and process inputs, e.g., from a pilot or other crew members, and/or other information. In this manner, as one example, the one or more processors of the computing device 98 can receive an input indicating a command to connect or disconnect, or stated another way, mechanically couple or decouple, the propulsor 62, the gas turbine engine 69, and/or the electric machine 65 to or from one another and/or the propulsor 72, the gas turbine engine 79, and/or the electric machine 76 to or from one another. In response to the input, the computing device 98 can route the command or instructions to the supervisor controller 94 to manage the electrical power in the hybrid-electric propulsion system 50 and to one or both of the engine controllers 52, 54 so that they may control one or more controllable devices (e.g., one or more actuators) to implement the coupling or decoupling operation in accordance with the command.

The supervisor controller 94 and other computing devices of the computing system 96 of the aircraft 10 may be configured in the same or similar manner as the computing devices of the computing system 1000 described below with reference to FIG. 26.

FIG. 2 is a schematic cross-sectional view of the first propulsion assembly 60 of FIG. 1. For the depicted embodiment of FIG. 2, the propulsor 62 is a propeller, the gas turbine engine 69 is a reverse-flow engine configured as a turboprop, and the electric machine 65 is a combination motor/generator, as previously noted. The second propulsion assembly 70 can be configured in a same or similar manner as the first propulsion assembly 60 of FIG. 1.

As shown, the gas turbine engine 69 defines an axial direction A (extending parallel to a longitudinal centerline 102 provided for reference), a radial direction R, and a circumferential direction C disposed about the longitudinal centerline 102. The gas turbine engine 69 includes a core turbine engine 106. The core turbine engine 106 includes a tubular cowl that encloses various elements. The core turbine engine 106 includes, in a serial flow relationship, a compressor section 120, a combustion section 150, a turbine section 170, and an exhaust section 180. The compressor section 120 includes an axial compressor 122 and a centrifugal impeller 130 positioned downstream of the axial compressor 122. The combustion section 150 includes a combustor 152 and a fuel delivery system, including a plurality of fuel nozzles 154 disposed about the longitudinal centerline 102 and spaced apart along the circumferential direction C (only one fuel nozzle 154 is depicted in FIG. 2). The combustor 152 defines a combustion chamber 156.

The turbine section 170 includes a gas generation turbine 172 (or a high pressure turbine) and a free or power turbine 174 (or a low pressure turbine). For this embodiment, the gas generation turbine 172 drives the compressor section 120, or more particularly, the axial compressor 122 and the centrifugal impeller 130. The power turbine 174 rotates about its axis of rotation independently of the gas generation turbine 172. The compressor section 120, combustion section 150, turbine section 170, and the exhaust section 180 are in fluid communication with each other and define a core air flowpath 110.

A gas generation shaft 112 drivingly connects the gas generation turbine 172 to the axial compressor 122 and the centrifugal impeller 130. The gas generation shaft 112, the axial compressor 122, the centrifugal impeller 130, and the gas generation turbine 172 collectively form a gas generation spool (or high pressure spool). A power turbine shaft 114 is mechanically coupled with the power turbine 174. The power turbine shaft 114 and the power turbine 174 collectively form a power spool (or low pressure spool) of the gas turbine engine 69. The power spool is not mechanically connected to the gas generation spool. The power turbine shaft 114 is spaced from the gas generation shaft 112 along the axial direction A as shown in FIG. 2.

During operation of the gas turbine engine 69, incoming air passes through blades of the propulsor 62, and a volume of air 190 is urged into an inlet 104 of the core turbine engine 106. The air 190 flows downstream to the compressor section 120. The axial compressor 122 progressively compresses the air 190. The impeller 130 further compresses the air 190 and directs the compressed air 190 into the combustion section 150 where the compressed air 190 mixes with fuel. The air/fuel mixture is combusted in the combustor 152 to provide combustion gases 192.

The combustion gases 192 flow through the gas generation turbine 172, which includes one or more sequential stages of turbine stator vanes and one or more sequential stages of turbine blades. The turbine blades extract thermal and/or kinetic energy from the combustion gases 192. Combustion gases 192 subsequently flow through the power turbine 174, where an additional amount of energy is extracted through additional stages of turbine stator vanes and turbine blades. The energy extraction from the gas generation turbine 172 supports operation of the axial compressor 122 and the impeller 130 through the gas generation shaft 112 and the energy extraction from the power turbine 174 can support operation of the propulsor 62 and/or electric machine 65 as described more fully below. The combustion gases 192 exit the gas turbine engine 69 through the exhaust section 180.

It should be appreciated that the gas turbine engine 69 depicted in FIG. 2 is provided by way of example only, and that in other embodiments, the gas turbine engine 69 may have other suitable configurations. For instance, in other embodiments, the gas turbine engine 69 may instead be configured as any other suitable turbine engine, such as a turbofan engine, turbojet engine, turboshaft, internal combustion engine, etc. Furthermore, although the gas turbine engine 69 depicted in FIG. 2 and described above is an aeronautical gas turbine engine for use with an aircraft, e.g., the aircraft 10 of FIG. 1, in other embodiments, the gas turbine engine 69 may be configured for any number of applications, such as a land-based, industrial gas turbine engine or an aeroderivative gas turbine engine.

As further depicted in FIG. 2, in accordance with inventive aspects of the present disclosure, the first propulsion assembly 60 includes the coupler 200. The coupler 200 can be selectively mechanically coupled with the power turbine 174, the propulsor 62, and the electric machine 65. In this regard, the coupler 200 is a means for selectively mechanically coupling/decoupling the various torque sources of the first propulsion assembly 60. Generally, the coupler 200 transmits mechanical power between the power turbine 174, the propulsor 62, and the electric machine 65, depending on which of these elements are mechanically coupled with the coupler 200. Specifically, the power turbine shaft 114 can be selectively mechanically coupled with the coupler 200, which selectively mechanically couples the power turbine 174 with the coupler 200. A propulsor shaft 63 mechanically coupled with the propulsor 62 can be selectively mechanically coupled with the coupler 200, which selectively mechanically couples the propulsor 62 with the coupler 200. An electric machine shaft 68 mechanically coupled with the electric machine 65 can be selectively mechanically coupled with the coupler 200, which selectively mechanically couples the electric machine 65 with the coupler 200. The electric machine shaft 68 is mechanically coupled with a rotor 66 of the electric machine 65. The rotor 66 is rotatable about an axis of rotation relative to a stator 67 of the electric machine 65. In some embodiments, the electric machine shaft 68 can be integral with or form part of the rotor 66 of the electric machine 65.

When the power turbine 174 and the propulsor 62 are mechanically coupled with the coupler 200, mechanical power can be transmitted between the power turbine 174 and the propulsor 62. For instance, the power turbine 174 can drive the propulsor 62 to produce thrust for the aircraft 10 (FIG. 1). When the electric machine 65 is mechanically coupled with the coupler 200 in addition to the power turbine 174 and the propulsor 62, the electric machine 65 can be used as an electric motor to assist the power turbine 174 with driving the propulsor 62, or alternatively, the power turbine 174 can drive the electric machine 65 to function as an electrical generator to generate electrical power.

When the electric machine 65 and the propulsor 62 are mechanically coupled with the coupler 200, but not the power turbine 174, mechanical power can be transmitted between the electric machine 65 and the propulsor 62. As one example, the electric machine 65 can be used as an electric motor to drive the propulsor 62. As another example, the propulsor 62 can be used to drive the electric machine 65 in a generator mode so that the electric machine 65 generates electrical power, e.g., during an approach phase of a flight.

When the electric machine 65 and the power turbine 174 are mechanically coupled with the coupler 200, but not the propulsor 62, mechanical power can be transmitted between the electric machine 65 and the power turbine 174. As one example, the aircraft 10 can be parked on the ground and it may be desirable to charge the battery 82, and accordingly, the gas turbine engine 69 can be operated so that the power turbine 174 drives the electric machine 65. In this way, the electric machine 65 can generate electrical power that can be used to charge the battery 82. It will be appreciated that other coupling scenarios are possible with respect to the power turbine 174, the propulsor 62, and the electric machine 65 being mechanically coupled with the coupler 200.

As further shown in FIG. 2, the first propulsion assembly 60 includes a plurality of sensors, including but not limited to, a resolver 202 associated with the propulsor shaft 63, a resolver 204 associated with the electric machine shaft 68, and a resolver 206 associated with the power turbine shaft 114. The resolvers 202, 204, 206 are operable to measure or sense a rotational speed and an angular position of their respective shafts 63, 68, 114. The resolvers 202, 204, 206 can output such data, e.g., to the engine controller 52 and/or to one or more processors operable to control coupling/decoupling operation of the coupler 200. Such data can be used to facilitate smooth coupling and/or decoupling of the propulsor 62, the electric machine 65, and/or power turbine 174 to or from the coupler 200 as will be explained in detail herein. The resolvers 202, 204, 206 can be directly mechanically coupled with their respective shafts 63, 68, 114 or may be offset therefrom. In alternative embodiments, each shaft 63, 68, 114 may include a speed senor and a separate position sensor.

Figure 3:
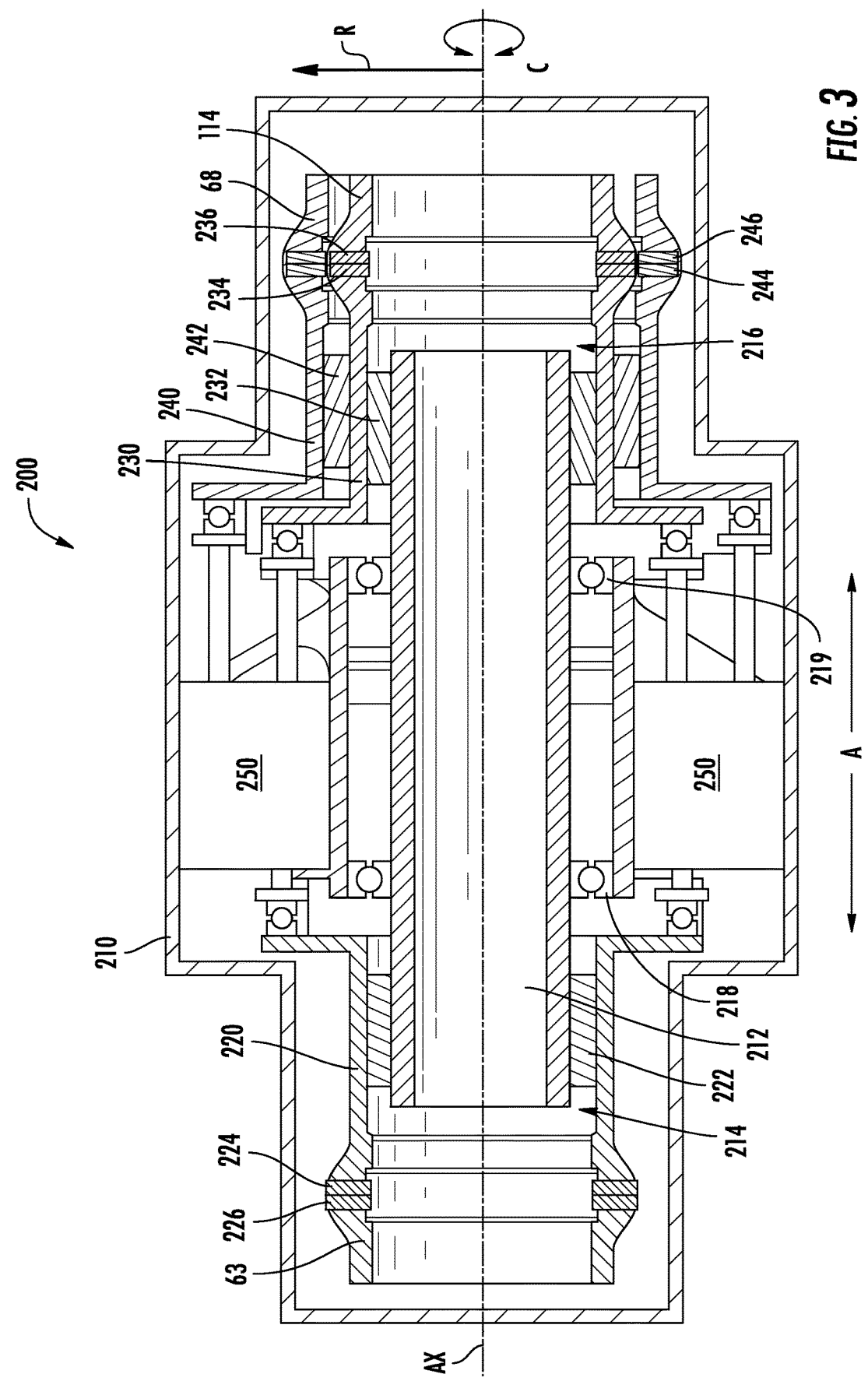
FIG. 3 is a cross-sectional view of a coupler of the propulsion assembly of FIG. 2.

FIG. 3 is a cross-sectional view of the coupler 200. As depicted, the coupler 200 includes a housing 210 in which a plurality of components are disposed. The coupler 200 includes a transmission shaft 212 that extends between a first end 214 and a second end 216, e.g., along the axial direction A. The transmission shaft 212 is rotatable about an axis of rotation AX and is supported by bearings, including a first bearing 218 disposed proximate the first end 214 of the transmission shaft 212 and a second bearing 219 disposed proximate the second end 216 of the transmission shaft 212.

The first end 214 of the transmission shaft 212 is mechanically coupled with a coupler propulsor shaft 220. A linear bearing 222 is disposed between the transmission shaft 212 and the coupler propulsor shaft 220, e.g., along the radial direction R. The linear bearing 222 facilitates linear movement of the coupler propulsor shaft 220 relative to the transmission shaft 212. The linear bearing 222 can be a ball spline, for example. The coupler propulsor shaft 220 is selectively mechanically engageable with the propulsor shaft 63. The coupler propulsor shaft 220 can include torque transmitting features that engage with and transmit torque to torque transmitting features of the propulsor shaft 63 (or vice versa). The torque transmitting features of the shafts 220, 63 can couple the shafts 220, 63 in, e.g., a dog teeth coupling, a curvic coupling, etc. For this example embodiment, the coupler propulsor shaft 220 includes teeth 224 that can selectively mesh with or otherwise engage with teeth 226 of the propulsor shaft 63. In this regard, the propulsor shaft 63 is selectively mechanically engageable with the coupler propulsor shaft 220. In FIG. 3, the teeth 224 of the coupler propulsor shaft 220 are engaged with the teeth 226 of the propulsor shaft 63. In FIG. 3, the teeth 224, 226 are shown schematically.

The second end 216 of the transmission shaft 212 is mechanically coupled with a coupler turbine shaft 230. A linear bearing 232 is disposed between the transmission shaft 212 and the coupler turbine shaft 230, e.g., along the radial direction R. The linear bearing 232 facilitates linear movement of the coupler turbine shaft 230 relative to the transmission shaft 212. The coupler turbine shaft 230 is selectively mechanically engageable with the power turbine shaft 114. The coupler turbine shaft 230 can include torque transmitting features that engage with and transmit torque to torque transmitting features of the power turbine shaft 114 (or vice versa). The torque transmitting features of the shafts 230, 114 can couple the shafts 230, 114 in, e.g., a dog teeth coupling, a curvic coupling, etc. For this example embodiment, the coupler turbine shaft 230 includes teeth 234 that can selectively mesh with or otherwise engage with teeth 236 of the power turbine shaft 114. In this regard, the power turbine shaft 114 is selectively mechanically engageable with the coupler turbine shaft 230. In FIG. 3, the teeth 234 of the coupler turbine shaft 230 are engaged with the teeth 236 of the power turbine shaft 114. In FIG. 3, the teeth 234, 236 are shown schematically.

The second end 216 of the transmission shaft 212 is also mechanically coupled with a coupler electric machine shaft 240. A linear bearing 242 is disposed between the coupler turbine shaft 230 and the coupler electric machine shaft 240, e.g., along the radial direction R. The linear bearing 242 facilitates linear movement of the coupler electric machine shaft 240 relative to the coupler turbine shaft 230. The coupler electric machine shaft 240 is selectively mechanically engageable with the electric machine shaft 68. The coupler electric machine shaft 240 can include torque transmitting features that engage with and transmit torque to torque transmitting features of the electric machine shaft 68 (or vice versa). The torque transmitting features of the shafts 240, 68 can couple the shafts 240, 68 in, e.g., a dog teeth coupling, a curvic coupling, etc. For the depicted embodiment, the coupler electric machine shaft 240 includes teeth 244 that can selectively mesh with or otherwise engage with teeth 246 of the electric machine shaft 68. In this way, the electric machine shaft 68 is selectively mechanically engageable with the coupler electric machine shaft 240. In FIG. 3, the teeth 234 of the coupler electric machine shaft 240 are engaged with the teeth 236 of the electric machine shaft 68. In FIG. 3, the teeth 244, 246 are shown schematically.

As further depicted in FIG. 3, the coupler 200 includes one or more actuators 250. For this example embodiment, two linear actuators are shown. The one or more actuators 250 can be controlled to selectively mechanically engage or disengage the propulsor shaft 63, the power turbine shaft 114, and/or the electric machine shaft 68 with the coupler 200. For instance, in some modes of operation, the one or more actuators 250 can be controlled to move the coupler propulsor shaft 220 to connect or engage with the propulsor shaft 63, e.g., as shown in FIG. 3. In other modes of operation, the one or more actuators 250 can be controlled to move the coupler propulsor shaft 220 to disconnect or disengage from the propulsor shaft 63, e.g., by moving the coupler propulsor shaft 220 to the right from its position shown in FIG. 3, which would effectively disengage the teeth 224 of the coupler propulsor shaft 220 from the teeth 226 of the propulsor shaft 63.

Similarly, in some modes of operation, the one or more actuators 250 can be controlled to move the coupler turbine shaft 230 to connect or engage with the power turbine shaft 114, e.g., as shown in FIG. 3. In other modes of operation, the one or more actuators 250 can be controlled to move the coupler turbine shaft 230 to disconnect or disengage from the power turbine shaft 114, e.g., by moving the coupler turbine shaft 230 to the left from its position shown in FIG. 3, which would effectively disengage the teeth 234 of the coupler turbine shaft 230 from the teeth 236 of the power turbine shaft 114. Further, in some modes of operation, the one or more actuators 250 can be controlled to move the coupler electric machine shaft 240 to connect or engage with the electric machine shaft 68, e.g., as shown in FIG. 3. In other modes of operation, the one or more actuators 250 can be controlled to move the coupler electric machine shaft 240 to disconnect or disengage from the electric machine shaft 68, e.g., by moving the coupler electric machine shaft 240 to the left from its position shown in FIG. 3, which would effectively disengage the teeth 244 of the coupler electric machine shaft 240 from the teeth 246 of the electric machine shaft 68.

When the propulsor shaft 63 is connected or mechanically engaged with the coupler 200, mechanical power can be transmitted between the propulsor 62 and the coupler 200. Likewise, when the power turbine shaft 114 is connected or mechanically engaged with the coupler 200, mechanical power can be transmitted between the power turbine 174 and the coupler 200. In addition, when the electric machine shaft 68 is connected or mechanically engaged with the coupler 200, mechanical power can be transmitted between the electric machine 65 and the coupler 200. Mechanical power transmitted to the coupler 200 can in turn be transmitted to any other shaft connected or mechanically engaged thereto.

The propulsor 62, the power turbine 174, and the electric machine 65 can be selectively mechanically engaged with the coupler 200 depending on a selected mode of operation of the hybrid-electric propulsion system 50 (FIG. 1). Examples are provided below.

Figure 4:
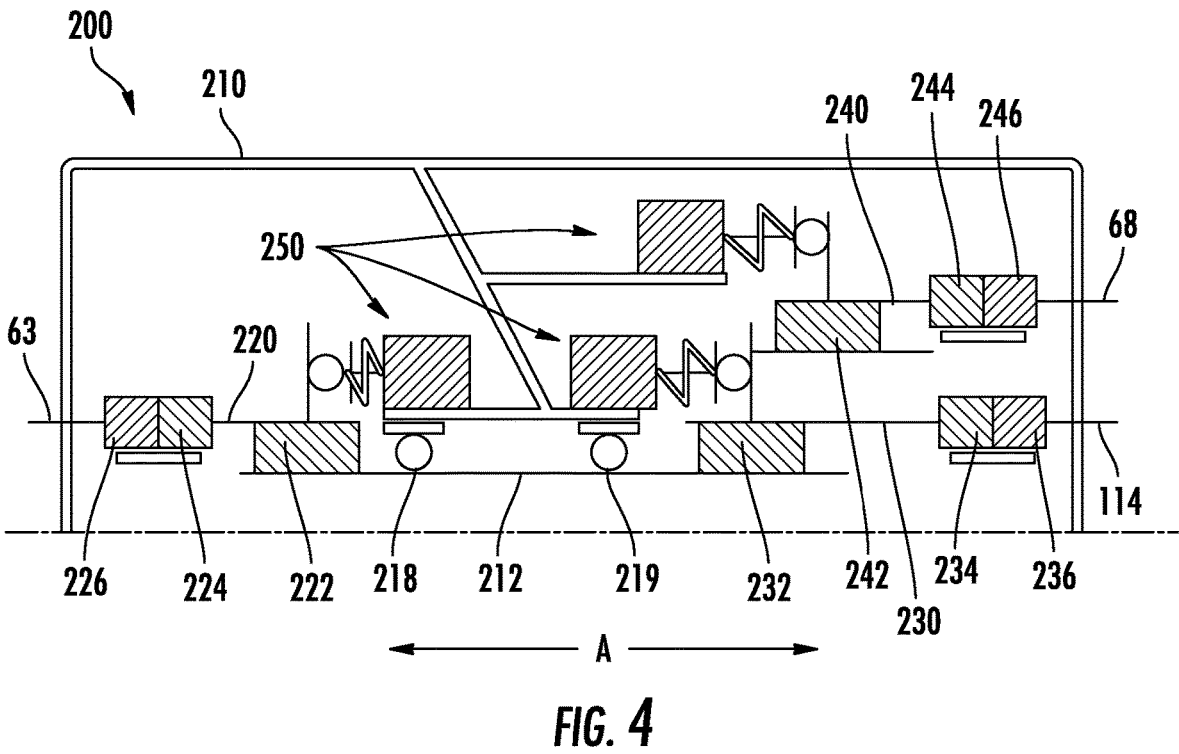
FIG. 4 is a schematic view of the coupler of FIG. 3 and depicts a first mode of operation in which a propulsor shaft, a power turbine shaft, and an electric machine shaft are all mechanically coupled with the coupler.

In a first mode of operation, the propulsor shaft 63, the power turbine shaft 114, and the electric machine shaft 68 can all be mechanically coupled or engaged with the coupler 200. Thus, the first mode of operation can be deemed an "all engaged" mode of operation. FIG. 4 is a schematic view of the coupler 200 and depicts a first mode of operation in which the propulsor shaft 63, the power turbine shaft 114, and the electric machine shaft 68 are all mechanically coupled or engaged with the coupler 200. Particularly, as depicted, the teeth 224 of the coupler propulsor shaft 220 are engaged with the teeth 226 of the propulsor shaft 63. Thus, the propulsor 62 is mechanically coupled with the coupler 200. The teeth 234 of the coupler turbine shaft 230 are engaged with the teeth 236 of the power turbine shaft 114. Accordingly, the power turbine 174 is mechanically coupled with the coupler 200. The teeth 244 of the coupler electric machine shaft 240 are engaged with the teeth 246 of the electric machine shaft 68. As a result, the electric machine 65 is mechanically coupled with the coupler 200. FIG. 3 also depicts the "all engaged" mode of operation. In the first mode of operation, the power turbine 174 can drive the propulsor 62 to produce thrust for the aircraft 10. The power turbine 174 may also drive the electric machine 65 to generate electrical power. Alternatively, the electric machine 65 can function as a motor to drive the propulsor 62, e.g., for a power assist operation.

Figure 5:
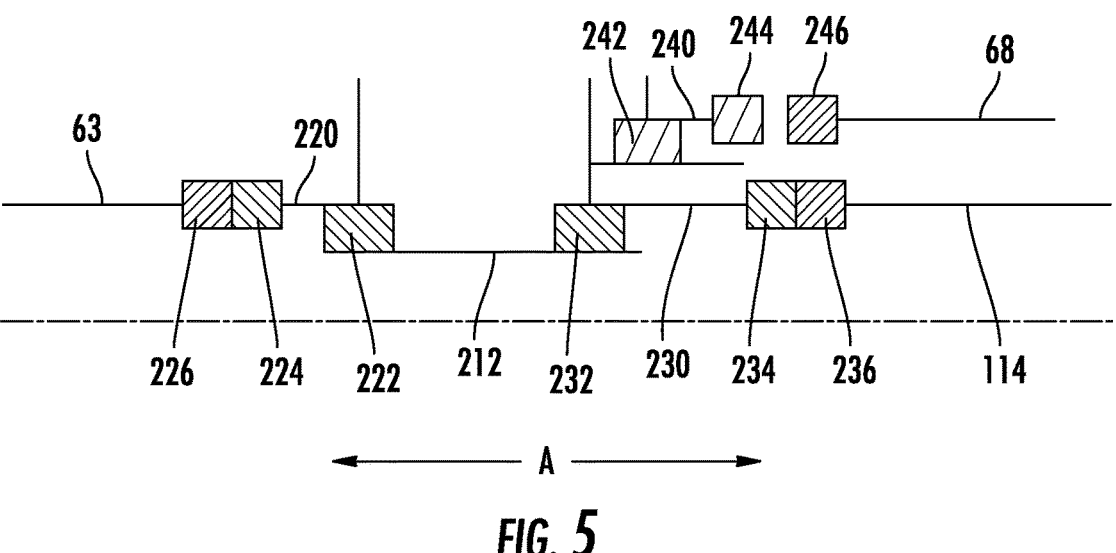
FIG. 5 is a schematic view of the coupler of FIG. 3 and depicts a second mode of operation in which the propulsor shaft and the power turbine shaft are mechanically coupled with the coupler while the electric machine shaft is mechanically decoupled from the coupler.

In a second mode of operation, the propulsor shaft 63 and the power turbine shaft 114 can be mechanically coupled with the coupler 200, while the electric machine shaft 68 can be mechanically decoupled or disengaged from the coupler 200. FIG. 5 is a schematic view of the coupler 200 and depicts the second mode of operation in which the propulsor shaft 63 and the power turbine shaft 114 are mechanically coupled with the coupler 200 while the electric machine shaft 68 is mechanically decoupled from the coupler 200. Specifically, as shown in the example of FIG. 5, the teeth 224 of the coupler propulsor shaft 220 are engaged with the teeth 226 of the propulsor shaft 63. Thus, the propulsor 62 is mechanically coupled with the coupler 200. The teeth 234 of the coupler turbine shaft 230 are engaged with the teeth 236 of the power turbine shaft 114. Accordingly, the power turbine 174 is mechanically coupled with the coupler 200. Notably, the teeth 244 of the coupler electric machine shaft 240 are disengaged from the teeth 246 of the electric machine shaft 68. The one or more actuators 250 can move the coupler electric machine shaft 240 along the axial direction A (to the left in FIG. 5), causing the teeth 244 of the coupler electric machine shaft 240 to disengage from the teeth 246 of the electric machine shaft 68. In this way, the electric machine 65 is mechanically decoupled from the coupler 200. In the second mode of operation, the power turbine 174 can drive the propulsor 62 to produce thrust for the aircraft 10. The electric machine 65 can be decoupled for various reasons, such as an electric machine failure. By decoupling the electric machine 65, e.g., in the event of an electric machine failure, the power turbine 174 need not "drag" the electric machine 65 along therewith and permanent solutions for disconnecting the electric machine 65 need not be taken, such as by using a cutter to "cut" the shaft coupling the electric machine 65 to the power turbine 174.

Figure 6:
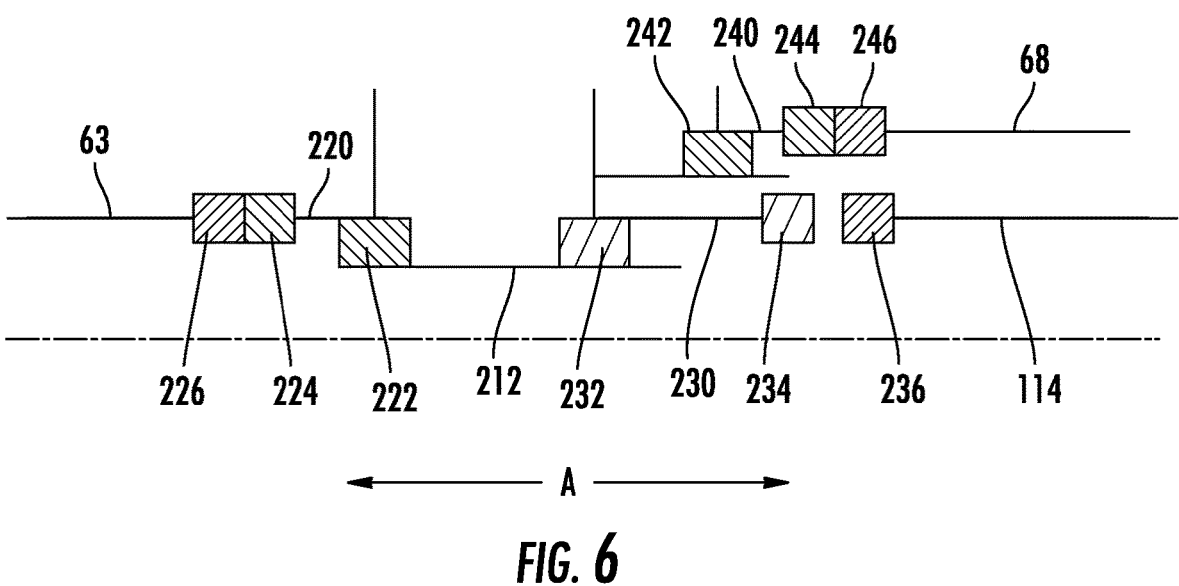
FIG. 6 is a schematic view of the coupler of FIG. 3 and depicts a third mode of operation in which the propulsor shaft and the electric machine shaft are mechanically coupled with the coupler while the power turbine shaft is mechanically decoupled from the coupler.

In a third mode of operation, the propulsor shaft 63 and the electric machine shaft 68 can be mechanically coupled with the coupler 200, while the power turbine shaft 114 can be mechanically decoupled or disengaged from the coupler 200. FIG. 6 is a schematic view of the coupler 200 and depicts the third mode of operation in which the propulsor shaft 63 and the electric machine shaft 68 are mechanically coupled with the coupler 200 while the power turbine shaft 114 is mechanically decoupled from the coupler 200. Specifically, as shown in the example of FIG. 6, the teeth 224 of the coupler propulsor shaft 220 are engaged with the teeth 226 of the propulsor shaft 63. Thus, the propulsor 62 is mechanically coupled with the coupler 200. The teeth 244 of the coupler electric machine shaft 240 are engaged with the teeth 246 of the electric machine shaft 68. Accordingly, the electric machine 65 is mechanically coupled with the coupler 200. However, the teeth 234 of the coupler turbine shaft 230 are disengaged from the teeth 236 of the power turbine shaft 114. The one or more actuators 250 can move the coupler turbine shaft 230 along the axial direction A (to the left in FIG. 6), causing the teeth 234 of the coupler turbine shaft 230 to disengage from the teeth 236 of the power turbine shaft 114. Consequently, the power turbine 174 is mechanically decoupled from the coupler 200. In the third mode of operation, the electric machine 65 can drive the propulsor 62 to produce thrust for the aircraft 10, e.g., in an electric drive mode in which the gas turbine engine 69 does not function as a torque source to drive the propulsor 62. The power turbine 174 can be decoupled for various reasons, such as a mechanical failure, a desire for quieter propulsion, fuel savings, etc. By decoupling the power turbine 174, the electric machine 65 need not "drag" the power turbine 174 along therewith and permanent solutions for decoupling the power turbine 174 from the propulsor 62 and/or electric machine 65 need not be taken.

Figure 7:
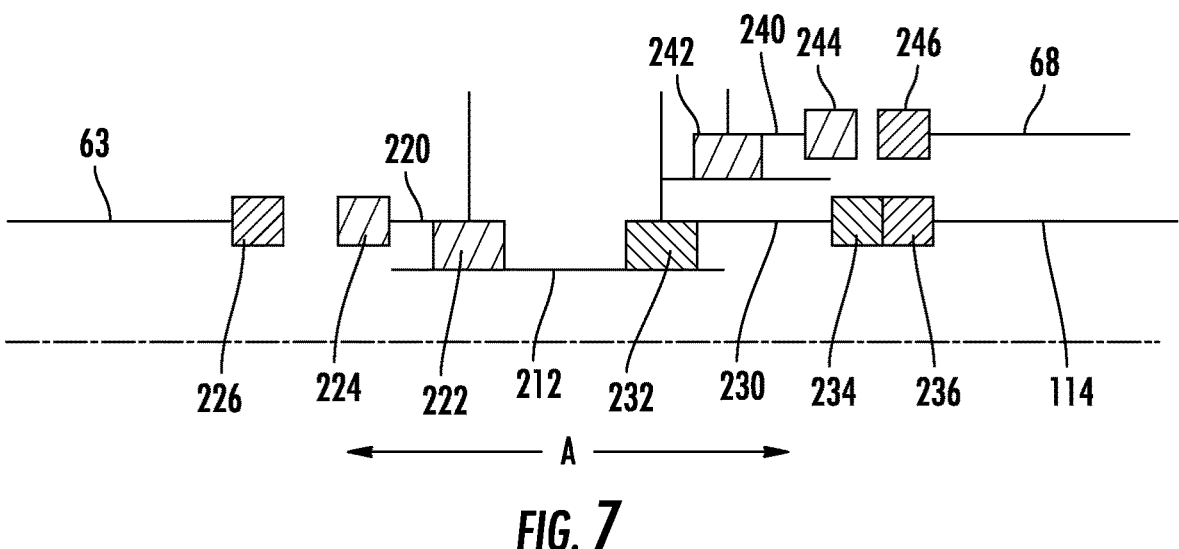
FIG. 7 is a schematic view of the coupler of FIG. 3 and depicts a fourth mode of operation in which the power turbine shaft is mechanically coupled with the coupler while the propulsor shaft and the electric machine shaft are mechanically decoupled from the coupler.

In a fourth mode of operation, the power turbine shaft 114 can be mechanically coupled with the coupler 200, while the propulsor shaft 63 and the electric machine shaft 68 can be mechanically decoupled from the coupler 200. FIG. 7 is a schematic view of the coupler 200 and depicts the fourth mode of operation in which the power turbine shaft 114 is mechanically coupled with the coupler 200 while the propulsor shaft 63 and the electric machine shaft 68 are mechanically decoupled from the coupler 200. Specifically, as shown in the example of FIG. 7, the teeth 234 of the coupler turbine shaft 230 are engaged with the teeth 236 of the power turbine shaft 114. Thus, the power turbine 174 is mechanically coupled with the coupler 200. However, teeth 224, 226 are disengaged and teeth 244, 246 are disengaged. The one or more actuators 250 can move the coupler propulsor shaft 220 along the axial direction A (to the right in FIG. 7), causing the teeth 224 to disengage from the teeth 226. In addition, the one or more actuators 250 can move the coupler electric machine shaft 240 along the axial direction A (to the left in FIG. 7), causing the teeth 244 to disengage from the teeth 246. Accordingly, the propulsor 62 and the electric machine 65 are mechanically decoupled from the coupler 200. It may be desirable implement the fourth mode of operation in some instances. For instance, it may be advantageous to start or relight the gas turbine engine 69 without any "drag" on the power turbine 174 caused by the electric machine 65 and/or propulsor 62 being mechanically coupled with the coupler 200.

Figure 8:
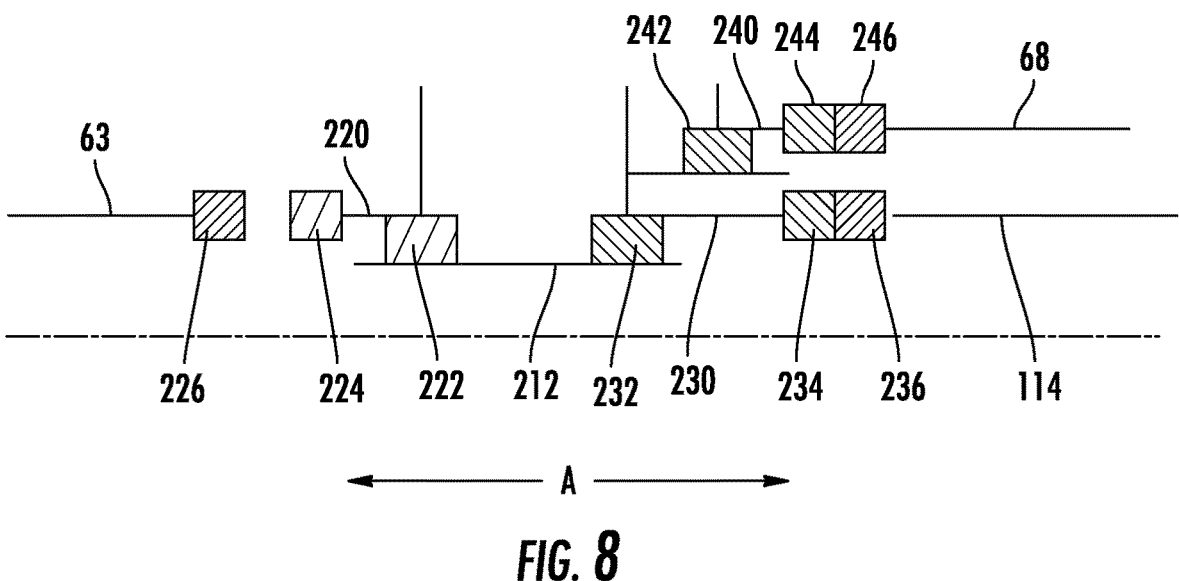
FIG. 8 is a schematic view of the coupler of FIG. 3 and depicts a fifth mode of operation in which the power turbine shaft and the electric machine shaft are mechanically coupled with the coupler while the propulsor shaft is mechanically decoupled from the coupler.

In a fifth mode of operation, the power turbine shaft 114 and the electric machine shaft 68 can be mechanically coupled with the coupler 200 while the propulsor shaft 63 can be mechanically decoupled from the coupler 200. FIG. 8 is a schematic view of the coupler 200 and depicts the fifth mode of operation in which the power turbine shaft 114 and the electric machine shaft 68 are mechanically coupled with the coupler 200 while the propulsor shaft 63 is mechanically decoupled from the coupler 200. The teeth 224, 226 can be disengaged while the teeth 234, 236 can be engaged and teeth 244, 246 can be engaged. In some instances, it may be desirable to implement the fifth mode of operation. For instance, with reference also to FIG. 1, the aircraft 10 can be parked on the ground and it may be desirable to charge the battery 82. Accordingly, the gas turbine engine 69 can be operated so that the power turbine 174 drives the electric machine 65 without "drag" from the propulsor 62. In this way, greater efficiency in charging the battery 82 can be achieved.

Figure 9:
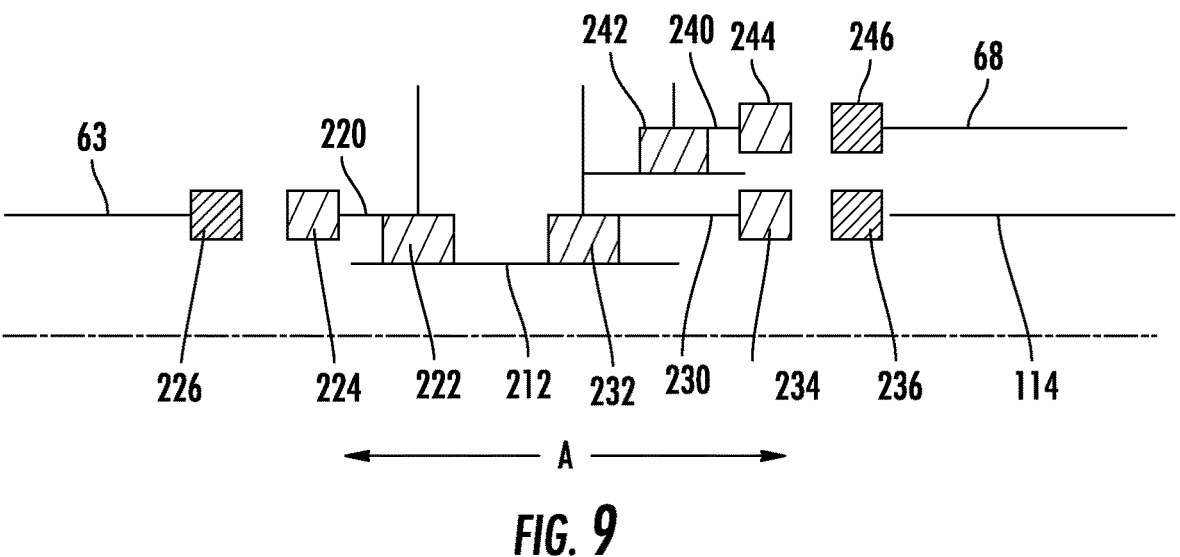
FIG. 9 is a schematic view of the coupler of FIG. 3 and depicts a sixth mode of operation in which the power turbine shaft, the propulsor shaft, and the electric machine shaft are mechanically decoupled from the coupler.

In a sixth mode of operation, the power turbine shaft 114, the propulsor shaft 63, and the electric machine shaft 68 can be mechanically decoupled from the coupler 200. FIG. 9 is a schematic view of the coupler 200 and depicts the sixth mode of operation in which the power turbine shaft 114, the propulsor shaft 63, and the electric machine shaft 68 are mechanically decoupled from the coupler 200. This may be deemed the "all disengaged mode". The teeth 224, 226 can be disengaged from one another, teeth 234, 236 can be disengaged from one another, and teeth 244, 246 can be disengaged from one another. It will be appreciated that modes of operation other than those depicted in FIGS. 4 through 9 are possible.

Figure 10:
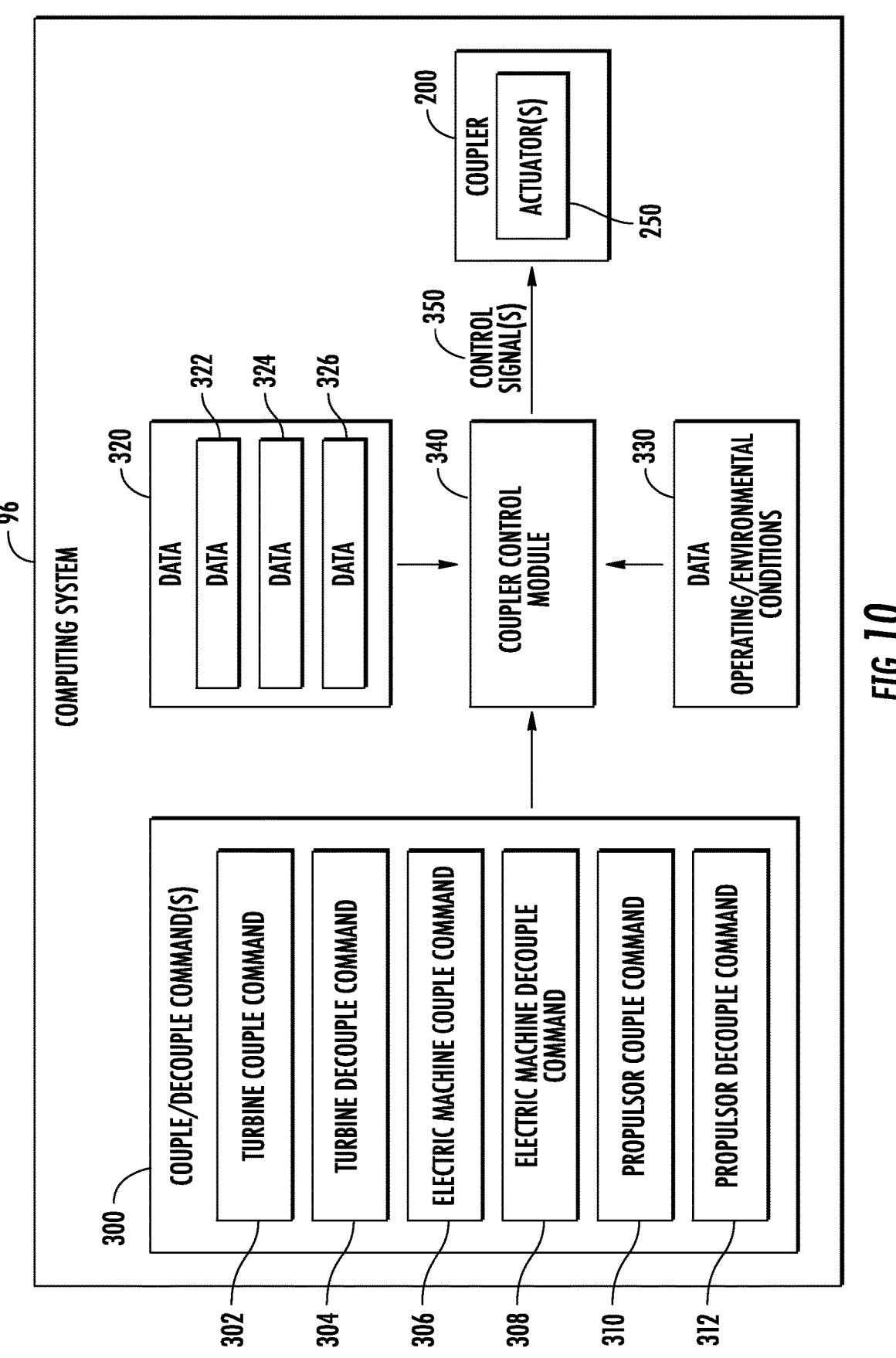
FIG. 10 is a data flow diagram depicting an example manner in which the coupler of FIG. 3 can be controlled to couple/decouple various components to or from the coupler.

Turning now to FIG. 10 in addition to FIGS. 1, 2, and 3, FIG. 10 is a data flow diagram depicting an example manner in which the coupler 200 can be controlled to couple/ decouple the various noted elements to or from the coupler 200. As depicted, one or more processors of the computing system 96, e.g., one or more processors of the engine controller 52, can receive one or more couple/decouple commands 300. The one or more couple/decouple commands 300 can be, for example, a turbine couple command 302 representing a command to couple the power turbine 174 with the coupler 200, a turbine decouple command 304 representing a command to decouple the power turbine 174 from the coupler 200, an electric machine couple command 306 representing a command to couple the electric machine 65 with the coupler 200, an electric machine decouple command 308 representing a command to decouple the electric machine 65 from the coupler 200, a propulsor couple command 310 representing a command to couple the propulsor 62 with the coupler 200, and/or a propulsor decouple command 312 representing a command to decouple the propulsor 62 from the coupler 200.

The one or more processors of the computing system 96 can also receive data, including data 320 captured by one or more of the resolvers 202, 204, 206. In this regard, the data 320 can include data 322 captured by the resolver 202 that indicates a rotational speed and an angular position associated with the propulsor shaft 63. The data 320 can also include data 324 captured by the resolver 204 that indicates a rotational speed and an angular position associated with the electric machine shaft 68. The data 320 can further include data 326 captured by the resolver 206 that indicates a rotational speed and an angular position associated with the power turbine shaft 114.

The one or more processors of the computing system 96 can also receive data 330 indicating one or more operating conditions and/or environmental conditions associated with operation of the aircraft 10, the propulsor 62, the gas turbine engine 69, and/or the electric machine 65. Example operating conditions and/or environmental conditions can include, without limitation, ambient temperature, humidity, or pressure, altitude, particulate matter in the ambient air, a location of the aircraft 10 (e.g., GPS coordinates), electrical power demands of the aircraft 10, thrust demands for the aircraft 10, information pertaining to the second propulsion assembly 70, etc.

As shown in FIG. 10, the one or more couple/decouple commands 300, the data 320, and, optionally, the data 330 can be routed to a coupler control module 340. The coupler control module 340 can be a set of instructions or control logic that can be executed by the one or more processors of the computing system 96 to generate one or more control signals 350. In this regard, the one or more processors are configured to execute the coupler control module 340, which causes the one or more processors to generate one or more control signals 350 based at least in part on the couple/decouple command 300, the data 320, and optionally, the data 330. The one or more control signals 350 can be routed to the one or more actuators 250 of the coupler 200. Based at least in part on the control signals 350, the one or more actuators 250 may couple or decouple the propulsor 62, the power turbine 174, and/or the electric machine 65 to or from the coupler 200, which consequently couples or decouples these element to or from each other.

Figure 12:
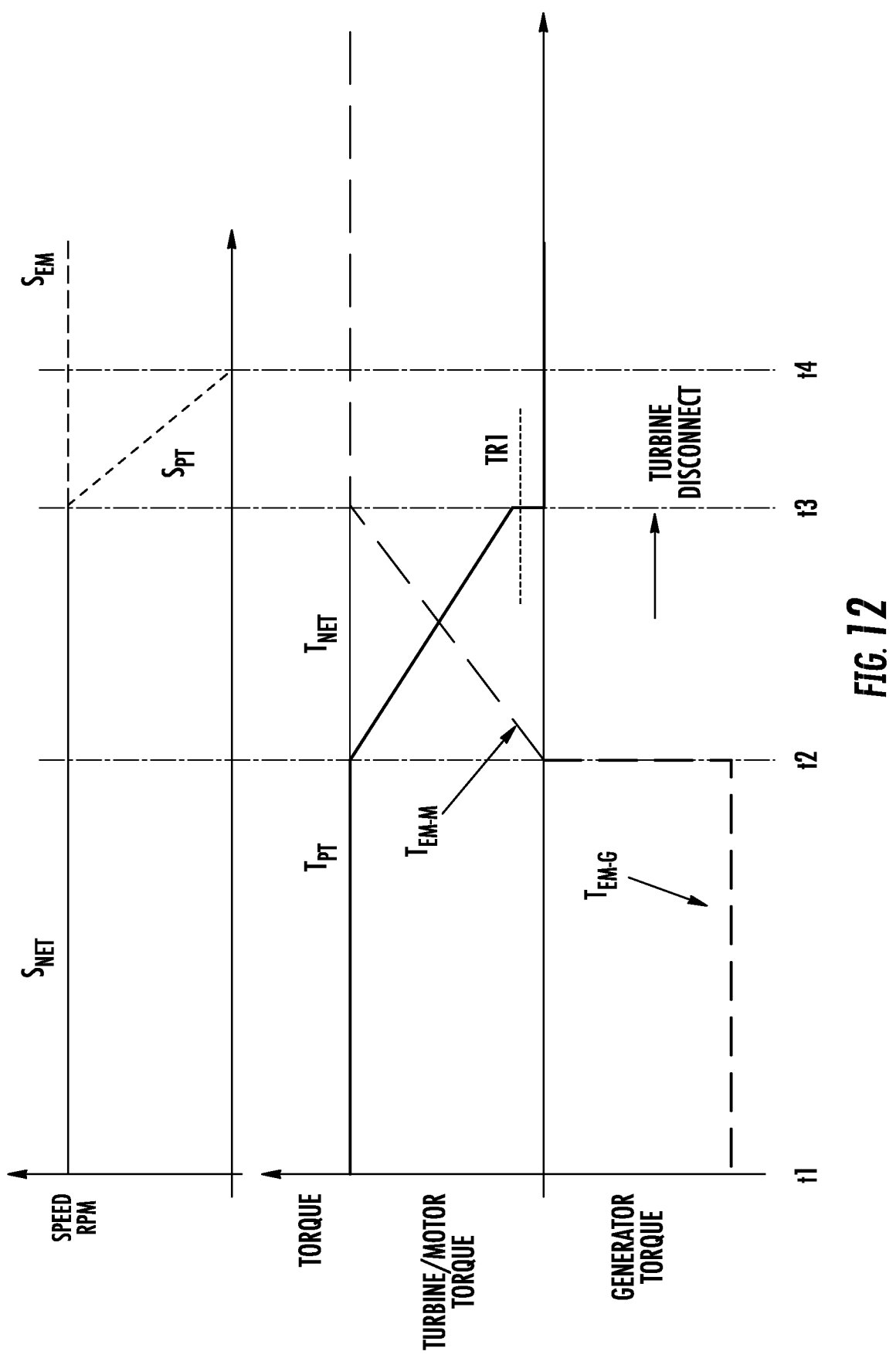
FIG. 12 is a graph corresponding to the method of decoupling the turbine from the coupler set forth in FIG. 11 and depicts a speed of the power turbine and a speed of the electric machine as functions of time and a torque output of the power turbine and a torque output of the electric machine as functions of time.

With reference now to FIGS. 1, 2, 3, and FIGS. 11 and 12, an example manner in which a turbine can be decoupled or disengaged from a coupler will be provided. Particularly, FIG. 11 is a flow diagram of a method 400 of decoupling a turbine in accordance with an exemplary aspect of the present disclosure. FIG. 12 is a graph depicting speed of the power turbine and speed of the electric machine as functions of time and a torque output of the power turbine and a torque output of the electric machine as functions of time.

At 402, the method 400 includes providing, by a power turbine, a torque output on a coupler mechanically coupled with a propulsor to drive the propulsor. By way of example, with reference to FIG. 12, at time t1, the propulsor 62, the power turbine 174, and the electric machine 65 are all mechanically coupled with the coupler 200. In this regard, the first propulsion assembly 60 is being operated in the first mode of operation or "all engaged" mode.

Further, from time t1 to time t2, the power turbine 174 is operating in a driving mode. Thus, the power turbine 174 provides a torque output $\tau_{PT}$ on the coupler 200 to drive the propulsor 62. Stated another way, the gas turbine engine 69 can be operated to cause the power turbine 174 to rotate. Mechanical power can be transmitted from the power turbine 174 to the coupler 200 and from the coupler 200 to the propulsor 62, e.g., by way of the transmission shaft 212 (FIG. 3). In this way, the propulsor 62 can produce thrust for the aircraft 10.

Moreover, from time t1 to time t2, the electric machine 65 acts as an electric generator to generate electrical power. The power turbine 174 drives the electric machine 65. Mechanical power can be transmitted from the power turbine 174 to the coupler 200 and from the coupler 200 to the electric machine 65. Accordingly, the electric machine 65 applies "drag" on the power turbine 174, or rather, applies a generator torque output $\tau_{EM-G}$ on the coupler 200.

At 404, the method 400 includes performing, in response to a turbine decouple command, an unloading operation. Wherein performing the unloading operation includes, over an unloading period, increasing a torque output provided by an electric machine on the coupler to increase mechanical power transmission from the electric machine to the propulsor and decreasing the torque output provided by the power turbine on the coupler to decrease mechanical power transmission from the power turbine to the propulsor.

Continuing with the example provided in FIG. 12, at time t2, a turbine decouple command 304 (FIG. 10) can be received, e.g., by one or more processors of the computing system 96 (FIG. 10). In response to the turbine decouple command 304, an unloading operation can be performed over an unloading period. As depicted in FIG. 12, at time t2, the torque output provided by the electric machine 65 on the coupler 200 increases in response to the turbine decouple command 304. Specifically, at time t2, the electric machine 65 is controlled to cease operating in a generating mode so that the electric machine 65 can operate in a motoring mode to increase its torque output $\tau_{EM-M}$ on the coupler 200 to ultimately increase mechanical power transmission from the electric machine 65 to the propulsor 62. At time t2, the torque output $\tau_{PT}$ provided by the power turbine 174 on the coupler 200 decreases in response to the turbine decouple command 304. The torque output $\tau_{PT}$ provided by the power turbine 174 on the coupler 200 can be decreased in one or more suitable ways, such as by decreasing the fuel provided to the combustor 152, changing the position of one or more variable geometry components along the core air flowpath 110, some combination thereof, etc.

In some implementations, in performing the unloading operation, the torque output $\tau_{EM-M}$ provided by the electric machine 65 on the coupler 200 is increased linearly over the unloading period. In some implementations, in performing the unloading operation, the torque output $\tau_{PT}$ provided by the power turbine 174 on the coupler 200 is decreased linearly over the unloading period. In yet other implementations, such as the implementation shown in FIG. 12, in performing the unloading operation, the torque output $\tau_{EM-M}$ provided by the electric machine 65 on the coupler 200 is increased linearly over the unloading period and the torque output $\tau_{EM-M}$ provided by the power turbine 174 on the coupler 200 is decreased linearly over the unloading period.

Further, in some implementations, in performing the unloading operation, the torque output $\tau_{EM-M}$ provided by the electric machine 65 on the coupler 200 is increased over the unloading period at a rate and the torque output $\tau_{PT}$ provided by the power turbine 174 on the coupler 200 is decreased over the unloading period at or substantially at the rate. In this way, the torque output $\tau_{EM-M}$ provided by the electric machine 65 on the coupler 200 and the torque output $\tau_{EM-PT}$ provided by the power turbine 174 on the coupler 200 change at or substantially the same rate although one torque output is increasing and one is decreasing. This "torque matching" can facilitate stabilization of the first propulsion assembly 60 during decoupling of the power turbine 174. The matched torques can be linear, exponential, other unique curves, etc.

In addition, in some implementations, in performing the unloading operation, the torque output $\tau_{EM-M}$ provided by the electric machine 65 on the coupler 200 is increased over the unloading period and the torque output $\tau_{PT}$ provided by the power turbine 174 on the coupler 200 is decreased over the unloading period so that a net torque $\tau_{NET}$ provided by the electric machine 65 and the power turbine 174 on the coupler 200 is maintained at a constant torque over the unloading period. As shown in FIG. 12, the net torque $\tau_{NET}$ provided by the electric machine 65 and the power turbine 174 on the coupler 200 is maintained at a constant torque over the unloading period, e.g., a period of time from time t2 to time t3. This may help the power turbine 174 and electric machine 65 maintain a constant or substantially constant speed over the overloading period.

At 406, the method 400 includes decoupling the power turbine from the coupler when the torque output provided by the power turbine on the coupler reaches a predetermined threshold. For instance, as shown in FIG. 12, at time t3, the torque output $\tau_{PT}$ provided by the power turbine 174 on the coupler 200 reaches a predetermined threshold TR1, and consequently, the power turbine 174 is decoupled from the coupler 200 at time t3. Inputs received from the resolver 206 associated with the power turbine shaft 114 and the resolver 204 associated with the electric machine shaft 68 can be used to monitor the torque outputs provided by the electric machine 65 and the power turbine 174 on the coupler 200 during the unloading operation. Particularly, these inputs can be used for "torque matching" and for determining when the torque output $\tau_{PT}$ provided by the power turbine 174 on the coupler 200 reaches the predetermined threshold TR1. The matched torques can be linear, exponential, other unique curves, etc.

In some implementations, decoupling the power turbine 174 from the coupler 200 includes modulating the one or more actuators 250 to move the coupler turbine shaft 230 of the coupler 200 so that the teeth 234 of the coupler turbine shaft 230 disengage from the teeth 236 of the power turbine shaft 114, e.g., as shown in FIG. 6. Once the power turbine 174 is decoupled from the coupler 200 at time t3, the power turbine 174 spools down. As shown in FIG. 12, the rotational speed of the power turbine 174 decreases from time t3 to time t4. At time t4, the power turbine 174 ceases rotating while the electric machine 65 acting as a motor maintains its current rotational speed.

In some further implementations of method 400, when the torque output provided by the power turbine on the coupler reaches the predetermined threshold and the power turbine is decoupled from the coupler, the method 400 includes providing, by the electric machine, a torque output on the coupler to drive the propulsor to a commanded operating point. For instance, as shown in FIG. 12, when the torque output $\tau_{PT}$ provided by the power turbine 174 on the coupler 200 reaches the predetermined threshold TR1 and the power turbine 174 is decoupled from the coupler 200 at time t3, the electric machine 65 provides a torque output $\tau_{EM-M}$ on the coupler 200 to drive the propulsor 62 to a commanded operating point, such as a commanded rotational speed. Thus, in accordance with FIGS. 11 and 12 and the accompanying text, the torque source for driving the propulsor 62 can be switched in a smooth manner from the gas turbine engine 69 to the electric machine 65. The smooth transition is accomplished by the controlled "torque matching" of the torque outputs applied on the coupler 200 by the electric machine 65 and the power turbine 174. Further, no cutting of the shaft or other permanent solutions need be implemented to decouple the power turbine 174. Thus, if desired, the power turbine 174 may be coupled once again with the coupler 200, and consequently, the electric machine 65 and/or the propulsor 62 coupled with the coupler 200.

To summarize, to mechanically decouple the power turbine 174 to switch to an electric drive mode, or to switch from the first mode of operation (FIG. 4) to the third mode of operation (FIG. 6), the torque output $\tau_{PT}$ provided by the power turbine 174 on the coupler 200 is decreased to "unload" the power turbine 174, while at the same time, a motor torque output $\tau_{EM-M}$ provided by the electric machine 65 on the coupler 200 is increased over the unloading period. When the torque output $\tau_{PT}$ provided by the power turbine 174 on the coupler 200 reaches a predetermined threshold TR1, the power turbine 174 is mechanically decoupled from the coupler 200. The controlled "torque matching" of the torque outputs applied on the coupler 200 by the electric machine 65 and the power turbine 174 allows for a smooth decoupling of the power turbine 174 and for a smooth transition to the electric drive mode in which the electric machine 65 is responsible for driving the propulsor 62.

Figure 14:
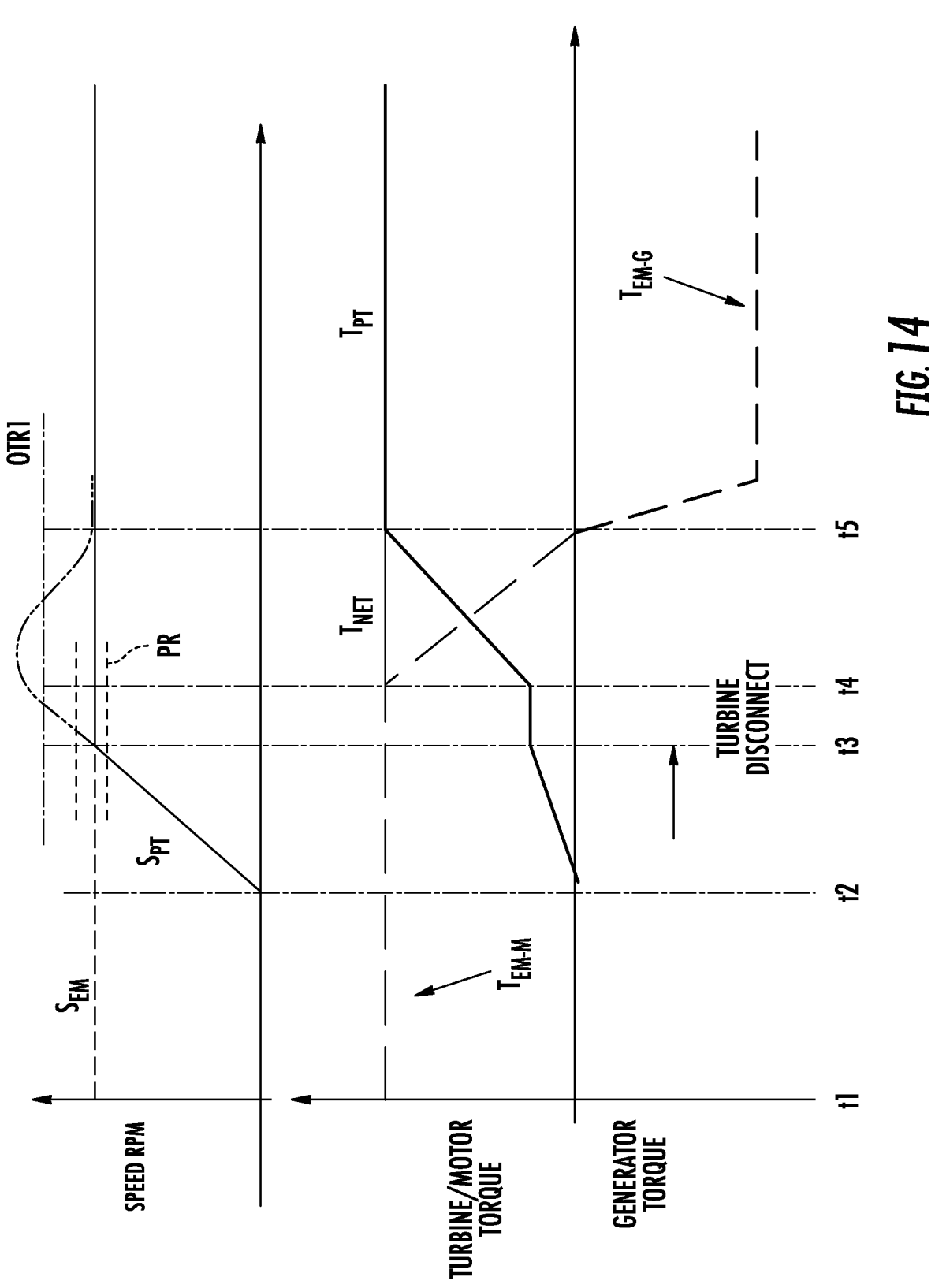
FIG. 14 is a graph corresponding to the method of coupling the turbine to the coupler set forth in FIG. 13 and depicts a speed of the power turbine and a speed of the electric machine as functions of time and a torque output of the power turbine and a torque output of the electric machine as functions of time.

With reference now to FIGS. 1, 2, and 3 in addition to FIGS. 13 and 14, an example manner in which a turbine can be coupled or engaged with a coupler will be provided. Particularly, FIG. 13 is a flow diagram of a method 500 of coupling a turbine in accordance with an exemplary aspect of the present disclosure. FIG. 14 is a graph depicting speed of the power turbine and speed of the electric machine as functions of time and a torque output of the power turbine and a torque output of the electric machine as functions of time.

At 502, the method 500 includes providing, by an electric machine, a torque output on a coupler mechanically coupled with a propulsor to drive the propulsor. By way of example, with reference to FIG. 14, at time t1, the propulsor 62 and the electric machine 65 are mechanically coupled with the coupler 200 while the power turbine 174 is decoupled from the coupler 200. In this regard, the first propulsion assembly 60 is being operated in the third mode of operation or the "electric drive" mode at time t1. Particularly, at time t1, the electric machine 65 acts as an electric motor to drive the propulsor 62. That is, the electric machine 65 provides a torque output $\tau_{EM-M}$ on the coupler 200. Accordingly, mechanical power can be transmitted from the electric machine 65 to the coupler 200 and from the coupler 200 to the propulsor 62. In this way, the propulsor 62 can produce thrust for the aircraft 10. FIG. 6 schematically depicts the coupler 200 in the third mode of operation.

At 504, the method 500 includes performing, in response to a power turbine couple command, a speed matching operation. In certain implementations, performing the speed matching operation includes increasing a rotational speed of a power turbine until the rotational speed of the power turbine shaft matches or is within a predetermined range of a rotational speed of an electric machine shaft that mechanically couples the electric machine to the coupler.

Continuing with the example provided in FIG. 14, at time t2, a turbine couple command 302 (FIG. 10) can be received, e.g., by one or more processors of the computing system 96 (FIG. 10). In response to the turbine couple command 302, a speed matching operation can be performed. As depicted in FIG. 14, at time t2, the rotational speed $S_{PT}$ of the power turbine 174 begins increasing. The rotational speed $S_{PT}$ of the power turbine 174 is increased until it matches or is within a predetermined range PR of the rotational speed $S_{EM}$ of the electric machine shaft 68 that mechanically couples the electric machine 65 to the coupler 200. In this example, the rotational speed $S_{PT}$ of the power turbine 174 matches or is within a predetermined range PR of the rotational speed $S_{EM}$ of the electric machine shaft 68 at time t3. In this regard, the rotational speed $S_{PT}$ of the power turbine 174 increases from time t2 to time t3. The torque output $\tau_{PT}$ of the power turbine 174 increases from time t2 to time t3, but the torque output $\tau_{PT}$ of the power turbine 174 is not applied to the coupler 200 as the power turbine 174 is mechanically decoupled from the coupler 200 during this time period.

In some implementations, the method 500 can include monitoring whether the rotational speed $S_{PT}$ of the power turbine shaft 114 matches or is within the predetermined range PR of the rotational speed $S_{PT}$ of the electric machine shaft 68 based at least in part on one or more inputs received from the resolver 204 associated with the electric machine shaft 68 and one or more inputs received from the resolver 206 associated with the power turbine shaft 114. The inputs provided by the resolvers 204, 206 can indicate a rotational speed and an angular position of their associated shafts 68, 114.

In some implementations, the rotational speed $S_{PT}$ of the power turbine 174 can be increased linearly in the speed matching operation as shown in FIG. 14. This may allow for improved predictions as to when the rotational speed $S_{PT}$ of the power turbine 174 is expected to match or fall within the predetermined range PR of the rotational speed $S_{EM}$ of the electric machine shaft 68. The rotational speed $S_{PT}$ of the power turbine 174 can be increased by increasing the fuel provided to the combustor 152, for example. The one or more processors of the computing system 96 may predict when the rotational speed $S_{PT}$ of the power turbine 174 is expected to match or fall within the predetermined range PR of the rotational speed $S_{EM}$ of the electric machine shaft 68 so that fuel provided to the combustor 152 can be controlled intelligently.

At 506, the method 500 includes, when the rotational speed of the power turbine shaft matches or is within the predetermined range of the rotational speed of the electric machine shaft, mechanically coupling the power turbine to the coupler so that the power turbine drives the propulsor. Accordingly, with the rotational speed $S_{PT}$ of the power turbine 174 matched or within the predetermined range PR of the rotational speed $S_{EM}$ of the electric machine shaft 68, the power turbine 174 can be mechanically coupled with the coupler 200. Mechanically coupling the power turbine 174 to the coupler 200 can include modulating the one or more actuators 250 to move the coupler turbine shaft 230 of the coupler 200 so that the teeth 234 of the coupler turbine shaft 230 engage the teeth 236 of the power turbine shaft 114. When the power turbine 174 is mechanically coupled with the coupler 200 at time t3, the power turbine 174 applies or provides a torque output $\tau_{PT}$ on the coupler 200. Accordingly, mechanical power can be transmitted from the power turbine 174 to the coupler 200, and from the coupler 200 to the propulsor 62.

In some implementations, after the power turbine 174 is mechanically coupled to the coupler 200, the torque output $\tau_{PT}$ provided by the power turbine 174 on the coupler 200 is held constant or substantially constant for a predetermined time. For instance, as shown in FIG. 14, the torque output $\tau_{PT}$ provided by the power turbine 174 on the coupler 200 is held constant or substantially constant for a predetermined time, which corresponds to a time period spanning from time t3 to time t4. This may prevent or reduce the chance of an overspeed condition of the power turbine 174. For instance, this may prevent the rotational speed $S_{PT}$ of the power turbine 174 from reaching an overspeed threshold OTR1.

In some implementations, after the power turbine 174 is mechanically coupled to the coupler 200 so that the power turbine 174 drives the propulsor 62, the method 500 can further include decreasing the torque output $\tau_{EM-M}$ provided by the electric machine 65 on the coupler 200 to decrease mechanical power transmission from the electric machine 65 to the propulsor 62. In such implementations, the method 500 can further include increasing the torque output $\tau_{PT}$ provided by the power turbine 174 on the coupler 200 to increase mechanical power transmission from the power turbine 174 to the propulsor 62. In this way, the power turbine 174 begins to replace the electric machine 65 as the torque source for driving the propulsor 62. During the turbine loading period, which corresponds to a time period spanning from time t4 to time t5, the torque output $\tau_{EM-M}$ provided by the electric machine 65 on the coupler 200 is shown decreasing and the torque output $\tau_{PT}$ provided by the power turbine 174 on the coupler 200 is shown increasing.

In some implementations, the torque output $\tau_{EM-M}$ provided by the electric machine 65 on the coupler 200 is decreased linearly, e.g., over the turbine loading period. In some implementations, the torque output $\tau_{PT}$ provided by the power turbine 174 on the coupler 200 is increased linearly, e.g., over the turbine loading period. In yet other implementations, the torque output $\tau_{EM-M}$ provided by the electric machine 65 on the coupler 200 is decreased linearly and the torque output $\tau_{PT}$ provided by the power turbine 174 on the coupler 200 is increased linearly, e.g., over the turbine loading period.

In yet other implementations, the torque output $\tau_{EM-M}$ provided by the electric machine 65 on the coupler 200 is decreased and the torque output $\tau_{PT}$ provided by the power turbine 174 on the coupler 200 is increased so that a net torque $\tau_{NET}$ provided by the electric machine 65 and the power turbine 174 on the coupler 200 is maintained within a predetermined margin (e.g., within ten percent (10%), within five percent (5%), within two percent (2%), etc.) of a commanded torque for the propulsor 62. In some further implementations, the torque output $\tau_{EM-M}$ provided by the electric machine 65 on the coupler 200 is decreased and the torque output $\tau_{PT}$ provided by the power turbine 174 on the coupler 200 is increased so that a net torque $\tau_{NET}$ provided by the electric machine 65 and the power turbine 174 on the coupler 200 is maintained at or substantially at a constant torque over the turbine loading period. For instance, as shown in FIG. 14, the net torque $\tau_{NET}$ provided by the electric machine 65 and the power turbine 174 on the coupler 200 is maintained at or substantially at a constant torque over the turbine loading period, or from time t4 to time t5 in this example.

In other implementations, to facilitate "torque matching", the torque output $\tau_{EM-M}$ provided by the electric machine 65 on the coupler 200 is decreased at a rate and the torque output $\tau_{PT}$ provided by the power turbine 174 on the coupler 200 is increased at or substantially at the rate. In this way, the torque output $\tau_{EM-M}$ provided by the electric machine 65 on the coupler 200 and the torque output $\tau_{EM-PT}$ provided by the power turbine 174 on the coupler 200 change at or substantially the same rate although one torque output is increasing and one is decreasing. This "torque matching" can facilitate stabilization of the first propulsion assembly 60 after coupling of the power turbine 174. The matched torques can be linear, exponential, other unique curves, etc.

In yet other implementations, the torque output $\tau_{EM-M}$ provided by the electric machine 65 on the coupler 200 is decreased so that the electric machine 65 may switch from a motoring mode to a generating mode to generate electrical power. For instance, as depicted in FIG. 14, at time t5, the electric machine 65 switches from a motoring mode of operation to a generating mode of operation. Stated another way, the torque output $\tau_{EM-M}$ provided by the electric machine 65 on the coupler 200 is decreased so that the torque output provided on the coupler 200 switches from a motor torque output $\tau_{EM-M}$ to a generator torque output $\tau_{EM-G}$. In the generating mode of operation, the power turbine 174 drives the electric machine 65. Specifically, mechanical power can be transmitted from the power turbine 174 to the coupler 200, and from the coupler 200 to the electric machine 65. When the electric machine 65 switches from motor to generator, the rotational speed $S_{EM}$ of the electric machine 65 remains synchronized with the rotational speed $S_{PT}$ of the power turbine 174.

In some alternative implementations, the torque output $\tau_{EM-M}$ provided by the electric machine 65 on the coupler 200 is decreased so that the electric machine 65 ceases providing a motor torque output $\tau_{EM-M}$ on the coupler 200, and when the electric machine 65 ceases to provide a motor torque output $\tau_{EM-M}$ on the coupler 200, the method 500 can include mechanically decoupling the electric machine 65 from the coupler 200. Mechanically decoupling the electric machine 65 from the coupler 200 can include modulating the one or more actuators 250 to move the coupler electric machine shaft 240 of the coupler 200 so that the teeth 244 of the coupler electric machine shaft 240 disengage the teeth 246 of the electric machine shaft 68.

To summarize, to mechanically couple the power turbine 174 to the coupler 200 to switch from an electric drive mode to an engine drive mode, or to switch from the third mode of operation (FIG. 6) to the fourth mode of operation (FIG. 4), the speed of the power turbine 174 is increased whilst the power turbine 174 is decoupled from the coupler 200. This allows the rotational speed $S_{PT}$ of the power turbine 174 to match or fall within the predetermined range PR1 of the rotational speed $S_{EM}$ of the electric machine 65. When the rotational speed $S_{PT}$ of the power turbine 174 matches or is within the predetermined range PR1 of the rotational speed $S_{EM}$ of the electric machine 65, the power turbine 174 is mechanically coupled with the coupler 200. In some implementations, in mechanically coupling the power turbine 174 with the coupler 200, not only must the rotational speed $S_{PT}$ of the power turbine 174 match or fall within the predetermined range PR1 of the rotational speed $S_{EM}$ of the electric machine 65, but the teeth 236 of the power turbine shaft 114 and the teeth 234 of the coupler turbine shaft 230 must be positioned for meshing engagement prior to mechanically connecting the power turbine shaft 114 and the coupler turbine shaft 230. The synchronization of the speeds of the electric machine 65 and the power turbine 174 and accounting for the position of the teeth 236, 234 of the respective shafts 114, 230 allows for smooth coupling operation. The electric machine 65 can be smoothly transitioned to a generator mode to generate electrical power or can be decoupled from the coupler 200 once the torque output $\tau_{PT}$ provided by the power turbine 174 on the coupler 200 has reached a commanded operating point.

Figure 16:
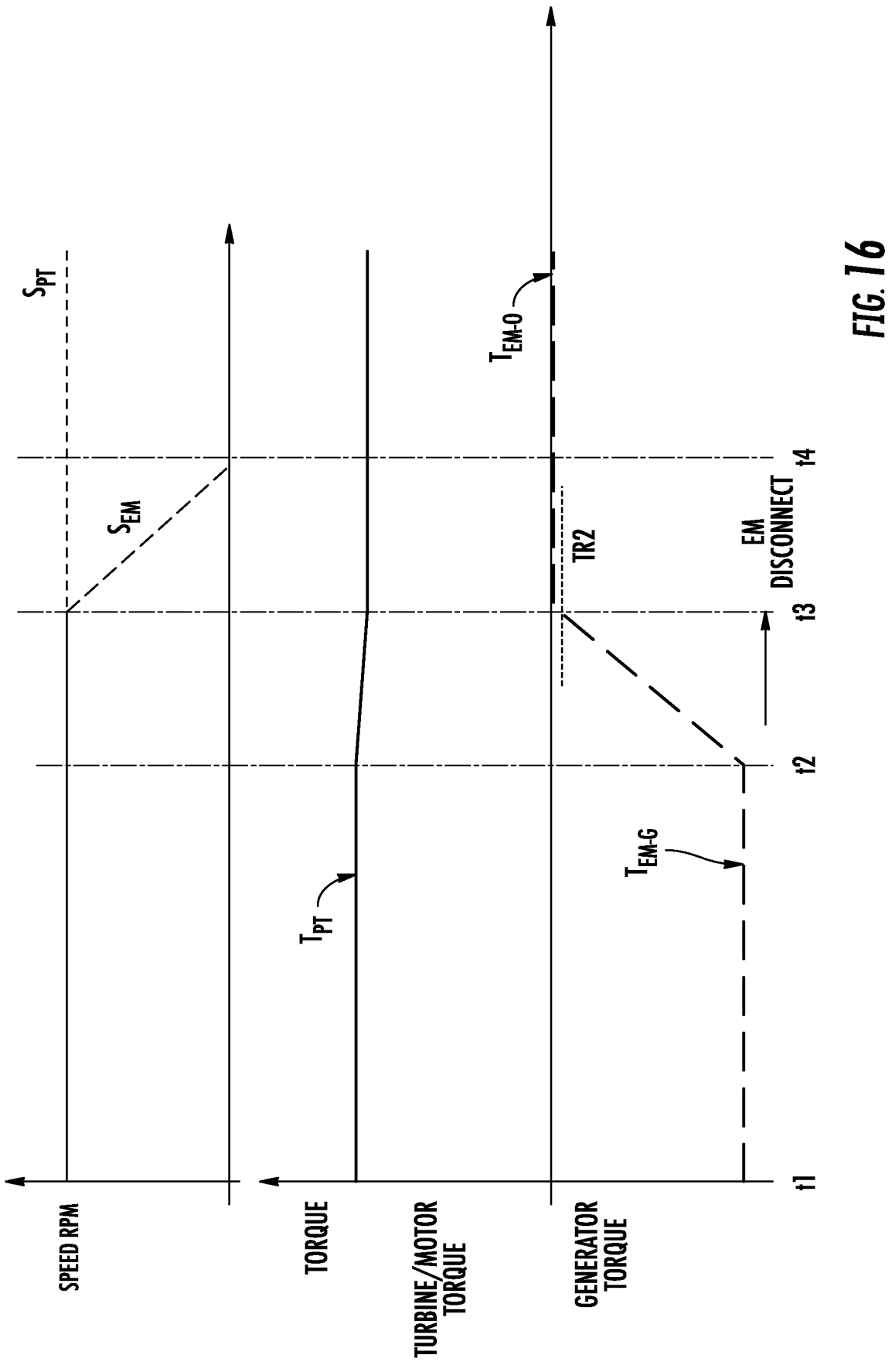
FIG. 16 is a graph corresponding to the method of decoupling the electric machine from the coupler set forth in FIG. 15 and depicts a speed of the power turbine and a speed of the electric machine as functions of time and a torque output of the power turbine and a torque output of the electric machine as functions of time.

With reference now to FIGS. 1, 2, 3, and FIGS. 15 and 16, an example manner in which an electric machine can be decoupled or disengaged from a coupler will be provided. Particularly, FIG. 15 is a flow diagram of a method 600 of decoupling an electric machine in accordance with an exemplary aspect of the present disclosure. FIG. 16 is a graph depicting speed of the power turbine and speed of the electric machine as functions of time and a torque output of the power turbine and a torque output of the electric machine as functions of time.

At 602, the method 600 includes operating an electric machine in a generator mode, the electric machine being mechanically coupled with a coupler to which a propulsor and a power turbine of a gas turbine engine are also mechanically coupled. By way of example, with reference to FIG. 16, at time t1, the propulsor 62, the power turbine 174, and the electric machine 65 are all mechanically coupled with the coupler 200. In this regard, the first propulsion assembly 60 is being operated in the first mode of operation or "all engaged" mode.

Further, from time t1 to time t2, the power turbine 174 is operating in a driving mode. Thus, the power turbine 174 provides a torque output $\tau_{PT}$ on the coupler 200 to drive the propulsor 62. Stated another way, the gas turbine engine 69 can be operated to cause the power turbine 174 to rotate. Mechanical power can be transmitted from the power turbine 174 to the coupler 200 and from the coupler 200 to the propulsor 62, e.g., by way of the transmission shaft 212 (FIG. 3). In this way, the propulsor 62 can produce thrust for the aircraft 10.

In addition, from time t1 to time t2, the electric machine 65 acts as an electric generator to generate electrical power. The power turbine 174 drives the electric machine 65. Mechanical power can be transmitted from the power turbine 174 to the coupler 200 and from the coupler 200 to the electric machine 65. Accordingly, the electric machine 65 applies "drag" on the power turbine 174, or rather, applies a generator torque output $\tau_{EM-G}$ on the coupler 200. The power turbine 174 and the electric machine 65 have a same rotational speed from time t1 to time t2, and also from time t2 to time t3 as depicted in FIG. 16.

At 604, the method 600 includes, in response to an electric machine decouple command, decreasing a generator torque output that the electric machine applies on the coupler over an electric machine unloading period. Continuing with the example provided in FIG. 16, at time t2, an electric machine decouple command 308 (FIG. 10) can be received, e.g., by one or more processors of the computing system 96 (FIG. 10). In response to the electric machine decouple command 308, an electric machine unloading operation can be performed. The electric machine unloading operation can include decreasing the generator torque output $\tau_{EM-G}$ that the electric machine 65 applies on the coupler 200 over the electric machine unloading period. In this regard, the load that the electric machine 65 puts on the power turbine 174 decreases. As depicted, the generator torque output $\tau_{EM-G}$ that the electric machine 65 applies on the coupler 200 can be decreased linearly over the electric machine unloading period.

In some implementations, the torque output $\tau_{PT}$ provided on the coupler 200 by the power turbine 174 can decrease, e.g., linearly, over the electric machine unloading period, or a time period spanning from time t2 to time t3 in this example. In this way, the rotational speed $S_{PT}$ of the power turbine 174 can be maintained at a constant speed despite the decreasing load or generator torque output $\tau_{EM-G}$ applied by the electric machine 65 on the coupler 200. For instance, the fuel flow to the combustor 152 can be decreased to decrease the torque output $\tau_{PT}$ provided on the coupler 200 by the power turbine 174. In other implementations, the torque output $\tau_{PT}$ provided on the coupler 200 by the power turbine 174 can remain constant over the electric machine unloading period.

At 606, the method 600 includes, decoupling the electric machine from the coupler when the generator torque output that the electric machine applies on the coupler reaches a predetermined threshold. For instance, as shown in FIG. 16, at time t3, the generator torque output $\tau_{EM\text{-}G}$ that the electric machine 65 applies on the coupler 200 reaches a predetermined threshold TR2. Consequently, at time t3, the electric machine 65 is decoupled from the coupler 200. When the electric machine 65 is decoupled at time t3, the rotational speed $S_{EM}$ of the electric machine 65 decreases as the electric machine 65 is no longer mechanically coupled with the coupler 200 and thus mechanical power is being transmitted thereto. At time t4, the electric machine 65 ceases rotating while the power turbine 174 maintains its rotational speed $S_{PT}$. Unloading the generator torque output $\tau_{EM\text{-}G}$ applied by the electric machine 65 on the coupler 200 prior to decoupling the electric machine 65 therefrom facilitates a smooth decoupling operation.

In some implementations, decoupling the electric machine from the coupler 200 includes modulating the one or more actuators 250 to move the coupler electric machine shaft 240 of the coupler 200 so that the teeth 244 of the coupler electric machine shaft 240 disengage from the teeth 246 of the electric machine shaft 68, e.g., as shown in FIG. 5.

Inputs received from the resolver 206 associated with the power turbine shaft 114 and the resolver 204 associated with the electric machine shaft 68 can be used to monitor the generator torque output $\tau_{EM\text{-}G}$ provided by the electric machine 65 on the coupler 200 and the torque output provided by the power turbine 174 on the coupler 200 during the electric machine unloading operation. Particularly, these inputs can be used for determining when the generator torque output $\tau_{EM\text{-}G}$ provided by the electric machine 65 on the coupler 200 reaches the predetermined threshold TR2.

To summarize, to mechanically decouple the electric machine 65 to switch from the first mode of operation (FIG. 4) to the fourth mode of operation (FIG. 7), the generator torque output $\tau_{EM\text{-}G}$ provided by the electric machine 65 on the coupler 200 is decreased to "unload" the electric machine 65. The torque output $\tau_{PT}$ provided by the power turbine 174 on the coupler 200 can remain the same or can be decreased over the unloading period. When the generator torque output $\tau_{EM\text{-}G}$ provided by the electric machine 65 on the coupler 200 reaches a predetermined threshold TR2, the electric machine 65 is mechanically decoupled from the coupler 200. The controlled unloading of the generator torque output $\tau_{EM\text{-}G}$ allows for a smooth decoupling of the electric machine 65.

Figure 18:
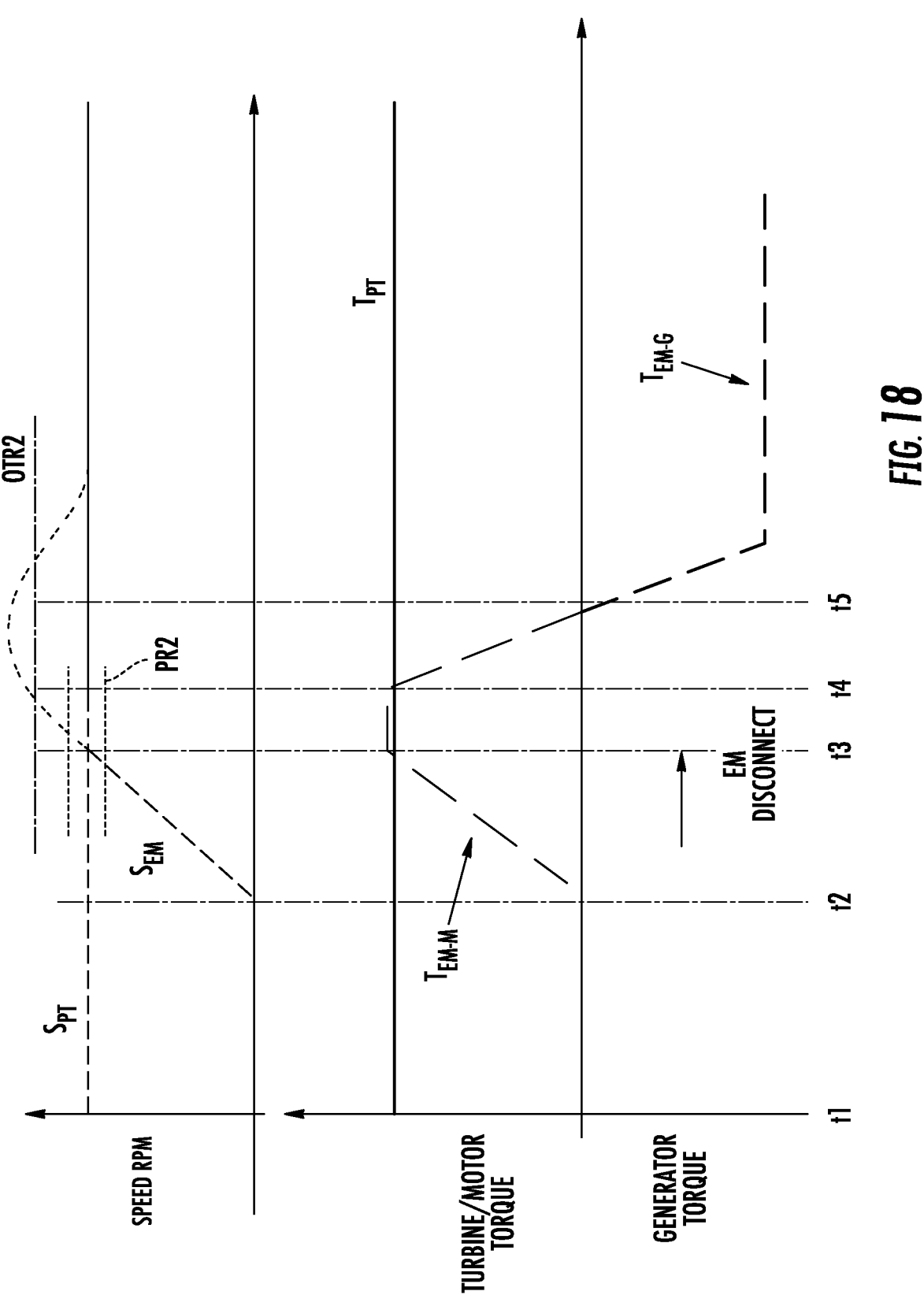
FIG. 18 is a graph corresponding to the method of coupling the electric machine to the coupler set forth in FIG. 17 and depicts a speed of the power turbine and a speed of the electric machine as functions of time and a torque output of the power turbine and a torque output of the electric machine as functions of time.

With reference now to FIGS. 1, 2, 3, and FIGS. 17 and 18, an example manner in which an electric machine can be decoupled or disengaged from a coupler will be provided. Particularly, FIG. 17 is a flow diagram of a method 700 of coupling an electric machine in accordance with an exemplary aspect of the present disclosure. FIG. 18 is a graph depicting speed of the power turbine and speed of the electric machine as functions of time and a torque output of the power turbine and a torque output of the electric machine as functions of time.

At 702, the method 700 includes providing, by a power turbine of a gas turbine engine, a torque output on a coupler mechanically coupled with a propulsor so that the power turbine drives the propulsor. By way of example, with reference to FIG. 18, at time t1, the propulsor 62 and the power turbine 174 are mechanically coupled with the coupler 200 while the electric machine 65 is decoupled from the coupler 200. In this regard, the first propulsion assembly 60 is being operated in the second mode of operation or the "engine drive mode" at time t1. Particularly, at time t1, the power turbine 174 provides a torque output $\tau_{PT}$ on the coupler 200. Accordingly, mechanical power can be transmitted from the power turbine 174 to the coupler 200 and from the coupler 200 to the propulsor 62. In this way, the propulsor 62 can produce thrust for the aircraft 10. FIG. 5 schematically depicts the coupler 200 in the second mode of operation, or the "engine drive mode".

At 704, the method 700 includes, in response to an electric machine couple command, increasing, while an electric machine is mechanically decoupled from the coupler, a rotational speed of the electric machine to match or be within a predetermined range of a rotational speed of the power turbine.

Continuing with the example provided in FIG. 18, at time t2, an electric machine couple command 306 (FIG. 10) can be received, e.g., by one or more processors of the computing system 96 (FIG. 10). In response to the electric machine couple command 306, a speed matching operation can be performed. As depicted in FIG. 18, at time t2, the rotational speed $S_{EM}$ of the electric machine 65 begins increasing. To achieve the increase in rotational speed $S_{EM}$ of the electric machine 65, electrical power can be directed to the electric machine 65. As one example, electrical power from the battery 82 can be directed to the electric machine 65 so that the electric machine 65 increases speed. As another example, electrical power generated by the electric machine 76 of the second propulsion assembly 70 can be directed to the electric machine 65 so that the electric machine 65 increases speed. The torque output or motoring torque $\tau_{EM\text{-}M}$ of the electric machine 65 increases proportionally with the increase in rotational speed $S_{EM}$ of the electric machine 65, however, the motoring torque $\tau_{EM\text{-}M}$ of the electric machine 65 is not applied to the coupler 200 during the speed matching period, or a time spanning between time t2 and time t3 in this example, as the electric machine 65 is not yet coupled with the coupler 200 during this time period.

As shown in FIG. 18, the rotational speed $S_{EM}$ of the electric machine 65 is increased until it matches or is within a predetermined range PR2 of the rotational speed $S_{PT}$ of the power turbine 174. In this example, the rotational speed $S_{EM}$ of the electric machine 65 matches or is within a predetermined range PR2 of the rotational speed $S_{PT}$ of the electric machine 65 at time t3. In this regard, the rotational speed $S_{EM}$ of the electric machine 65 increases from time t2 to time t3.

In some implementations, the method 700 can include monitoring whether the rotational speed $S_{EM}$ of the electric machine shaft 68 matches or is within the predetermined range PR2 of the rotational speed $S_{PT}$ of the power turbine shaft 114 based at least in part on one or more inputs received from the resolver 204 associated with the electric machine shaft 68 and one or more inputs received from the resolver 206 associated with the power turbine shaft 114. The inputs provided by the resolvers 204, 206 can indicate a rotational speed and an angular position of their associated shafts 68, 114.

In some implementations, the rotational speed $S_{EM}$ of the electric machine 65 can be increased linearly during the speed matching operation as shown in FIG. 18. This may allow for improved predictions as to when the rotational speed $S_{EM}$ of the electric machine 65 is expected to match or fall within the predetermined range PR2 of the rotational speed $S_{PT}$ of the power turbine shaft 114. The one or more processors of the computing system 96 may predict when the rotational speed $S_{EM}$ of the electric machine 65 is expected to match or fall within the predetermined range PR2 of the rotational speed $S_{PT}$ of the power turbine shaft 114 so that the first AC/DC converter 90 and/or other power electronics of the hybrid-electric propulsion system 50 can be controlled intelligently.

At 706, the method 700 includes mechanically coupling the electric machine with the coupler when the rotational speed of the electric machine matches or is within the predetermined range of the rotational speed of the power turbine. Continuing with the example from above, with the rotational speed $S_{EM}$ of the electric machine 65 matched or within the predetermined range PR2 of the rotational speed $S_{PT}$ of the power turbine 174, the electric machine 65 can be mechanically coupled with the coupler 200. Mechanically coupling the electric machine 65 to the coupler 200 can include modulating the one or more actuators 250 to move the coupler electric machine shaft 240 of the coupler 200 so that the teeth 244 of the coupler electric machine shaft 240 engage the teeth 246 of the electric machine shaft 68. When the electric machine 65 is mechanically coupled with the coupler 200, the electric machine 65 applies or provides a motor torque output $\tau_{EM-M}$ on the coupler 200.

In some implementations, after the electric machine 65 is mechanically coupled to the coupler 200, the motor torque output $\tau_{EM-M}$ provided by the electric machine 65 on the coupler 200 can be held constant or substantially constant for a predetermined time. For instance, as shown in FIG. 18, the motor torque output $\tau_{EM-M}$ provided by the electric machine 65 on the coupler 200 is held constant or substantially constant for a predetermined time, which corresponds to a time period spanning from time t3 to time t4. This may prevent or reduce the chance of an overspeed condition of the electric machine 65. For instance, this may prevent the rotational speed $S_{EM}$ of the electric machine 65 from reaching an overspeed threshold OTR2.

In some implementations, after the electric machine 65 is mechanically coupled to the coupler 200, the method 700 can further include decreasing the motor torque output $\tau_{EM-M}$ provided by the electric machine 65 on the coupler 200. For instance, as shown in FIG. 18, after the motor torque output $\tau_{EM-M}$ is held constant from time t3 to time t4, the motor torque output $\tau_{EM-M}$ provided by the electric machine 65 on the coupler 200 is decreased from time t4 to time t5. The motor torque output $\tau_{EM-M}$ can be decreased linearly, for example. At time t5, the electric machine 65 ceases applying a motor torque output $\tau_{EM-M}$ on the coupler 200. Accordingly, in some implementations, the method 700 can include decreasing the motor torque output $\tau_{EM-M}$ provided by the electric machine 65 on the coupler 200 so that the electric machine 65 ceases providing a motor torque output $\tau_{EM-M}$ on the coupler 200.

Further, in some implementations, the torque output $\tau_{EM-M}$ provided by the electric machine 65 on the coupler 200 is decreased so that the electric machine 65 may switch from a motoring mode to a generating mode, e.g., so that the electric machine 65 generates electrical power. For instance, as depicted in FIG. 18, at time t5, the electric machine 65 switches from a motoring mode of operation to a generating mode of operation. Stated another way, the torque output $\tau_{EM-M}$ provided by the electric machine 65 on the coupler 200 is decreased so that the torque output provided on the coupler 200 switches from a motor torque output $\tau_{EM-M}$ to a generator torque output $\tau_{EM-G}$. In the generating mode of operation, the power turbine 174 drives the electric machine 65. Specifically, mechanical power can be transmitted from the power turbine 174 to the coupler 200, and from the coupler 200 to the electric machine 65. When the electric machine 65 switches from motor to generator, the rotational speed $S_{EM}$ of the electric machine 65 can remain synchronized with the rotational speed $S_{PT}$ of the power turbine 174 as shown in FIG. 18.

To summarize, to mechanically couple the electric machine 65 to utilize it for electrical power generation, or to switch from the second mode of operation (FIG. 5) to the first mode of operation (FIG. 4), the speed of the electric machine 65 is first increased so that the rotational speed $S_{EM}$ of the electric machine 65 matches or is within the predetermined range PR2 of the rotational speed $S_{PT}$ of the power turbine 174. When the rotational speed $S_{EM}$ of the electric machine 65 matches or is within the predetermined range PR2 of the rotational speed $S_{PT}$ of the power turbine 174, the electric machine 65 is mechanically coupled with the coupler 200. In some implementations, in mechanically coupling the electric machine 65 with the coupler 200, not only must the rotational speed $S_{EM}$ of the electric machine 65 match or fall within the predetermined range PR2 of the rotational speed $S_{PT}$ of the power turbine 174, but the teeth 246 of the electric machine shaft 68 and the teeth 244 of the coupler electric machine shaft 240 must be positioned for meshing engagement prior to mechanically connecting the electric machine shaft 68 and the coupler electric machine shaft 240. The synchronization of the speeds of the electric machine 65 and the power turbine 174 and accounting for the position of the teeth 246, 244 of the respective shafts 68, 240 allows for smooth coupling operation. As the electric machine 65 acts a motor to increase its speed to match the speed of the power turbine 174, when mechanically coupled, the electric machine 65 applies a motor torque output $\tau_{EM-M}$ to the coupler 200. To switch the electric machine 65 from operating in a motor mode to a generator mode, the motor torque output $\tau_{EM-M}$ applied to the coupler 200 by the electric machine 65 is decreased so that the electric machine 65 can be smoothly transitioned to a generator mode.

Figure 19:
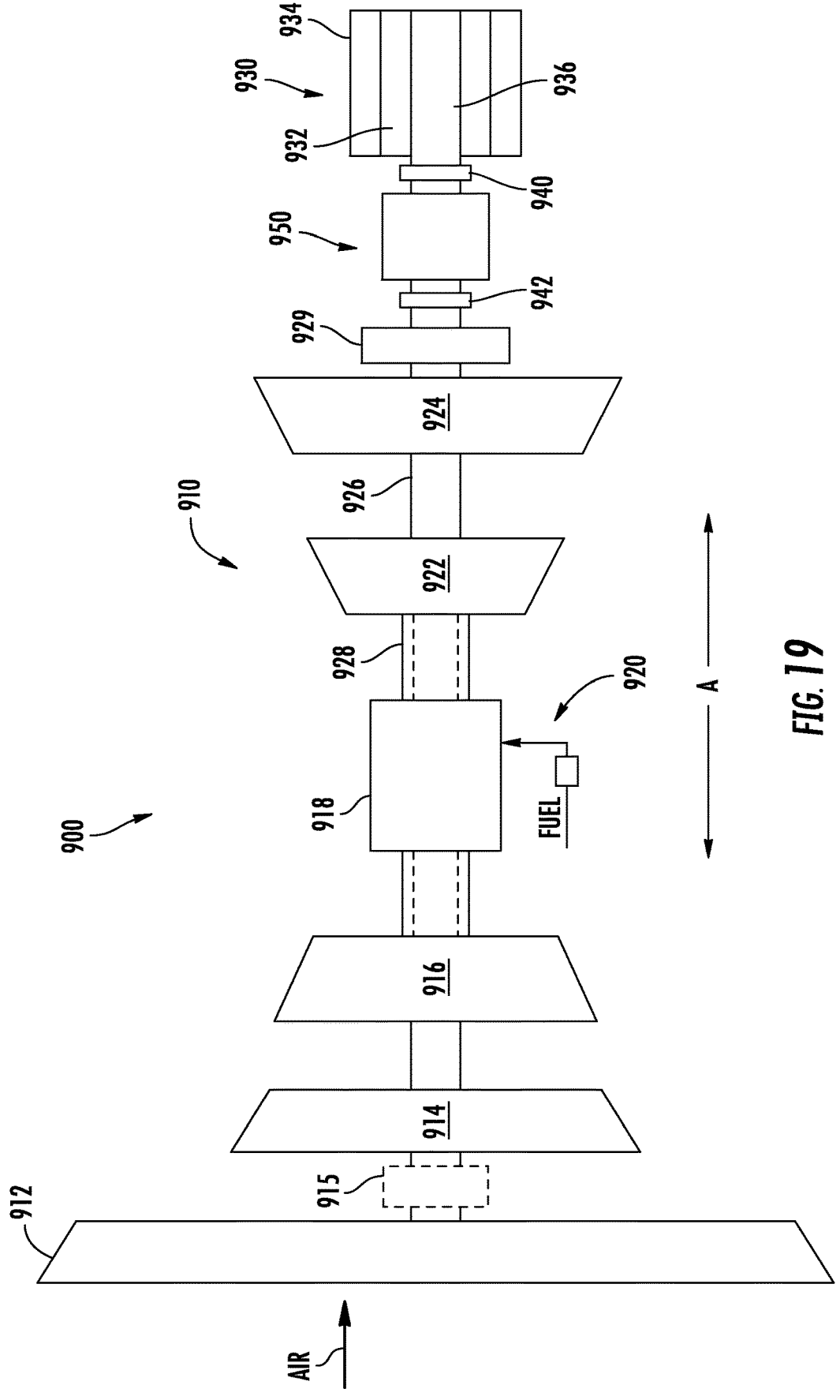
FIG. 19 is a schematic cross-sectional view of a propulsion assembly for an aircraft in accordance with an exemplary aspect of the present disclosure.

FIG. 19 is a schematic cross-sectional view of a propulsion assembly 900 for an aircraft in accordance with an exemplary aspect of the present disclosure. As depicted in the example of FIG. 19, the propulsion assembly 900 includes a gas turbine engine 910 and an electric machine 930 that is selectively mechanically engageable with a spool thereof by way of a coupler 950. The gas turbine engine 910 can be a turbofan for an aircraft, for example.

For this embodiment, the gas turbine engine 910 includes a fan 912, which may be ducted by a fan casing or may be unducted. The gas turbine engine 910 includes core turbine engine that includes, in a serial flow relationship, a compressor section, a combustion section, a turbine section, and an exhaust section. The compressor section includes a booster or low pressure compressor 914 and a high pressure compressor 916. The combustion section includes a combustor 918. A fuel system 920 may provide fuel to the combustor 918. The turbine section includes a high pressure turbine 922 and a low pressure turbine 924. The low pressure compressor 914 and the low pressure turbine 924 are mechanically coupled by a low pressure shaft 926. The low pressure compressor 914, the low pressure turbine 924, and the low pressure shaft 926 collectively form a low pressure spool. The high pressure compressor 916 and the high pressure turbine 922 are mechanically coupled by a high pressure shaft 928. The high pressure compressor 916, the high pressure turbine 922, and the high pressure shaft 928 collectively form a high pressure spool. In some embodiments, the gas turbine engine 910 can optionally include a gearbox 915 that mechanically couples the fan 912 with the low pressure shaft 926. The gearbox 915 can include a plurality of gears for stepping down the rotational speed of the low pressure shaft 926 to provide a more efficient rotational fan speed.

The electric machine 930 has a rotor 932 and a stator 934 and has an associated electric machine shaft 936. The electric machine 930 and the electric machine shaft 936 form at least a part of an electric machine assembly. The electric machine 930 is operable in a motor mode and a generator mode. The coupler 950 is configured and may be controlled in the same manner as the coupler 200 shown and described herein, except that, for this embodiment, the coupler 950 is a two-way coupler. The coupler 200 provided herein is configured as a three-way coupler. The low pressure shaft 926 and the electric machine shaft 936 associated with the electric machine 930 are both selectively mechanically engageable with the coupler 950, e.g., with respective coupler shafts of the coupler 950. In this regard, the electric machine 930 is selectively mechanically engageable with the low pressure spool. A resolver 940 associated with the electric machine shaft 936 can provide speed and position inputs associated with the electric machine shaft 936 and a resolver 942 associated with the low pressure shaft 926 can provide speed and position inputs associated with the low pressure shaft 926.

Further, optionally, the gas turbine engine 910 can include a brake 929 that is selectively mechanically engageable with a shaft that is selectively mechanically engageable with the coupler 950. For instance, for the depicted embodiment of FIG. 19, the brake 929 is selectively mechanically engageable with the low pressure shaft 926. However, in other embodiments, the brake 929 can be selectively mechanically engageable with the electric machine shaft 936. The brake 929, when commanded, can mechanically engage the low pressure shaft 926, e.g., to reduce the rotational speed thereof. In some other embodiments, the gas turbine engine 910 can include at least two brakes, including a first brake selectively mechanically engageable the low pressure shaft 926 and a second brake selectively mechanically engageable the electric machine shaft 936. Although the brake 929 is depicted in the illustrated embodiment of FIG. 19, it will be appreciated that a brake can be incorporated in other embodiments provided herein, such as in the embodiments of FIGS. 2 and 23.

Figure 20:
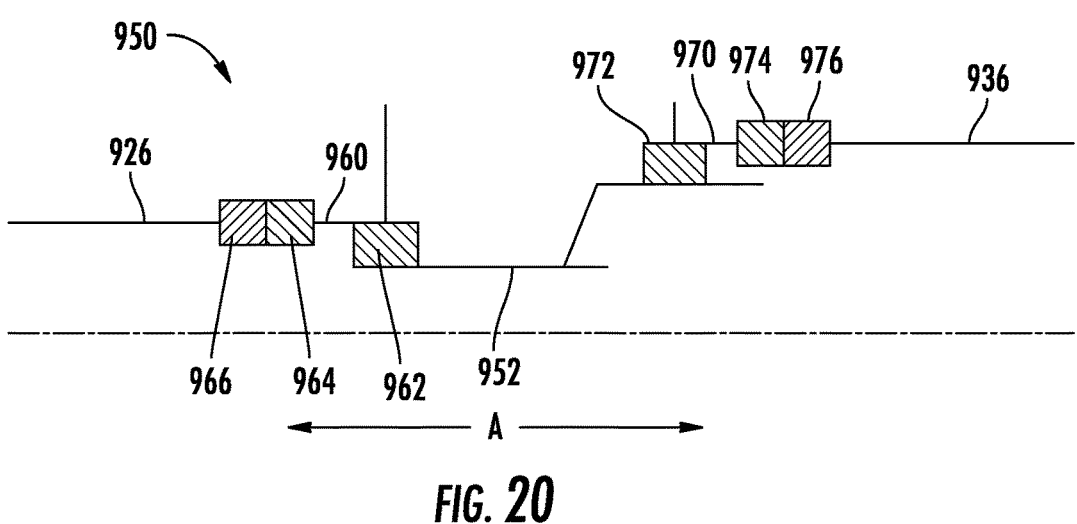
FIG. 20 is a schematic view of a coupler of the propulsion assembly of FIG. 19 and depicts a first mode of operation in which a low pressure shaft and an electric machine shaft are mechanically coupled with the coupler.

In a first mode of operation, the low pressure shaft 926 and the electric machine shaft 936 can be mechanically coupled with the coupler 950. FIG. 20 is a schematic view of the coupler 950 of FIG. 19 and depicts the first mode of operation in which the low pressure shaft 926 and the electric machine shaft 936 are mechanically coupled with the coupler 950. That is, torque transmitting features of the low pressure shaft 926 are engaged with torque transmitting features of a coupler shaft 960 of the coupler 950 and torque transmitting features of the electric machine shaft 936 are engaged with torque transmitting features of a coupler electric machine shaft 970 of the coupler 950. Specifically, as shown, teeth 964 of the coupler shaft 960 are engaged with teeth 966 of the low pressure shaft 926. Thus, the low pressure spool, which includes the low pressure turbine 924 (FIG. 19), is mechanically coupled with the coupler 950. Moreover, teeth 974 of the coupler electric machine shaft 970 are engaged with teeth 976 of the electric machine shaft

936. Thus, the electric machine 930 is mechanically coupled with the coupler 950. As they electric machine 930 and the low pressure spool are both mechanically coupled with the coupler 950, they are effectively mechanically coupled with each other and mechanical power can be transmitted therebetween, e.g., by a transmission shaft 952 of the coupler 950. In the first mode of operation, the electric machine 930 can be driven by the low pressure spool, or rather, the low pressure turbine 924, to operate in a generator mode. Alternatively, the electric machine 930 can be operated in a motor mode to drive the low pressure spool, e.g., for a power assist during a takeoff or climb phase of flight.

Figure 21:
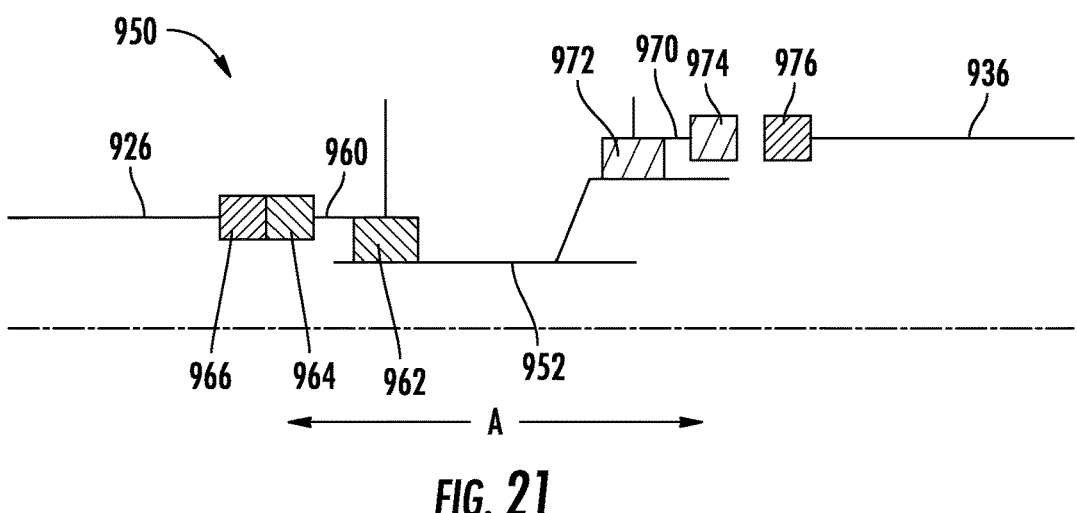
FIG. 21 is a schematic view of the coupler of the propulsion assembly of FIG. 19 and depicts a second mode of operation in which the low pressure shaft is mechanically coupled with the coupler while the electric machine shaft is mechanically decoupled from the coupler.

In a second mode of operation, the low pressure shaft 926 can be mechanically coupled with the coupler 950 while the electric machine shaft 936 is mechanically decoupled from the coupler 950. FIG. 21 is a schematic view of the coupler 950 of FIG. 19 and depicts the second mode of operation in which the low pressure shaft 926 is mechanically coupled with the coupler 950 while the electric machine shaft 936 is mechanically decoupled from the coupler 950. Particularly, as shown, the teeth 964 of the coupler shaft 960 are engaged with the teeth 966 of the low pressure shaft 926. Thus, the low pressure spool, which includes the low pressure turbine 924 (FIG. 19), is mechanically coupled with the coupler 950. Moreover, the teeth 974 of the coupler electric machine shaft 970 are disengaged from the teeth 976 of the electric machine shaft 936. One or more actuators (not shown) can move the coupler electric machine shaft 970 along the axial direction A (to the left in FIG. 21), causing the teeth 974 of the coupler electric machine shaft 970 to disengage from the teeth 976 of the electric machine shaft 936. In this way, the electric machine 930 is mechanically decoupled from the coupler 950, and consequently, the electric machine 930 is mechanically decoupled from the low pressure spool. A linear bearing 972 is disposed between the transmission shaft 952 and the coupler electric machine shaft 970, e.g., along the radial direction. The linear bearing 972 facilitates linear movement of the coupler electric machine shaft 970 relative to the transmission shaft 952. The linear bearing 972 can be a ball spline, for example.

The electric machine 930 can be decoupled from the coupler 950 for various reasons, such as detection of an electric machine failure. By decoupling the electric machine 930, e.g., in the event of an electric machine failure, the low pressure spool need not "drag" the electric machine 930 along therewith and permanent solutions for disconnecting the electric machine 930 need not be taken, such as by using a cutter to "cut" the shaft coupling the electric machine 930 to the low pressure spool.

Moreover, in some embodiments, in response to detection of a failure associated with the electric machine 930, the electric machine 930 can be mechanically decoupled from the low pressure shaft 926 after an unloading period, and during the unloading period, the brake 929 can be controlled to mechanically engage the low pressure shaft 926 to reduce the rotational speed of the low pressure shaft 926, and consequently, the rotor 932 of the electric machine 930. This may prevent damage to the coupler 950 and may also reduce the rotational speed of the electric machine 930 quicker than if the brake 929 was not applied. In yet other embodiments, in response to detection of a failure associated with the electric machine 930, the electric machine 930 can remain mechanically coupled with the coupler 950 and the brake 929 can be controlled to mechanically engage the low pressure shaft 926 to reduce the rotational speed of the low pressure shaft 926, and consequently, the rotor 932 of the electric machine 930. This may help reduce further damage to the electric machine 930 or allow for a health assessment of the electric machine 930 at reduced speed.

Figure 22:
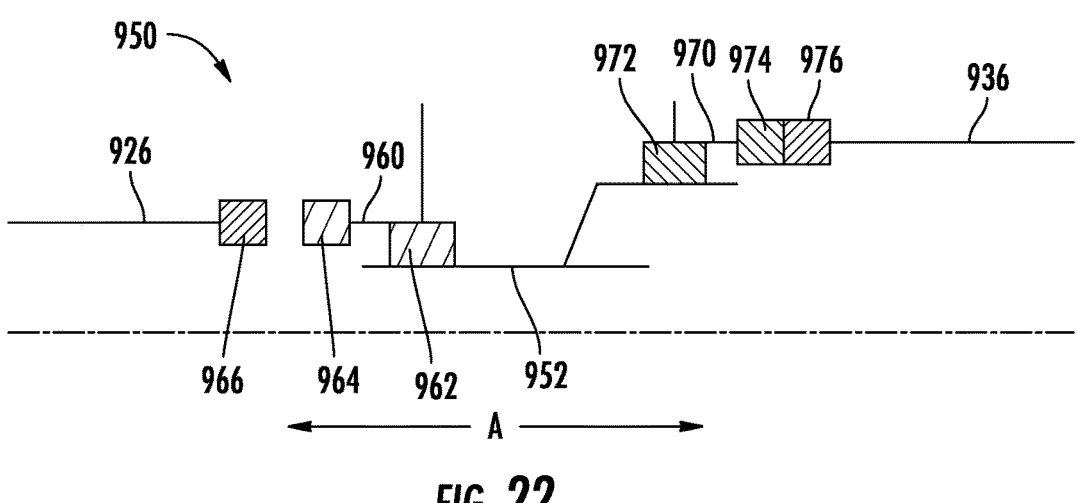
FIG. 22 is a schematic view of the coupler of the propulsion assembly of FIG. 19 and depicts a third mode of operation in which the electric machine shaft is mechanically coupled with the coupler while the low pressure shaft is mechanically decoupled from the coupler.

In a third mode of operation, the electric machine shaft 936 can be mechanically coupled with the coupler 950 while the low pressure shaft 926 is mechanically decoupled from the coupler 950. FIG. 22 is a schematic view of the coupler 950 of FIG. 19 and depicts the third mode of operation in which the electric machine shaft 936 is mechanically coupled with the coupler 950 while the low pressure shaft 926 is mechanically decoupled from the coupler 950. Particularly, as shown, the teeth 974 of the coupler electric machine shaft 970 are engaged with the teeth 976 of the electric machine shaft 936. In this regard, the electric machine 930 is mechanically coupled with the coupler 950. Moreover, the teeth 964 of the coupler shaft 960 are disengaged with the teeth 966 of the low pressure shaft 926. Thus, the low pressure spool, which includes the low pressure turbine 924 (FIG. 19), is mechanically decoupled from the coupler 950. One or more actuators (not shown) can move the coupler shaft 960 along the axial direction A (to the right in FIG. 22), causing the teeth 964 of the coupler shaft 960 to disengage from the teeth 966 of the low pressure shaft 926. In this way, the low pressure spool is mechanically decoupled from the coupler 950. A linear bearing 962 is disposed between the transmission shaft 952 and the coupler shaft 960, e.g., along the radial direction. The linear bearing 962 facilitates linear movement of the coupler shaft 960 relative to the transmission shaft 952. The linear bearing 962 can be a ball spline, for example. It may be desirable to implement the third mode of operation as an alternative to implementing the second mode of operation.

It will be appreciated that modes of operation other than those depicted in FIGS. 20 through 22 are possible. For instance, in another mode of operation, all shafts can be disengaged from the coupler 950.

In one example decoupling scheme, with reference to FIG. 19, one or more processors of a computing system of an aircraft can be configured to cause the electric machine 930 to operate in a generator mode to generate electrical power. Accordingly, at this instance, the electric machine 930 and the turbine, e.g., the low pressure turbine 924, are mechanically coupled with the coupler 950. In response to an electric machine decouple command 308 (FIG. 10), the one or more processors can cause a decrease in a generator torque output that the electric machine 930 applies on the coupler 950 over an unloading period. When the generator torque output that the electric machine 930 applies on the coupler 950 reaches a predetermined threshold, the one or more processors can cause one or both of the electric machine 930 and the low pressure turbine 924 to mechanically decouple from the coupler 950. Decoupling either component will effectively decouple the electric machine 930 from the low pressure turbine 924.

In another example decoupling scheme, one or more processors of a computing system of an aircraft can be configured to cause the electric machine 930 to operate in a generator mode with both the electric machine 930 and the low pressure turbine 924 mechanically coupled with the coupler 950. In response to an electric machine decouple command 308 (FIG. 10), which is generated based on a detected failure associated with the electric machine 930 or electrical system generally, the one or more processors can cause a decrease in a generator torque output that the electric machine 930 applies on the coupler 950 over an unloading period. During the unloading period, the one or more processors can activate the brake 929 to mechanically engage the low pressure shaft 926, e.g., to reduce the rotational speed of the low pressure shaft 926 and the electric machine 930 more rapidly. When the generator torque output that the electric machine 930 applies on the coupler 950 reaches a predetermined threshold, the one or more processors can cause one or both of the electric machine 930 and the low pressure turbine 924 to mechanically decouple from the coupler 950. Decoupling either component will effectively decouple the electric machine 930 from the low pressure turbine 924. Once the electric machine 930 is mechanically decoupled from the low pressure turbine 924, the one or more processors can cause the brake 929 to deactivate or mechanically decouple from the low pressure shaft 926. The one or more processors can also cause the cause the brake 929 to deactivate or mechanically decouple from the low pressure shaft 926 prior to the mechanically decoupling of the electric machine 930 from the low pressure turbine 924. For instance, the brake 929 can be caused to deactivate or mechanically decouple from the low pressure shaft 926 after a predetermined time (e.g., after two seconds), upon a condition being satisfied (e.g., the speed of the low pressure shaft 926 reaching a predetermined speed), etc.

In one example coupling scheme, with reference to FIG. 19, one or more processors of a computing system of an aircraft can be configured to cause the turbine, e.g., the low pressure turbine 924, to provide a torque output on the coupler 950. Further, in response to an electric machine couple command 306 (FIG. 10), the one or more processors cause, while the electric machine 930 is mechanically decoupled from the coupler 950, an increase in a rotational speed of the electric machine 930 (e.g., a rotational speed of the electric machine shaft 936) to match or be within a predetermined range of a rotational speed of the low pressure turbine 924 (e.g., a rotational speed of the low pressure shaft 926). Moreover, when the rotational speed of the electric machine 930 matches or is within the predetermined range of the rotational speed of the low pressure turbine 924, the one or more processors are configured to cause the electric machine 930 to become mechanically coupled with the coupler 950.

In some embodiments, when the rotational speed of the electric machine 930 matches or is within the predetermined range of the rotational speed of the low pressure turbine 924, the one or more processors cause the electric machine 930 to provide a motor torque output on the coupler 950, wherein the motor torque output is held constant or substantially constant for a predetermined time after the electric machine 930 is mechanically coupled with the coupler 950. This may prevent an overspeed condition of the rotating components. In other embodiments, particularly where predictions are made as to when the rotational speed of the electric machine 930 is expected to match or fall within the predetermined range of the rotational speed of the low pressure turbine 924, the motor torque output need not be held constant or substantially constant for a predetermined time after the electric machine 930 is mechanically coupled with the coupler 950.

Further, in some embodiments, after the motor torque output provided by the electric machine 930 on the coupler 950 is held constant or substantially constant for the predetermined time or directly after the electric machine 930 is mechanically coupled with the coupler 950, the one or more processors are further configured to cause the motor torque output provided by the electric machine 930 on the coupler 950 to decrease, e.g., linearly. In some embodiments, the motor torque output provided by the electric machine 930 on the coupler 950 is decreased so that the electric machine 930 ceases providing a motor torque output on the coupler 950. In other embodiments, the motor torque output provided by the electric machine 930 on the coupler 950 is decreased so that the electric machine 930 switches from a motoring mode to a generating mode to generate electrical power, or rather, so that the electric machine 930 provides a generator torque output on the coupler 950.

In some embodiments, in causing the electric machine 930 to be mechanically coupled with the coupler 950, the one or more processors are configured to modulate one or more actuators to move a coupler electric machine shaft of the coupler 950 so that teeth of the coupler electric machine shaft engage teeth of the electric machine shaft 936.

In some example embodiments, in addition or alternatively to the electric machine 930 and coupler 950, an electric machine can be selectively mechanically coupled with the high pressure spool of the gas turbine engine 910 of FIG. 19 via a coupler. The coupler can be a two-way coupler, for example. In yet other embodiments, an electric machine can be selectively mechanically coupled with an intermediate pressure spool of a gas turbine engine via a coupler, wherein the gas turbine engine includes a high pressure spool, a low pressure spool, and the intermediate pressure spool.

Figure 23:
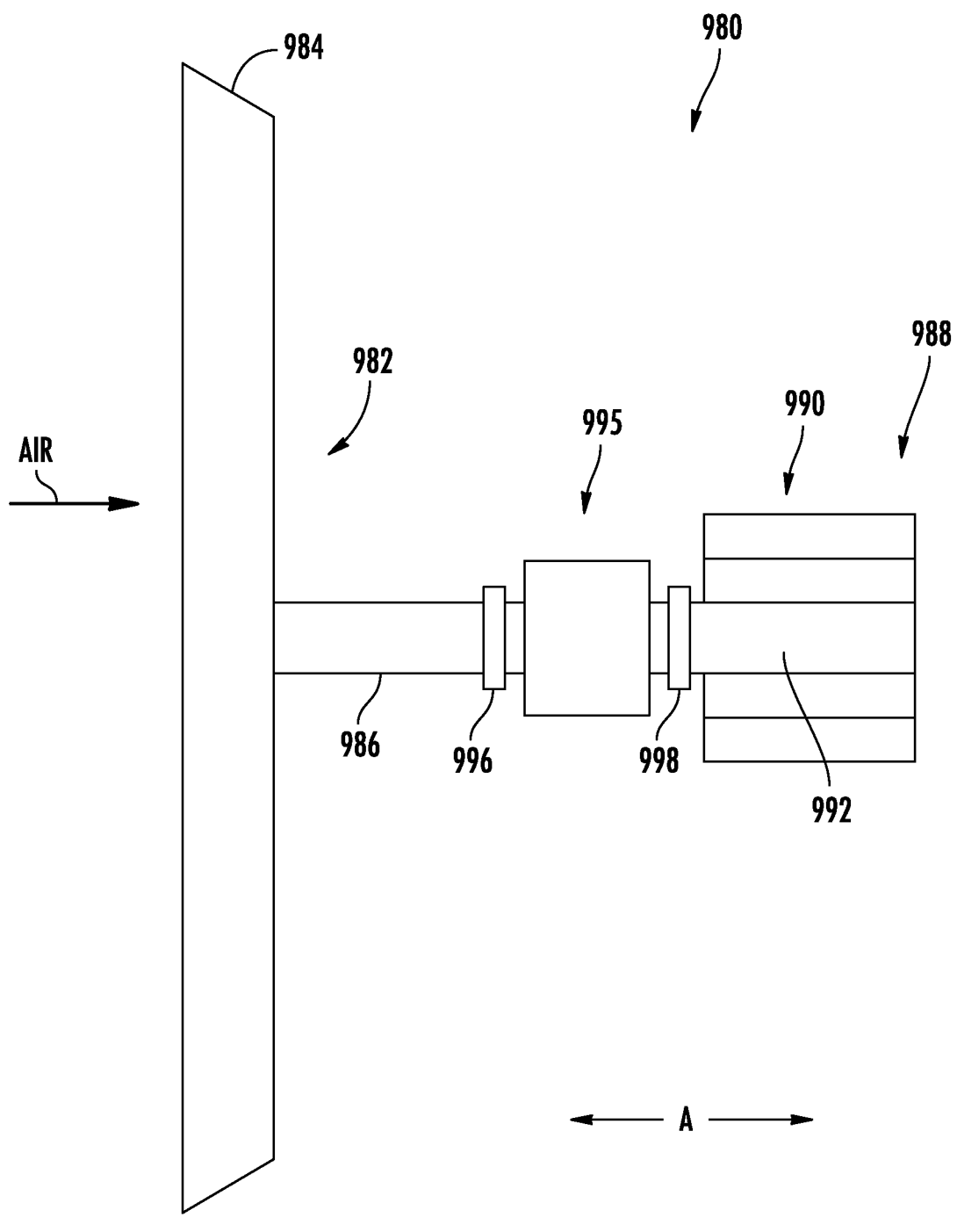
FIG. 23 is a schematic cross-sectional view of a propulsion assembly for an aircraft in accordance with an exemplary aspect of the present disclosure.

FIG. 23 provides a schematic view of a propulsion assembly 980 for an aircraft in accordance with an exemplary aspect of the present disclosure. The propulsion assembly 980 includes a propulsor assembly 982 having a propulsor 984 and a propulsor shaft 986 mechanically coupled with the propulsor 984. The propulsor 984 can be a fan or propeller, for example. The propulsion assembly 980 also includes an electric machine assembly 988 having an electric machine 990 and an electric machine shaft 992 mechanically coupled with the electric machine 990. The propulsion assembly 980 further includes a coupler 995. The electric machine shaft 992 is selectively mechanically engageable with the coupler 995. Also, the propulsor shaft 986 is selectively mechanically engageable with the coupler 995. The coupler 995 can be a two-way coupler, for example. In this regard, the propulsion assembly 980 of FIG. 23 can be a fully-electric drive propulsion assembly that relies on the electric machine 990 as the torque source for driving the propulsor 984. The propulsion assembly 980 can include a resolver 996 associated with the propulsor shaft 986 and a resolver 998 associated with the electric machine shaft 992. Further, in some embodiments, optionally, a gearbox can be positioned between the propulsor 984 and the coupler 995.

In some embodiments, when the propulsor shaft 986 is mechanically engaged with the coupler 995 and the electric machine shaft 992 is mechanically engaged with the coupler 995, mechanical power is transmittable between the propulsor 984 and the electric machine 990. The coupler 995 facilitates the power transmission. However, when at least one of the propulsor shaft 986 and the electric machine shaft 992 is not mechanically engaged with the coupler 995, mechanical power is not transmittable between the propulsor 984 and the electric machine 990.

In one example control scheme, one or more processors associated with the propulsion assembly 980 can be configured to cause the electric machine 990 to operate in a motor mode to drive the propulsor 984. In this way, mechanical power is transmitted from the electric machine 990 to the propulsor 984 via the coupler 995. In response to an electric machine decouple command 308 (FIG. 10), the one or more processors can be configured to decrease a motor torque output that the electric machine 990 applies on the coupler 995 over an unloading period. Further, when the motor torque output that the electric machine 990 applies on the coupler 995 reaches a predetermined threshold, the one or more processors can cause the electric machine 990 to be mechanically decoupled from the coupler 995. In some embodiments, the electric machine decouple command 308 (FIG. 1) can be based at least in part detection of a failure associated with the electric machine 990 and/or a failure with one or more components (e.g., one or more switching devices of an electrical drive or power converter associated with the electric machine 990) of its associated electrical system. In the event the electric machine 990 is mechanically decoupled from the propulsor 984, it will be appreciated that thrust from one or more different propulsion assemblies may provide thrust for the aircraft.

Generally, the coupler 995 of the propulsion assembly 980 of FIG. 23 can be selectively mechanically coupled/decoupled with the propulsor shaft 986 and/or with the electric machine shaft 992 in the same manner as the coupler 950 can be selectively mechanically coupled/decoupled with the low pressure shaft 926 and the electric machine 936 as shown in FIGS. 21, 22, and 23 and described in the accompanying text.

FIG. 24 is a flow diagram for a method 1100 of operating a propulsion assembly, and more particularly, operating a propulsion assembly to perform a decoupling operation.

At 1102, the method 1100 includes providing, by a first torque source via a first shaft mechanically coupled with the first torque source and a coupler, a torque output on the coupler.

At 1104, the method 1100 includes providing, by a second torque source via a second shaft mechanically coupled with the second torque source and the coupler, a torque output on the coupler.

At 1106, the method 1100 includes performing, in response to a decouple command, an unloading operation, wherein performing the unloading operation comprises, over an unloading period, decreasing, by the first torque source via the first shaft, the torque output on the coupler.

In some implementations, the first torque source is an electric machine and the second torque source is a gas turbine engine. In such implementations, the torque output provided by the first torque source by the first shaft can be a generator torque output. Thus, at 1106, the generator torque output provided by the first torque source, or electric machine in this implementation, on the coupler via the first shaft is decreased. The generator torque output can be decreased linearly over the unloading period, for example. Further, in such implementations, at 1106A, the method 1100 further includes maintaining the torque output provided by the second torque source, or gas turbine engine in this implementation, on the coupler constant. In this regard, the torque output provided by the second torque source on the coupler can remain constant during the unloading period.

In some implementations, the first torque source is an electric machine and the second torque source is a gas turbine engine. In such implementations, the torque output provided by the first torque source by the first shaft can be a generator torque output. Thus, at 1106, the generator torque output provided by the first torque source, or electric machine in this implementation, on the coupler via the first shaft is decreased. The generator torque output can be decreased linearly over the unloading period, for example. Moreover, in such implementations, at 1106B, the method 1100 further includes decreasing the torque output provided by the second torque source, or gas turbine engine in this implementation, on the coupler. In this manner, the torque output provided by the second torque source on the coupler via the second shaft can decrease during the unloading period.

In such implementations, in some instances, the torque output provided by the second torque source on the coupler via the second shaft is decreased linearly over the unloading period. In other implementations, the generator torque output provided by the first torque source on the coupler via the first shaft is decreased linearly over the unloading period at 1106 and the torque output provided by the second torque source on the coupler via the second shaft at 1106B is decreased linearly over the unloading period. In further implementations, the generator torque output provided by the first torque source on the coupler via the first shaft is decreased over the unloading period at a first rate and the torque output provided by the second torque source on the coupler is decreased over the unloading period at a second rate, the first rate being different than the second rate.

In alternative implementations, at 1106, the first torque source is an electric machine and the second torque source is a gas turbine engine. In such implementations, the torque output provided by the first torque source by the first shaft can be a motor torque output. In this regard, both the electric machine and the gas turbine engine can transmit mechanical power to the coupler, e.g., for a power assist operation. Thus, at 1106, the motor torque output provided by the first torque source, or electric machine in this implementation, on the coupler via the first shaft is decreased. In such implementations, the motor torque output can be decreased linearly over the unloading period. In such implementations, at 1106A, the method 1100 can further include maintaining the torque output provided by the second torque source, or gas turbine engine in this implementation, on the coupler constant. Or alternatively, at 1106B, the method 1100 can further include decreasing the torque output provided by the second torque source, or gas turbine engine in this implementation, on the coupler.

In some implementations, the first torque source is a gas turbine engine and the second torque source is an electric machine. In such implementations, at 1106C, the method 1100 further includes increasing, by the second torque source via the second shaft during the unloading period, the torque output on the coupler to increase mechanical power transmission between the second torque source and the coupler, the torque output provided by the second torque source on the coupler via the second shaft during the unloading period being a motor torque output.

In such implementations, in some instances, in performing the unloading operation, the motor torque output provided by the second torque source on the coupler via the second shaft is increased linearly over the unloading period. In some instances, in performing the unloading operation, the torque output provided by the first torque source on the coupler via the first shaft is decreased linearly over the unloading period. In other instances, in performing the unloading operation, the motor torque output provided by the second torque source on the coupler via the second shaft is increased linearly over the unloading period and the torque output provided by the first torque source on the coupler via the first shaft is decreased linearly over the unloading period.

In further instances, in performing the unloading operation, the motor torque output provided by the second torque source on the coupler via the second shaft is increased over the unloading period and the torque output provided by the first torque source on the coupler via the first shaft is decreased over the unloading period so that a net torque provided by the first torque source and the second torque source on the coupler is maintained within a predetermined margin of a commanded torque. In some instances, in performing the unloading operation, the motor torque output provided by the second torque source on the coupler via the second shaft is increased over the unloading period and the torque output provided by the first torque source on the coupler via the first shaft is decreased over the unloading period so that a net torque provided by the second torque source and the first torque source on the coupler is maintained at a constant torque over the unloading period. In yet other instances, in performing the unloading operation, the motor torque output provided by the second torque source on the coupler via the second shaft is increased over the unloading period at a rate and the torque output provided by the first torque source on the coupler via the first shaft is decreased over the unloading period at or substantially at the rate.

At 1108, the method 1100 includes, when the torque output provided by first torque source on the coupler reaches a predetermined threshold, decoupling the first shaft from the coupler. In some implementations, decoupling the first shaft from the coupler includes modulating one or more actuators to move a first coupler shaft of the coupler so that torque transmitting features (e.g., teeth) of the first coupler shaft disengage from torque transmitting features (e.g., teeth) of the first shaft.

In some implementations, the first torque source is a gas turbine engine, the second torque source is an electric machine, and the propulsion assembly includes a propulsor mechanically coupled with the coupler via a propulsor shaft. In such implementations, when the torque output provided by the first torque source on the coupler reaches the predetermined threshold and the first shaft is decoupled from the coupler, the method 1100 further includes providing, by the second torque source via the second shaft, the motor torque output on the coupler to drive the propulsor to a commanded operating point.

In some implementations, the first torque source is an electric machine and the second torque source is a gas turbine engine. In such implementations, prior to the unloading period, the torque output provided on the coupler by the first torque source via the first shaft at 1102 is a generator torque output. Further, decreasing the torque output provided by the first torque source on the coupler via the first shaft at 1106 includes decreasing the generator torque output that the first torque source applies on the coupler via the first shaft over the unloading period. In such implementations, decoupling the first shaft from the coupler comprises decoupling the first shaft from the coupler when the generator torque output that the first torque source applies on the coupler via the first shaft reaches the predetermined threshold.

In some implementations, the first torque source is an electric machine and the second torque source is a propulsor. In other implementations, the first torque source is a propulsor and the second torque source is an electric machine.

In some further implementations, the first torque source is a gas turbine, the second torque source is an electric machine, and a propulsor is mechanically coupled with the coupler via a propulsor shaft. In other implementations, the first torque source is an electric machine, the second torque source is a gas turbine engine, and a propulsor is mechanically coupled with the coupler via a propulsor shaft. In such implementations, the propulsor shaft can be a single shaft that is mechanically coupled to a propulsor coupler shaft of the coupler at one end and is mechanically coupled with the propulsor at an opposing end. In other instances, a gear box is positioned along the propulsor shaft between the coupler and the propulsor, the propulsor shaft having a first propulsor shaft mechanically coupling the propulsor with the gearbox and a second propulsor shaft mechanically coupling the gearbox with the coupler.

In one example embodiment, a propulsion assembly is provided. The propulsion assembly includes a first torque source mechanically coupled with a first shaft and a second torque source mechanically coupled with a second shaft. The propulsion assembly also includes a coupler. Further, the propulsion assembly includes a computing system having one or more memory devices and one or more processors. The one or more processors are configured to: cause, with the first shaft mechanically coupled to the coupler, the first torque source via the first shaft to provide a torque output on the coupler; cause, with the second shaft mechanically coupled to the coupler, the second torque source via the second shaft to provide a torque output on the coupler; in response to a decouple command, cause an unloading operation to be performed, wherein in causing the unloading operation to be performed, the one or more processors are configured to cause, by the first torque source via the first shaft, the torque output on the coupler to decrease over an unloading period; and when the torque output provided by the first torque source on the coupler reaches a predetermined threshold, cause the first shaft to become mechanically decoupled from the coupler.

In another example embodiment, a non-transitory computer readable medium is provided. The non-transitory computer readable medium includes computer-executable instructions, which, when executed by one or more processors of a computing system associated with a propulsion assembly of an aircraft, cause the one or more processors to: cause, by a first torque source via a first shaft mechanically coupled with the first torque source and a coupler, the first torque source via the first shaft to provide a torque output on the coupler; cause, by a second torque source via a second shaft mechanically coupled with the second torque source and the coupler, the second torque source via the second shaft to provide a torque output on the coupler; in response to a decouple command, cause an unloading operation to be performed, wherein in causing the unloading operation to be performed, the one or more processors are configured to cause, by the first torque source via the first shaft, the torque output on the coupler to decrease over an unloading period; and when the torque output provided by the first torque source on the coupler reaches a predetermined threshold, cause the first shaft to become mechanically decoupled from the coupler.

In yet another embodiment, a propulsion assembly is provided. The propulsion assembly includes a first torque source mechanically coupled with a first shaft and a second torque source mechanically coupled with a second shaft. The propulsion assembly also includes a coupler. Further, the propulsion assembly includes a computing system having one or more memory devices and one or more processors configured to: in response to a decouple command, cause an unloading operation to be performed, wherein in causing the unloading operation, the one or more processors are configured to: i) cause, by the second torque source via the second shaft over an unloading period, an increase in a torque output on the coupler to increase mechanical power transmission from the second torque source to the coupler; and ii) cause, by the first torque source via the first shaft over the unloading period, a decrease in a torque output on the coupler to decrease mechanical power transmission from the first torque source to the coupler; and when the torque output provided by the first torque source on the coupler reaches a predetermined threshold, cause the first shaft to become mechanically decoupled from the coupler.

In a further embodiment, a non-transitory computer readable medium is provided. The non-transitory computer readable medium includes computer-executable instructions, which, when executed by one or more processors of a computing system associated with a propulsion assembly of an aircraft, cause the one or more processors to: in response to a decouple command, cause an unloading operation to be performed, wherein in causing the unloading operation to be performed, the one or more processors are configured to: i) cause, by a second torque source of the propulsion assembly via a second shaft mechanically coupled with the second torque source and a coupler over an unloading period, an increase in a torque output on a coupler to increase mechanical power transmission from the second torque source to the coupler; and ii) cause, by a first torque source of the propulsion assembly via a first shaft mechanically coupled with the first torque source and the coupler over the unloading period, a decrease in a torque output provided on the coupler to decrease mechanical power transmission from the first torque source to the coupler; and when the torque output provided by the first torque source on the coupler reaches a predetermined threshold, cause the first shaft to become mechanically decoupled from the coupler.

FIG. 25 is a flow diagram for a method 1200 of operating a propulsion assembly, and more particularly, operating a propulsion assembly to perform a coupling operation.

At 1202, the method 1200 includes providing, by a first torque source via a first shaft mechanically coupled with the first torque source and a coupler, a torque output on the coupler.

At 1204, the method 1200 includes performing, in response to a couple command, a speed matching operation, wherein performing the speed matching operation comprises increasing a rotational speed of a second shaft mechanically coupled with a second torque source but mechanically decoupled from the coupler until the rotational speed of the second shaft matches or is within a predetermined range of a rotational speed of the first shaft. In some implementations, in performing the speed matching operation, the method 1200 includes monitoring whether the rotational speed of the first shaft matches or is within the predetermined range of the rotational speed of the second shaft based at least in part on one or more inputs received from a resolver associated with the second shaft and one or more inputs received from a resolver associated with the first shaft.

At 1206, the method 1200 includes, when the rotational speed of the second shaft matches or is within the predetermined range of the rotational speed of the first shaft, mechanically coupling the first shaft to the coupler. In some implementations, mechanically coupling the first shaft to the coupler can include modulating one or more actuators to move a first coupler shaft of the coupler so that torque transmitting features (e.g., teeth) of the first coupler shaft engage torque transmitting features (e.g., teeth) of the first shaft.

In some implementations of method 1200, the first torque source is a gas turbine engine and the second torque source is an electric machine. In such implementations, after the first shaft is mechanically coupled to the coupler, a torque output provided by the first shaft on the coupler is held constant or substantially constant for a predetermined time.

In some further implementations of method 1200 where the first torque source is a gas turbine engine and the second torque source is an electric machine, after the first shaft is mechanically coupled to the coupler, the method 1200 further comprises i) decreasing the torque output, the torque output being a motor torque output, provided by the second torque source via the second shaft on the coupler to decrease mechanical power transmission from the second torque source to the coupler; and ii) increasing the torque output provided by the first torque source via the first shaft on the coupler to increase mechanical power transmission from the first torque source to the coupler. In such implementations, in some instances, the motor torque output provided by the second torque source via the second shaft on the coupler is decreased linearly. In such implementations, in other instances, the torque output provided by the first torque source via the first shaft on the coupler is increased linearly. In such implementations, in yet other instances, the motor torque output provided by the second torque source via the second shaft on the coupler is decreased linearly and the torque output provided by the first torque source via the first shaft on the coupler is increased linearly after the first shaft is mechanically coupled to the coupler.

Further, in some implementations of method 1200 where the first torque source is a gas turbine engine and the second torque source is an electric machine, the motor torque output provided by the second torque source via the second shaft on the coupler is decreased and the torque output provided by the first torque source via the first shaft on the coupler is increased so that a net torque provided by the second torque source via the second shaft and the first torque source via the first shaft on the coupler is maintained within a predetermined margin of a commanded torque. In other implementations, the motor torque output provided by the second torque source via the second shaft on the coupler is decreased and the torque output provided by the first torque source via the first shaft on the coupler is increased so that a net torque provided by the second torque source via the second shaft and the first torque source via the first shaft on the coupler is maintained at or substantially at a constant torque over a loading period. In some further implementations, the motor torque output provided by the second torque source via the second shaft on the coupler is decreased at a rate and the torque output provided by the first torque source via the first shaft on the coupler is increased at or substantially at the rate.

In some further implementations of method 1200 where the first torque source is a gas turbine engine and the second torque source is an electric machine, the motor torque output provided by the second torque source via the second shaft on the coupler is decreased so that the second torque source, or electric machine in such implementations, switches from a motoring mode to a generating mode to generate electrical power. In other implementations, the motor torque output provided by the second torque source via the second shaft on the coupler is decreased so that the electric machine provides a generator torque output on the coupler. In other implementations, the motor torque output provided by the second torque source via the second shaft on the coupler is decreased so that the second shaft ceases providing the motor torque output on the coupler, and when the second shaft ceases providing the motor torque output on the coupler, the method 1200 further includes mechanically decoupling the second shaft from the coupler. Mechanically decoupling the second shaft from the coupler can include modulating one or more actuators to move a second coupler shaft of the coupler so that torque transmitting features (e.g., teeth) of the second coupler shaft disengage from torque transmitting features (e.g., teeth) of the second shaft.

In some implementations of method 1200, the first torque source is an electric machine and the second torque source is a gas turbine engine. In such implementations, when the rotational speed of the first shaft matches or is within the predetermined range of the rotational speed of the second shaft, a motor torque output provided by the first torque source via the first shaft on the coupler is held constant or substantially constant for a predetermined time after the first shaft is mechanically coupled with the coupler. In such implementations, in some instances, after the motor torque output provided by the first torque source via the first shaft on the coupler is held constant or substantially constant for the predetermined time, the method 1200 further includes decreasing the motor torque output provided by the first torque source via the first shaft on the coupler to decrease mechanical power transmission from the first torque source to the coupler. In such implementations, in some instances, the motor torque output provided by the first torque source via the first shaft on the coupler is decreased so that the first shaft ceases providing a motor torque output on the coupler. In such implementations, in some instances, the motor torque output provided by the first torque source via the first shaft on the coupler is decreased linearly.

In some implementations where the first torque source is an electric machine and the second torque source is a gas turbine engine, after the first shaft is mechanically coupled with the coupler, the method 1200 further includes decreasing a motor torque output provided by the first torque source via the first shaft on the coupler to decrease mechanical power transmission from the first torque source to the coupler. In such implementations, in some instances, the motor torque output provided by the first torque source via the first shaft on the coupler is decreased so that the first shaft ceases providing a motor torque output on the coupler. In such implementations, in other instances, the motor torque output provided by the first torque source via the first shaft on the coupler is decreased linearly. In such implementations, in yet other instances, the motor torque output provided by the first torque source via the first shaft on the coupler is decreased so that the first torque source, or electric machine in such implementations, switches from a motoring mode to a generating mode to generate electrical power. In such implementations, in some instances, the motor torque output provided by the first torque source via the first shaft on the coupler is decreased so that the electric machine provides a generator torque output on the coupler.

In some implementations where the first torque source is an electric machine and the second torque source is a gas turbine engine, after the first shaft is mechanically coupled with the coupler, the method 1200 further includes mechanically decoupling the second shaft from the coupler.

In some implementations, the first torque source is an electric machine and the second torque source is a propulsor. In other implementations, the first torque source is a propulsor and the second torque source is an electric machine.

In some further implementations, the first torque source is a gas turbine, the second torque source is an electric machine, and a propulsor is mechanically coupled with the coupler via a propulsor shaft. In other implementations, the first torque source is an electric machine, the second torque source is a gas turbine engine, and a propulsor is mechanically coupled with the coupler via a propulsor shaft. In such implementations, the propulsor shaft can be a single shaft that is mechanically coupled to a propulsor coupler shaft of the coupler at one end and is mechanically coupled with the propulsor at an opposing end. In other instances, a gear box is positioned along the propulsor shaft between the coupler and the propulsor, the propulsor shaft having a first propulsor shaft mechanically coupling the propulsor with the gearbox and a second propulsor shaft mechanically coupling the gearbox with the coupler.

In one example embodiment, a propulsion assembly is provided, such as any one of the propulsion assemblies provided herein. The propulsion assembly includes a first torque source mechanically coupled with a first shaft and a second torque source mechanically coupled with a second shaft. The propulsion assembly also includes a coupler. Further, the propulsion assembly has a computing system having one or more memory devices and one or more processors. The one or more processors are configured to: cause the first torque source via the first shaft to provide a torque output on the coupler; in response to a couple command, cause a speed matching operation to be performed, wherein in causing the speed matching operation, the one or more processors are configured to increase, with the second shaft mechanically decoupled from the coupler, a rotational speed of the second shaft until the rotational speed of the second shaft matches or is within a predetermined range of a rotational speed of the first shaft; and when the rotational speed of the second shaft matches or is within the predetermined range of the rotational speed of the first shaft, cause the first shaft to become mechanically coupled to the coupler.

In another example embodiment, a non-transitory computer readable medium is provided. The non-transitory computer readable medium includes computer-executable instructions, which, when executed by one or more processors of a computing system associated with a propulsion assembly of an aircraft, cause the one or more processors to: cause a first torque source of the propulsion assembly via a first shaft mechanically coupled with the first torque source and a coupler to provide a torque output on the coupler; in response to a couple command, cause a speed matching operation to be performed, wherein in causing the speed matching operation, the one or more processors are configured to increase, with a second shaft mechanically coupled with a second torque source but mechanically decoupled from the coupler, a rotational speed of the second shaft until the rotational speed of the second shaft matches or is within a predetermined range of a rotational speed of the first shaft; and when the rotational speed of the second shaft matches or is within the predetermined range of the rotational speed of the first shaft, cause the first shaft to become mechanically coupled to the coupler.

Figure 26:
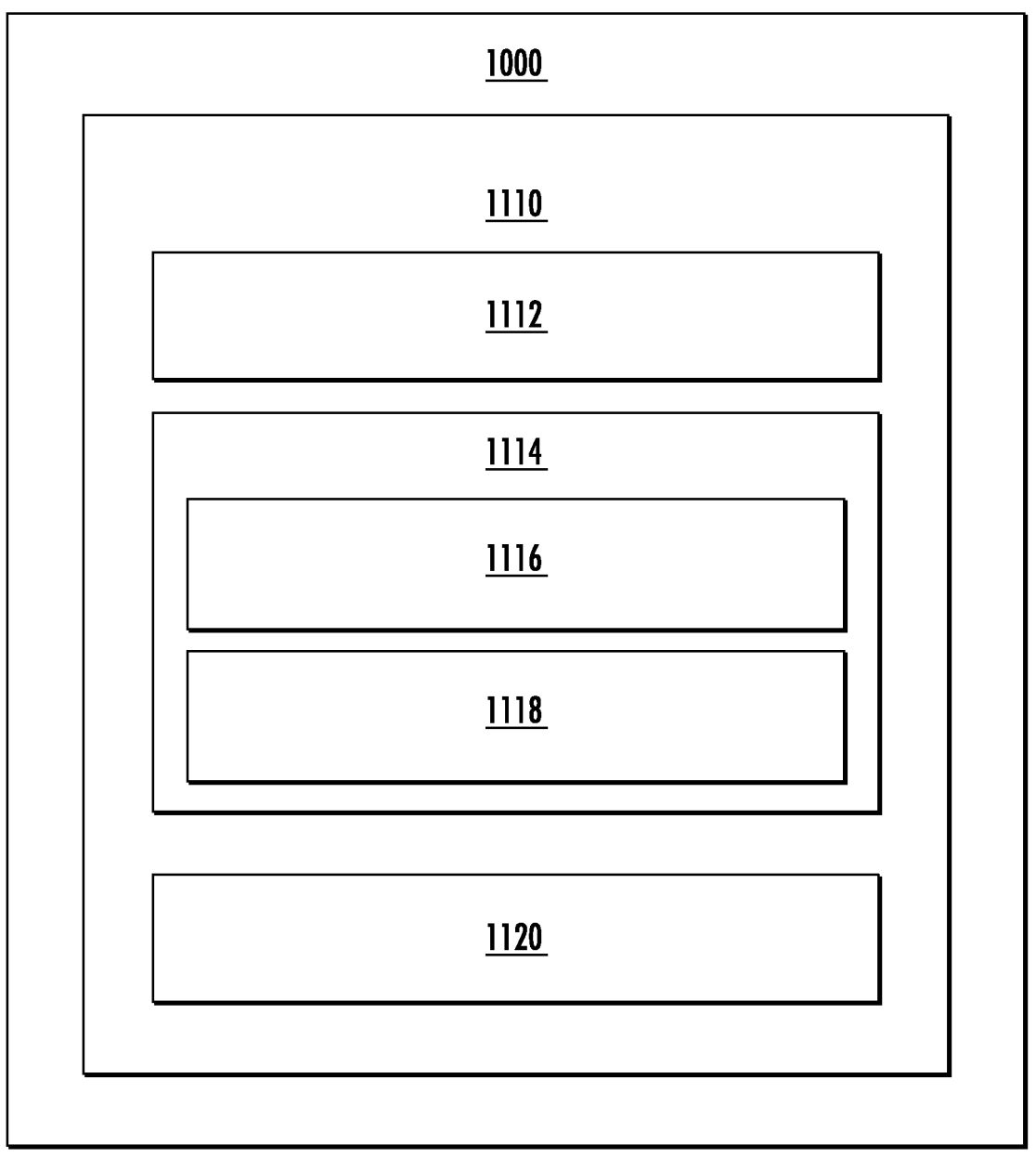
FIG. 26 provides a computing system according to example embodiments of the present disclosure.

FIG. 26 provides a computing system 1000 according to example embodiments of the present disclosure. The computing system 96 of the aircraft 10 can be configured in a same or similar manner as the computing system 1000, for example. As shown, the computing system 1000 can include one or more computing device(s) 1110. The computing devices/controllers 94, 98, 52, 54 can be configured in the same or similar manner as the computing device(s) 1110. As shown, the computing device(s) 1110 can include one or more processor(s) 1112 and one or more memory device(s) 1114. The one or more processor(s) 1112 can include any suitable processing device, such as a microprocessor, microcontroller, integrated circuit, logic device, and/or other suitable processing device. The one or more memory device(s) 1114 can include one or more computer-executable or computer-readable media, including, but not limited to, non-transitory computer-readable media, RAM, ROM, hard drives, flash drives, and/or other memory devices.

The one or more memory device(s) 1114 can store information accessible by the one or more processor(s) 1112, including computer-readable or computer-executable instructions 1116 that can be executed by the one or more processor(s) 1112. The instructions 1116 can be any set of instructions that, when executed by the one or more processor(s) 1112, cause the one or more processor(s) 1112 to perform operations. In some embodiments, the instructions 1116 can be executed by the one or more processor(s) 1112 to cause the one or more processor(s) 1112 to perform operations, such as any of the operations and functions for which the computing system 1000 and/or the computing device(s) 1110 are configured. The instructions 1116 can be software written in any suitable programming language or can be implemented in hardware. Additionally, and/or alternatively, the instructions 1116 can be executed in logically and/or virtually separate threads on processor(s) 1112. The memory device(s) 1114 can further store data 1118 that can be accessed by the processor(s) 1112. For example, the data 1118 can include models, lookup tables, databases, etc.

The computing device(s) 1110 can also include a network 1120 used to communicate, for example, with the other components of system 1000 (e.g., via a communication network). The network 1120 can include any suitable components for interfacing with one or more network(s), including for example, transmitters, receivers, ports, controllers, antennas, and/or other suitable components. One or more devices can be configured to receive one or more commands from the computing device(s) 1110 or provide one or more commands to the computing device(s) 1110.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The inventive aspects of the present disclosure may provide certain advantages, benefits, and/or technical effects. For instance, the assemblies and methods disclosed herein may enable a hybrid-electric propulsion system or fully-electric propulsion system to switch between modes of operation in a safe and reliable manner, and without need for more permanent solutions, such as shaft cutting. As disclosed herein, smooth transitions between operating modes may be accomplished by unloading/loading components and synchronizing their speeds or torques prior to decoupling or coupling a component from the coupler.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

41

42

We claim:

1. A method, comprising:

operating an electric machine in a generator mode, the electric machine being mechanically coupled with a coupler to which a propulsor and a power turbine of a gas turbine engine are also mechanically coupled;

in response to an electric machine decouple command, decreasing a generator torque output that the electric machine applies on the coupler over an unloading period; and when the generator torque output that the electric machine applies on the coupler reaches a predetermined threshold, decoupling the electric machine from the coupler, wherein during the unloading period, a torque output provided by the power turbine on the coupler is decreased.

2. The method of claim 1, wherein the generator torque output is decreased linearly over the unloading period.

3. The method of claim 1, wherein during the unloading period, the torque output provided by the power turbine on the coupler is decreased linearly.

4. The method of claim 1, wherein the generator torque output provided by the electric machine on the coupler is decreased linearly over the unloading period and the torque output provided by the power turbine on the coupler is decreased linearly over the unloading period.

5. The method of claim 1, wherein the generator torque output provided by the electric machine on the coupler is decreased over the unloading period at a first rate and a torque output provided by the power turbine on the coupler is decreased over the unloading period at a second rate, the first rate being different than the second rate.

6. The method of claim 1, wherein decoupling the electric machine from the coupler comprises modulating one or more actuators to move a coupler electric machine shaft of the coupler so that torque transmitting features of the coupler electric machine shaft disengage from torque transmitting features of an electric machine shaft associated with the electric machine.

\* \* \* \* \*